(12) United States Patent
Hino et al.

(10) Patent No.: US 7,237,029 B2
(45) Date of Patent: Jun. 26, 2007

(54) REMOTE CONTROL SYSTEM AND HOME GATEWAY APPARATUS

(75) Inventors: Tetsuya Hino, Tokyo (JP); Naoto Yamaguchi, Ichikawa (JP); Masao Kato, Yokohama (JP)

(73) Assignee: Matsushita Electric Industrial Company, Ltd., Osaka (JP)

( * ) Notice: Subject to any disclaimer, the term of this patent is extended or adjusted under 35 U.S.C. 154(b) by 1089 days.

(21) Appl. No.: 09/916,113

(22) Filed: Jul. 27, 2001

(65) Prior Publication Data

US 2002/0069276 A1 Jun. 6, 2002

(30) Foreign Application Priority Data

Jul. 28, 2000 (JP) ............................. 2000-229870

(51) Int. Cl.
*G06F 15/16* (2006.01)

(52) U.S. Cl. ...................... 709/227; 709/224; 709/225

(58) Field of Classification Search ............... 709/219, 709/224, 225, 227; 345/736, 740; 379/102.01, 379/102.05; 700/83
See application file for complete search history.

(56) References Cited

U.S. PATENT DOCUMENTS

| | | | | |
|---|---|---|---|---|
| 6,480,586 B1 * | 11/2002 | Hayes et al. | ........... | 379/102.02 |
| 6,496,575 B1 * | 12/2002 | Vasell et al. | ........... | 379/102.05 |
| 6,507,762 B1 * | 1/2003 | Amro et al. | ................. | 700/83 |
| 6,526,581 B1 * | 2/2003 | Edson | ........................ | 725/74 |
| 6,618,162 B1 * | 9/2003 | Wiklof et al. | .............. | 358/1.15 |
| 6,731,201 B1 * | 5/2004 | Bailey et al. | .......... | 340/310.01 |
| 6,963,925 B1 * | 11/2005 | Ishikawa et al. | ............ | 709/238 |

FOREIGN PATENT DOCUMENTS

| | | |
|---|---|---|
| DE | 4434044 A1 * | 3/1996 |
| EP | 1063829 A2 * | 12/2000 |
| EP | 1107209 A1 * | 6/2001 |
| JP | 61-111089 | 5/1986 |
| JP | 05-012839 | 1/1993 |
| JP | 5-258191 | 10/1993 |
| JP | 05-258191 | 10/1993 |
| JP | 06-225360 | 8/1994 |
| JP | 07-007765 | 1/1995 |
| JP | 07-131542 | 5/1995 |

(Continued)

*Primary Examiner*—William Vaughn
*Assistant Examiner*—Joseph Maniwang
(74) *Attorney, Agent, or Firm*—Michael G. Gilman

(57) ABSTRACT

A gateway apparatus is provided which connects to appliances via a home network. The gateway apparatus includes means for acquiring appliance panel information indicating panel parts of the appliance and an operational range of the panel parts, and means for memorizing gateway apparatus information indicating whether a control command input to the appliance thorough a network built outside the home. The gateway apparatus further includes means for determining whether or not it is possible to accept the input by making reference to the gateway apparatus information when the control command input is received through the outside network and for producing a control command to the appliance based on the appliance panel information when the acceptance is possible. This makes it possible to perform remote control in a similar feeling obtained in operating a front panel of an actual home appliance. Through the outside network, the home appliance can be controlled with easier operations. A higher-reliable remote control system can be provided.

36 Claims, 58 Drawing Sheets

FOREIGN PATENT DOCUMENTS

| | | |
|---|---|---|
| JP | 10-187224 | 7/1998 |
| JP | 10-191463 | 7/1998 |
| JP | 10-261016 | 9/1998 |
| JP | 11-046255 | 2/1999 |
| JP | 3016350 | 12/1999 |
| JP | 2000-059867 | 2/2000 |
| JP | 2000-125370 | 4/2000 |
| JP | 2000-151823 | 5/2000 |
| JP | 2001-53779 | 2/2001 |
| WO | WO 9909068 A1 * | 2/1999 |
| WO | WO 00/17737 | 3/2000 |

* cited by examiner

EXEMPLIFIED TABLE OF APPLIANCE PANEL INFORMATION

| SHEET | PANEL ID | DISPLAY DATA | OPERATION ON GUI | COMMAND | OPERATION RANGE | LAYOUT |
|---|---|---|---|---|---|---|
| SHEET 1 | B 1 | △ | "push" | "play" | – | 10×100 |
| SHEET 1 | B 2 | □ | "push" | "stop" | – | 50×100 |
| SHEET 1 | V 1 | ▭ | "up" or "down" | "volume" | L0 ~ L50 | 90×130 |

TV 1, VTR 2, VTR 1

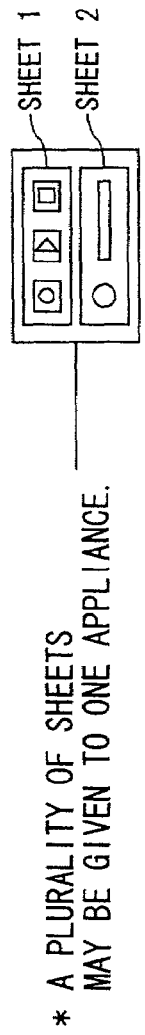

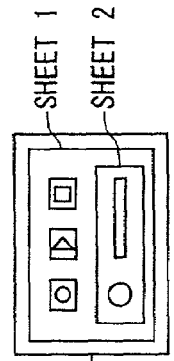

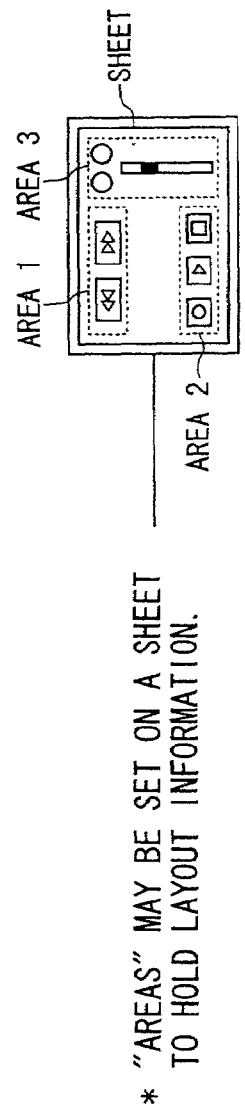

* A PLURALITY OF SHEETS MAY BE GIVEN TO ONE APPLIANCE.

* ONE SHEET MAY BE ARRANGED ON ANOTHER SHEET.

* "AREAS" MAY BE SET ON A SHEET TO HOLD LAYOUT INFORMATION.

FIG. 3

TYPE OF INPUT: ACQUISITION OF PANEL INFORMATION
OBJECTIVE APPLIANCE: VTR1

```
TYPE OF INPUT: CONTROL COMMAND
OBJECTIVE APPLIANCE: VTR1
ID OF CONTROL-REQUESTING DEVICE: REMOTE CONTROL
                                 TERMINAL A
PANEL ID: B1
OPERATION: "push"
```

A — ACCEPTANCE OF INPUT FROM OUTSIDE THE HOME: POSSIBLE
B — ACCEPTANCE OF INPUT FROM INSIDE THE HOME: POSSIBLE

FIG. 12A

A — ACCEPTANCE OF INPUT FROM OUTSIDE THE HOME: IMPOSSIBLE
B — ACCEPTANCE OF INPUT FROM INSIDE THE HOME: POSSIBLE

FIG. 12B

| SHEET | PANEL ID | DISPLAY DATA | OPERATION ON GUI | COMMAND | OPERATION RANGE | LAYOUT |
|---|---|---|---|---|---|---|
| SHEET 1 | B 1 | △ | "push" | "play" | — | 10 × 100 |
| SHEET 1 | B 2 | □ | "push" | "stop" | — | 50 × 100 |
| SHEET 1 | V 1 | ▮ | "up" or "down" | "volume" | L0 ~ L50 | 90 × 130 |

| CURRENT STATE |
|---|
| "pushed" |
| "Normal" |
| "level4" |
| ... |

FIG. 14

```
TYPE OF NOTIFICATION: STATE CHANGE NOTIFICATION
OBJECTIVE APPLIANCE: VTR1
PANEL ID: B1
FORMER STATE: "Normal"
NEW STATE:    "pushed"
```

```
CONTROL DEVICE ID: 001
REQUEST: SERVICE LIST
```

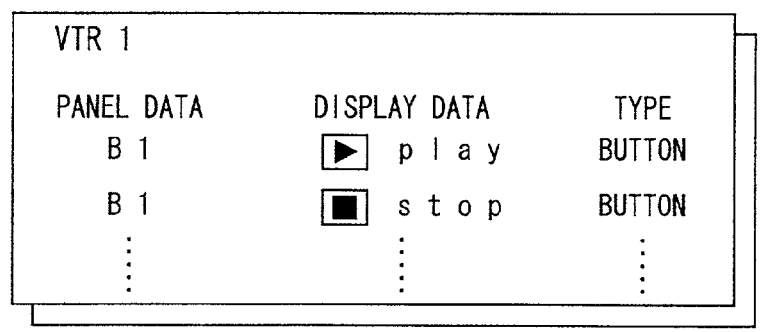
FIG. 22
SHEET(1) (VTR 1)
BUTTON 1  – DISPLAY DATA ▶  – LAYOUT(100, 50)   – COMMAND  B1push
BUTTON 2  – DISPLAY DATA ■  – LAYOUT(100, 100)  – COMMAND  B2push
FIG. 23
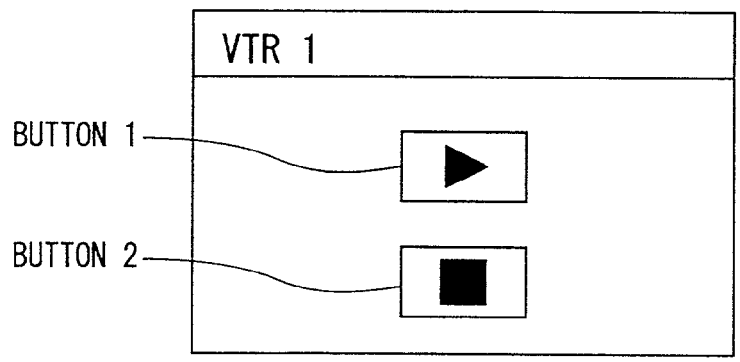
FIG. 24

```
<HTML>
  <BODY>
    .
    .
    .
  <A href="http://www. ···/VTR1/B1push,cgi">
    <src="play,gif">  </A>

<A href="http://www. ···/VTR1/B2push,cgi">
    <src="stop,gif">  </A>
    .
    .
    .
  </BODY>
</HTML>
```

APPLIANCE ID: VTR 1
CURRENT STATUS [ S2 ]   PRIORITY DEVICE ID [ — ]

\* IS CONTINUED OPERATION STATUS

| BEFORE OPERATION | OPERATION | AFTER OPERATION |
|---|---|---|
| S1 (INITIAL STATUS) | B1 push | S2 |
|  | B3 push | S3 |
|  | B4 push | S4 * |
| S2 (IN REPLAY) | B2 push | S1 |
| S3 (IN RECORDING) | B2 push | S1 |
| S4 (RESERVATION OF RECORDING AND WAITING FOR CHANNEL INPUT) | CH1 push ⋮ CH12 push | S5 * |
| S5 (RESERVATION OF RECORDING AND WAITING FOR TIME INPUT) | TIMER30 push TIMER60 push ⋮ | S6 |
| ⋮ | ⋮ | ⋮ |

FIG. 31

PRIORITY DEVICE ID: 002

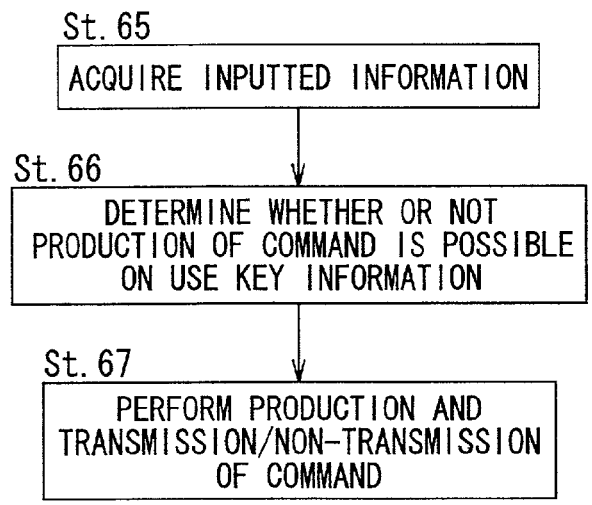

St. 65
ACQUIRE INPUTTED INFORMATION

St. 66
DETERMINE WHETHER OR NOT PRODUCTION OF COMMAND IS POSSIBLE ON USE KEY INFORMATION

St. 67
PERFORM PRODUCTION AND TRANSMISSION/NON-TRANSMISSION OF COMMAND

FIG. 39

ACCEPTABLE TIME ZONE DATA
10:00~20:00

FIG. 40

| LOCATION IDENTIFICATION DATA | LOCATION IDENTIFICATION DATA | LOCATION IDENTIFICATION DATA |
|---|---|---|
| INSIDE THE DOMESTIC AREA OF JAPAN | INSIDE THE HOME | WITHIN AN AREA COVERED BY 1 km FROM THE HOME |

FIG. 41

DEVICE IDENTIFICATION DATA
ID : 001 ~ 009

USER IDENTIFICATION DATA
ID : A , B , C , D

| KEY 1 |
|---|
| USER ID : 001 TO 004 |

APPLIANCE ID: VTR 1
CURRENT STATUS  S1

| BEFORE OPERATION | OPERATION | AFTER OPERATION | USE KEY |
|---|---|---|---|
| S1 (INITIAL STATUS) | B1 | S2 | |
| | B3 | S3 | 1 |
| | B4 | S4* | 1 |
| S2 (IN REPLAY) | B2 | S1 | |
| S3 (IN RECORDING) | B2 | S1 | |
| S4*(RESERVATION OF RECORDING AND WAITING FOR CHANNEL INPUT) | | | |

FIG. 45

KEY 2
LOCATION IDENTIFICATION DATA:

WITHIN AREA COVERED BY A RADIUS OF 1 km FROM THE HOME OR INSIDE THE HOME

KEY 3
LOCATION IDENTIFICATION DATA:

INSIDE THE HOME

APPLIANCE ID: AIR CONDITIONER
CURRENT STATUS : S1

| BEFORE OPERATION | OPERATION | AFTER OPERATION | KEY |
|---|---|---|---|
| S1 (OFF) | B1 (ON) | S2 | 2 |
| S2 (ON) | B2 (OFF) | S1 | 2 |
| | B3 (TEMPERATURE) | S3* | 3 |
| S3* (WAITING FOR SETTING OF TEMPERATURE) | B4 (1°C+) | S2 | 3 |
| | B5 (1°C−) | S2 | 3 |
| ..... | ..... | ..... | ..... |

FIG. 48

| KEY 10 |
|---|
| USER ID : A TO C |

| KEY 9 |
|---|
| USER ID : A TO F |

| KEY 1 |
|---|
| USER ID : A TO D |

APPLIANCE ID: VTR 1
CURRENT STATUS : S1

| BEFORE OPERATION | OPERATION | AFTER OPERATION | USE KEY |
|---|---|---|---|
| S1 | B1 push | S2 | 9 |
| | B3 push | S3 | 1 AND 9 |
| | B4 push | S4* | 1 AND 9 |
| S2 | B2 push | S1 | 1 AND 9 |
| S3 | B2 push | S1 | 1 AND 9 |
| S4* | CH1 push ... CH12 push | S5* | 1 AND 9 |
| | TIMER30 push ... TIMER90 push | S6 | 1 AND 9 |
| S5* | TIMER120 push ... TIMER180 push | S6 | 10 AND 9 |
| ... | ... | ... | ... |

FIG. 50

| CONTENTS ID | USE KEY NO. | ACCESS |
|---|---|---|
| a | 5 | – |
| b | 6 | VTR1 |
| c | 7 | HD1 |
| d | 8 | – |
| ⋮ | ⋮ | ⋮ |

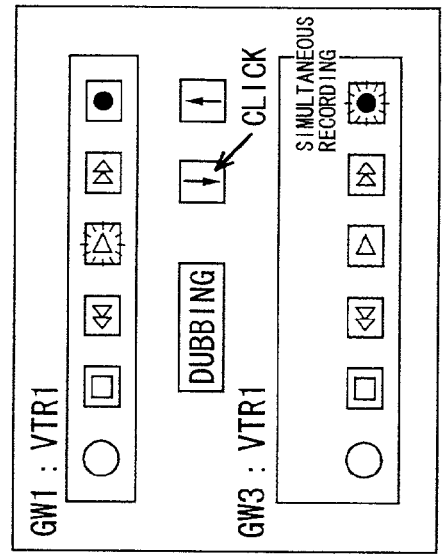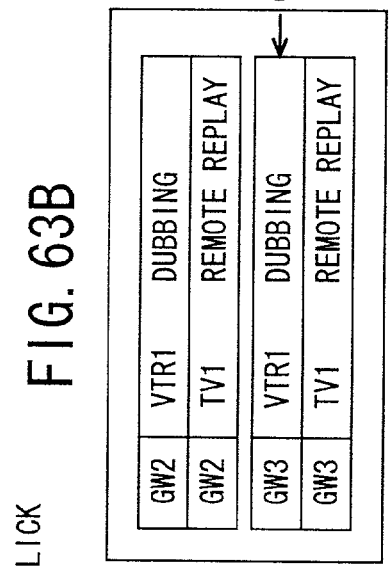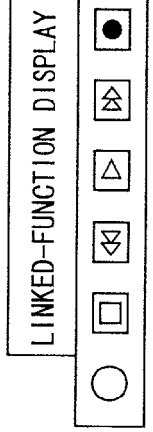
FIG. 63A SCREEN-DISPLAYED IMAGE FOR LINKED FUNCTIONS
FIG. 63B
FIG. 63C DUBBING : GW1 : GW1
GW1 : TERMINAL A : VTR1 : B1 : push :
GW3 : TERMINAL A : VTR1 : B4 : push :

FIG. 64

| DISTRIBUTION ROUTE INFORMATION |
|---|

| DUBBING : GW1 : GW2 |
| GW1 : TERMINAL A : VTR1 : B1 : push : |
| GW2 : TERMINAL A : VTR4 : B4 : push : |

| ACCEPTANCE CONDITION |
|---|
| CREDIT KEY INFORMATION IS REQUIRED |

FIG. 72A

| SERVICE | ACCEPTANCE CONDITION |
|---|---|
| SERVICE 1 | CREDIT KEY INFORMATION · REQUIRED |
| SERVICE 2 | CREDIT KEY INFORMATION · NOT REQUIRED |
| SERVICE 3 | CREDIT KEY INFORMATION · REQUIRED |

FIG. 72B

| TYPE OF INPUT | ACCEPTANCE CONDITION |
|---|---|
| ACQUISITION REQUEST FOR PANEL | "CREDIT KEY INFORMATION IS NOT REQUIRED" |
| CONTROL COMMAND | "CREDIT KEY INFORMATION IS REQUIRED" |

FIG. 72C

| TYPE OF INPUT | ACCEPTANCE CONDITION | KEY CONTENTS |
|---|---|---|
| ACQUISITION OF PANEL INFORMATION | "CREDIT KEY INFORMATION IS NOT REQUIRED" | – |
| CONTROL COMMAND | "CREDIT KEY INFORMATION IS REQUIRED" | "100 YEN HAS BEEN CHARGED" |

REMOTE CONTROL SYSTEM AND HOME GATEWAY APPARATUS

BACKGROUND OF THE INVENTION

1. Technical field

The present invention relates to a remote control system for controlling home appliances from outside the home and a gateway apparatus used for the remote control system, and in particular, to the system and apparatus capable of controlling the home appliances from outside the home with easier operations.

2. Related art

In recent years, in order to build a system in which home appliances are connected to a network built inside the home (home network) so as to be controlled those appliances, standardization for protocols of the home network that use IEEE 1394, BLUETOOTH, and/or power lines is now in progress. The home appliances have already been partly mutual-connected for linked usage, and home appliances can be connected to personal computers or to other home appliances (such that a floor type of VTR is connected to a video camera).

A Japanese Patent publication No. 3016350 discloses a system for a home appliance control interface, in which there is provided a personal computer for operating home appliances and an image indicative of rooms in which the home appliances are placed.

Another Japanese Patent publication No. 3014532 discloses a home automation system. In this system, the layout view of rooms of a house is displayed on a personal computer used for controlling home appliances, such as a bath and air conditioner. For example, when a user performs operations on the layout view of the air conditioner, contents of operations for a wind direction, wind amount, setting of temperature, necessity for dehumiditification and/or others are displayed on the view. Based on a selected content to be operated, the system is able to actuate the air conditioner. In this home automation system, the personal computer is connected to a second personal computer through a telephone line, so that a user is able to give data to the second personal computer to control the home appliances from a distance.

With regard to a control interface for home appliances, remote control devices have long been used. Japanese Patent publication 6-32509 discloses a remote control apparatus, in which replacement of ROMs allows a plurality of appliances to be controlled. This remote control apparatus has a display unit for displaying figures illustrating operation panels of the appliances to be controlled. Pressing a key on an operation panel that has been displayed enables control of a desired appliance.

Further, the Internet has widely become popular in recent years, and use of a home computer and portable terminals or mobile terminals makes it possible to have access to the Internet from any place. To control a personal computer with functions for home appliances (e.g., a personal computer with the functions for a TV tuner and picture recording) via the Internet has already been conducted. Practically, a portable terminal is used outside to send to a mail box on the Internet an electronic mail in which pieces of information indicating instructions to control a home appliance are written. On the other hand, a home personal computer is actuated to regularly access the electronic mail box. If the home personal computer finds an electronic mail containing the information in relation to instructions of control, the function of the personal computer is activated.

In this configuration, the portable terminal extracts a function, operation data for reserving picture recording, and a start time and an end time of recording of a broadcast channel. And the portable terminal uses these pieces of information to produce the information about the control instructions that can be interpreted by a program installed in the personal computer. The produced information is then sent out with the electronic mail.

For a further example of accessing a computer system via a communication network, a system has been known in which terminals control a host computer based on programs on API (application programming interface) specifications that include communication protocol processing.

However, the conventional systems have given no consideration to a direct connection of a home network to the Internet, because there are differences in protocols between the home network connected to home appliances and an outside computer network (e.g., Internet) connected to the home network. In addition, the home appliances are not equipped with the API capable of receiving control commands sent from outside the home via the Internet and operating the home appliances. Therefore, there is a problem that the conventional systems are unable to remote-control home appliances from outside the home via the Internet, though the Internet itself has now considerably become popular.

Moreover, in the case of conventional remote-control techniques, there is a possibility that conflicts occur between direct operations and remote operations toward a certain home appliance.

Still further, there is a fear that an immoral user might perform a remote control to give home appliances a breakdown or information about the leakage of privacy.

SUMMARY OF THE INVENTION

The present invention has been made with consideration of the above problems faced by the conventional techniques, and an object of the present invention is to provide, with higher reliability and easier operations, a remote control system capable of controlling home appliances through a network connected to the home. Also a further object of the present invention is to provide a gateway apparatus for realizing the above remote control system.

To realize the objects, in the present invention, there is provided a gateway apparatus connected to at least one appliance through a first network, the apparatus comprising: appliance panel information inputting means for acquiring appliance panel information indicating panel parts of the appliance and an operational range of the panel parts; gateway apparatus information memorizing means for memorizing gateway apparatus information indicative of whether or not a control command input from a second network to the appliance is allowed to be accepted; and appliance control command producing means for determining, with reference to the gateway apparatus information, whether or not the control command input is possible be accepted in cases where the control command input has been received through the second network or without through the network, and for producing a control command toward the appliance on the basis of the appliance panel information in cases where it is determined that the control command input is possible to be accepted.

Further, in the present invention, there is provided a gateway apparatus connected to at least one appliance through a first network, the apparatus comprising: appliance panel information inputting means for acquiring appliance panel information indicating panel parts of the appliance and an operational range of the panel parts; gateway apparatus information memorizing means for memorizing gateway apparatus information indicative of whether or not a control command input from the first network or a second network to the appliance is allowed to be accepted; and appliance control command producing means for determining, with reference to the gateway apparatus information, whether or not the control command input is possible be accepted in cases where the control command input has been received through the first network or the second network or without through the networks, and for producing a control command toward the appliance on the basis of the appliance panel information in cases where it is determined that the control command input is possible to be accepted.

Still further, in the present invention, there is provided a gateway apparatus connected via both a service server producing credit information and a network so as to acquire an input from a terminal together with the credit information, the apparatus comprising accepting means for memorizing acceptance information in which a condition for allowing the input to be accepted and determining whether or not the input is possible to be accepted on the basis of the input and the acceptance information.

In the present invention, there is still provided a remote control system in which a gateway apparatus is connected to an outside network built outside a home and to a home network connected to a home appliance, the home appliance being remote-controlled through the outside network and the remote control being mediated by the gateway apparatus, wherein the gateway apparatus is configured to output appliance panel information of the home appliance to a control device to remote-control the home appliance through the outside network such that a figure approximating a front panel of the appliance is displayed on a screen of the control device, to convert an operation on the panel displayed on the screen of the control device into a control command to the home appliance, and to send the produced command to the home appliance such that the home appliance performs an operation corresponding to the operation done on the panel displayed by the control device.

As a result, the appliance can be operated through the network built outside the home (e.g., Internet) from a distance in a feeling obtained in operating the front panel of an actual home appliance.

Furthermore, in the case that a control command caused by a direct operation to a home appliance is issued, the control command is supplied to the home appliance through the gateway apparatus. Since the control can be integrated, a conflict between the direct operation and the remote control, both of which is toward the home appliance, can be prevented.

Still, credit processing given by a service server enables the system to have higher stability, thus improving the reliability of the system.

BRIEF DESCRIPTION OF THE DRAWINGS

In the accompanying drawings:

FIG. 3 is a table showing appliance panel information table;

FIGS. 12A and 12B show exemplary GW apparatus information adopted by the second embodiment;

FIG. 14 illustrates an appliance panel information table according to the third embodiment;

FIG. 22 is an example of appliance panel information;

FIG. 23 exemplifies GW service list information;

FIG. 24 is an exemplary display screen produced based on the GW service list information;

FIG. 31 illustrates appliance operation status information in the sixth embodiment;

FIG. 39 is a flowchart showing the procedures of processing for producing and determining a command;

FIG. 40 shows an example of acceptable time zone data employed as a use key;

FIG. 41 shows an example of location identification data employed as a use key;

FIG. 45 is an example of use key information made to correspond to the status in appliance operation status information;

FIG. 48 illustrates a plurality of pieces of use key information made to correspond to the status in appliance operation status information, in which location identification data differ every piece of the information;

FIG. 50 illustrates a plurality of pieces of use key information made to correspond to the status in appliance operation status information, in which user identification data differ every piece of the information;

FIGS. 63A to 63C are images displaying panels of a plurality of home appliances, the images being obtained at a remote control device;

FIG. 64 exemplifies inputs of control commands to a plurality of appliances;

FIGS. 72A to 72C are examples of acceptance condition tables;

DETAILED DESCRIPTION OF PREFERRED EMBODIMENTS (First Embodiment)

In a first embodiment, the fundamental configuration of a remote control system according to the present invention will now be described.

Figure 1:
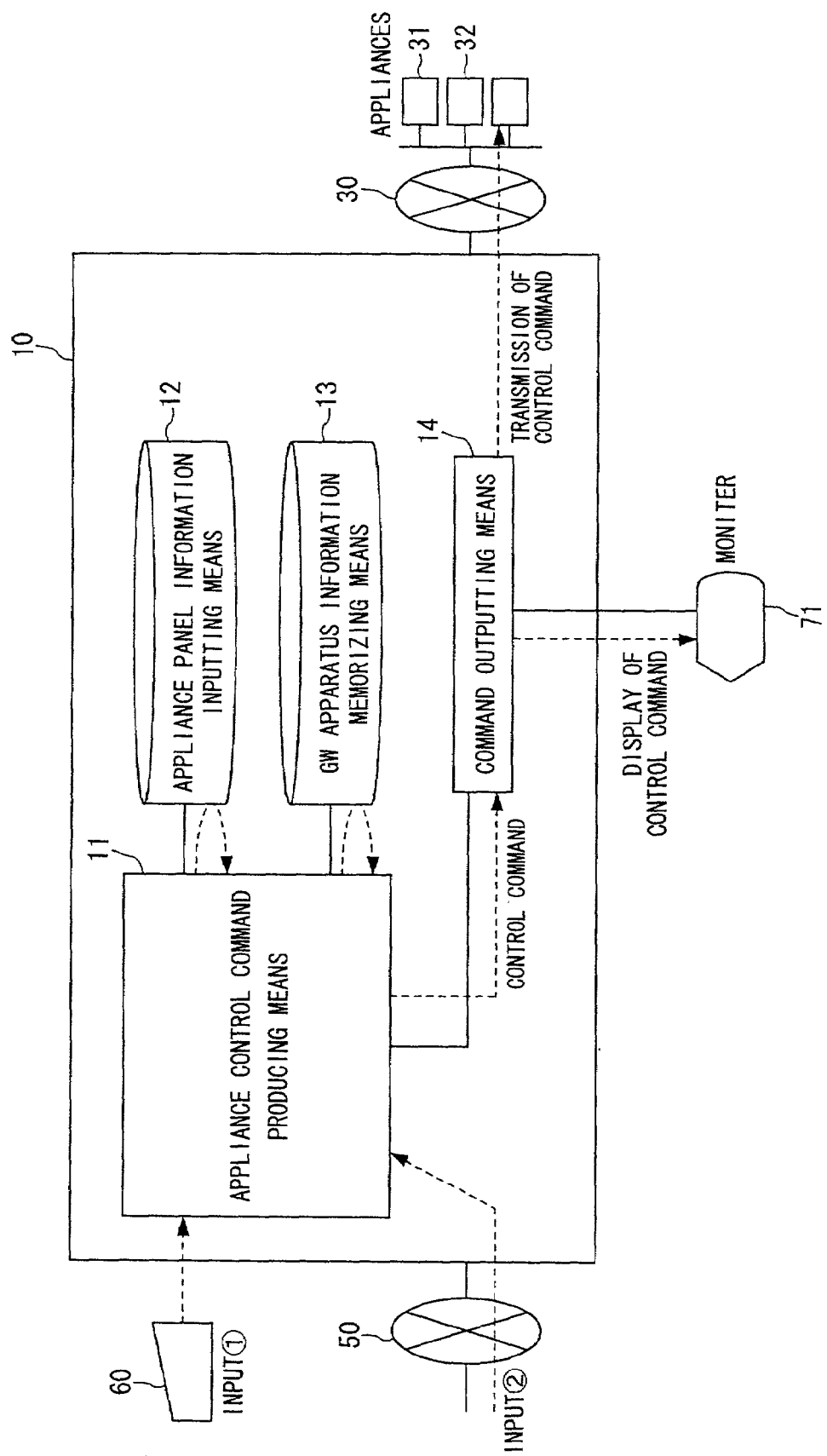
FIG. 1 is a block diagram showing the configuration of a GW apparatus according to a first embodiment.

FIG. 1 shows the entire configuration of this remote control system. This remote control system has a home network 30 connecting home appliances 31 and 32, an outside network (for example, the Internet) 50 permitting the home appliances 31 and 32 on the home network 30 to be accessed from outside the home, a gateway (GW) apparatus 10 connecting the home network 30 to the outside network 50 and acting as a mediator between communication protocols employed by them, and a control device 60 used for directly inputting control commands into the GW apparatus 10 with no network routed. The GW apparatus 10 functionally includes appliance panel information inputting means 12 for acquiring appliance panel information about control panels of the home appliances 31 and 32; GW apparatus information memorizing means 13 for memorizing GW apparatus information indicative of whether or not accepting control command inputs that have been sent from the outside network 50; appliance control command producing means 11 for receiving commands of control of the home appliances 31 and 32 from a control device 60 and/or outside network 50 and producing control commands to the home appliances 31 and 32; and command outputting means 14 for outputting the produced control commands to a desired home appliance 31 (32), a monitor 71, and others.

The home appliances 31 and 32 are AV devices, white goods, lighting fixtures, or others. The home appliances 31 and 32 may be equipments or devices in an office.

The control device 60 is made up of a device capable of directly inputting control commands to the GW apparatus 10, which is for example a console (operation panel) or a remote control unit of or for the GW apparatus 10. A keyboard of the GW apparatus 10 can be used as the control device 60.

Figure 2:
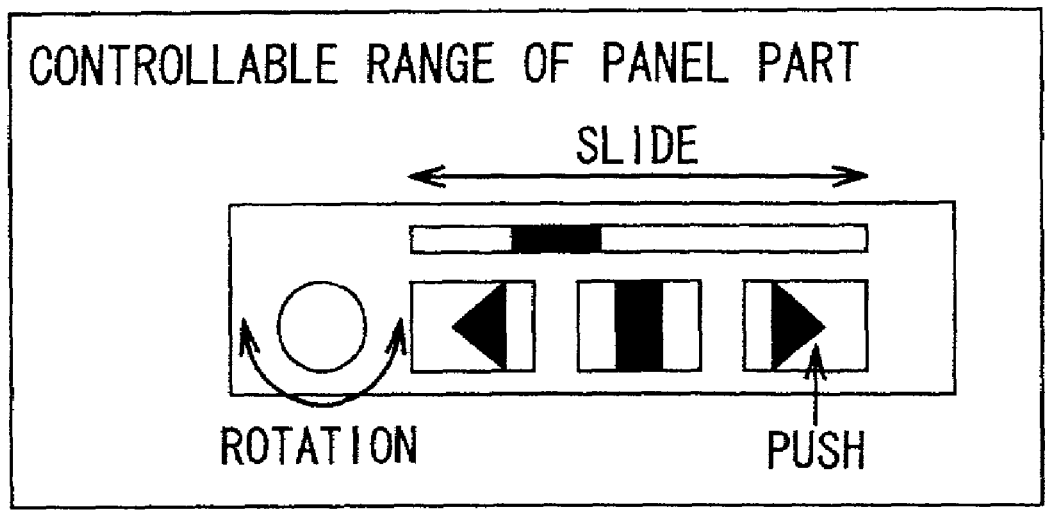
FIG. 2 illustrates an operational range of each of panel parts.

Appliance panel information acquired by the appliance panel information inputting means 12 of the GW apparatus 10 consists of information about panel parts of the home appliances 31 and 32 and information indicative of an operational range of the panel parts. The operational range is, as exemplified in FIG. 2, a slid range when the panel parts are slide parts, a rotated range when the panel parts are rotation parts, or an action of being pushed or not when the panel parts are push buttons. The appliance panel information inputting means 12 accepts appliance panel information notified by a home appliance connected to this remote control system and/or acquires appliance panel information by, for example, regularly searching each home appliance. And the inputting means is able to memorize the acquired appliance panel information. Instead of automatically acquiring the appliance panel information as above, the way that an operator manually inputs the appliance panel information can be adopted.

FIG. 3 exemplifies a table of the appliance panel information memorized by the appliance panel information inputting means 12. This table is set for every home appliance. In the table, described are the numbers of the sheets indicating panel parts, panel IDs identifying panel parts, display data of GUIs (graphical user interfaces) displayed on the sheets, contents of operations on the GUIs, commands produced by operations, operational ranges of the panel parts, and layout information about the display data on the sheets.

A plurality of sheets can be given to a single home appliance. A sheet may be arranged on another sheet. An area indicating the display data may be set on a sheet such that this area holds the layout information of the display data.

Figures 4, 5:
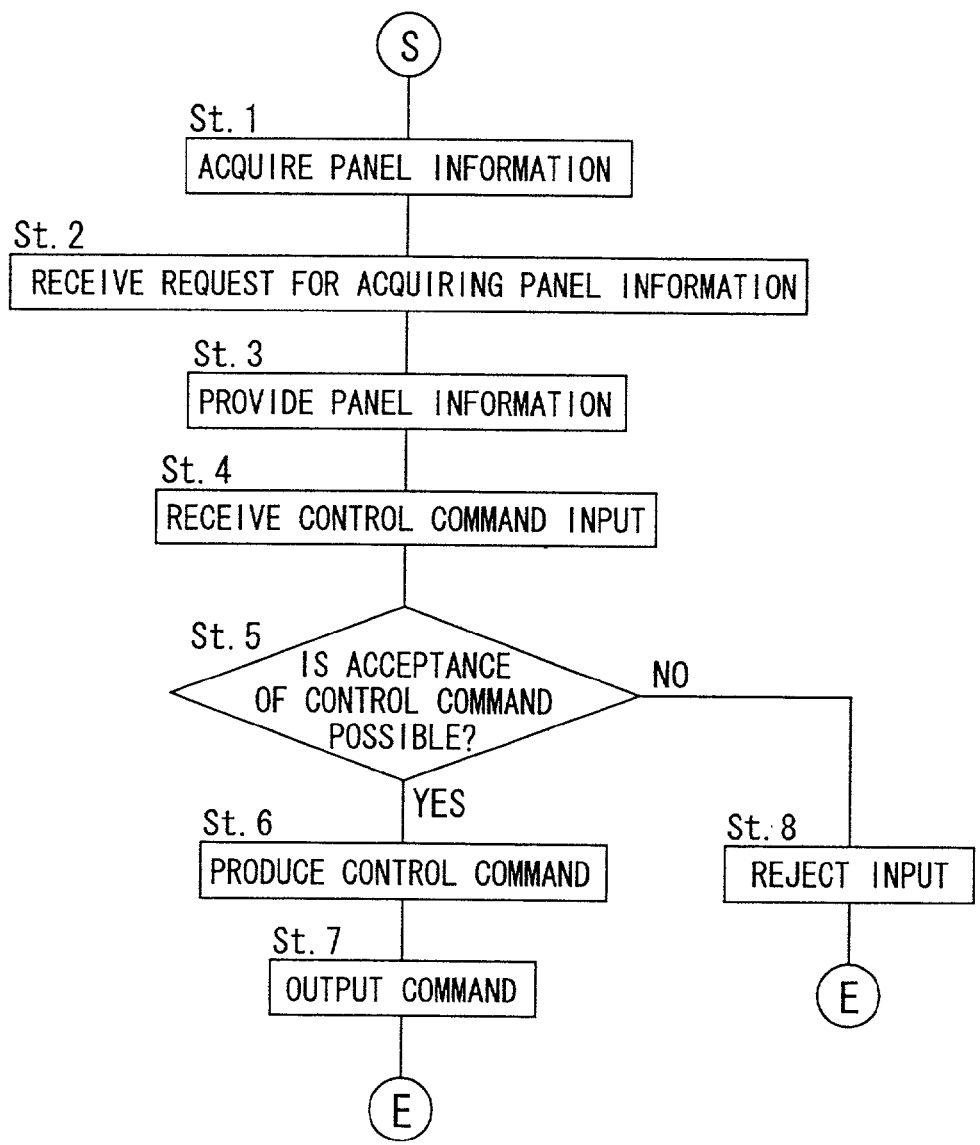
FIG. 4 illustrates GW apparatus information.
FIG. 5 is a flowchart showing the operation of the GW apparatus according to the first embodiment.

The GW apparatus information memorized by the GW apparatus information memorizing means 13 is information showing whether or not a control command inputted from the network 50 built outside the home is possible to be accepted. As illustrated in FIG. 4, a flag that represents either "possible" or "impossible" is the GW apparatus information. The GW apparatus information is inputted by an operator or other means.

FIG. 5 exemplifies a flowchart for operational procedures performed by the GW apparatus 10.

The GW apparatus 10 selects home appliances 31 and 32 in the home, and then acquires panel information from the selected home appliances to hold it in the appliance panel information inputting means (step 1).

In cases where there is a request for acquiring appliance panel information about a desired home appliance through the control device 60 or the outside network 50, the appliance control command producing means 11 in the GW apparatus 10 accepts it (step 2), and sends back to the request sender the appliance panel information about a specified home appliance, which is memorized by the appliance panel information inputting means 12 (step 3).

Figures 6, 7:
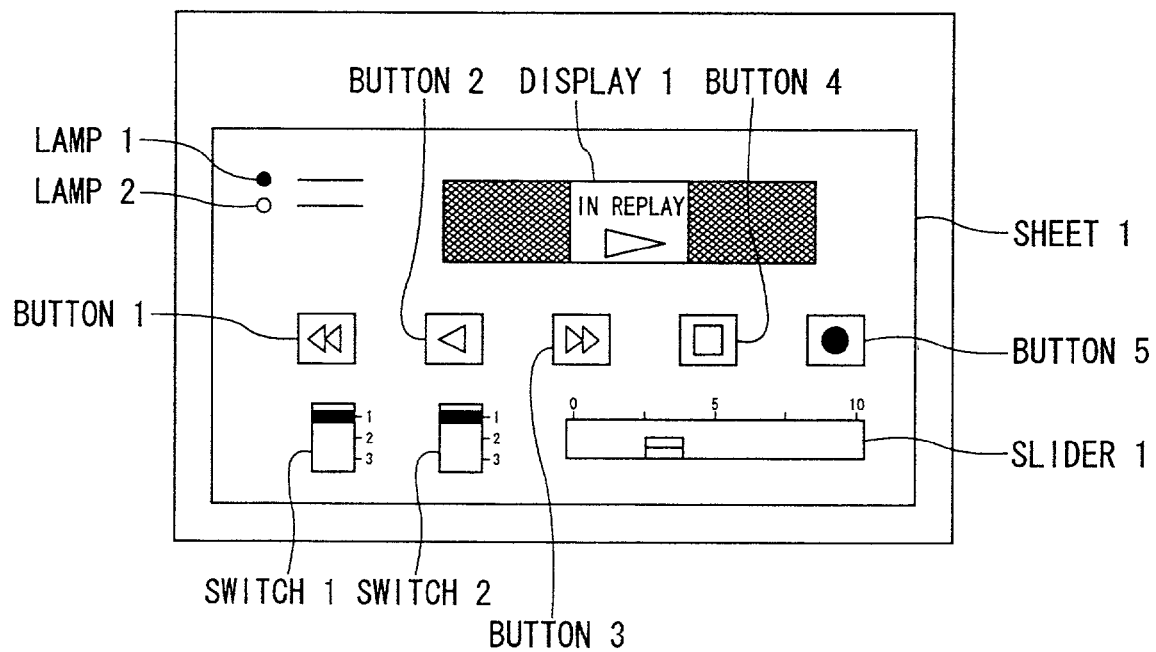
FIG. 6 shows an example of an acquisition input of panel information.
FIG. 7 exemplifies display on the screen of a control device.

FIG. 6 shows a panel information acquiring request to be received by the appliance control command producing means 11. This request includes the type of input showing that the acquisition of pane information is requested and an objective appliance showing a home appliance for which appliance panel information is requested.

When receiving the panel information acquiring request, the GW apparatus supplies to the request sender information about the appliance panel information table (FIG. 3) of a specified home appliance. On the screen of a monitor at the request sender, as exemplified in FIG. 7, a GUI illustrating panel parts which are present in the control panel of the specified home appliance is displayed, though some GUIs are shown in slightly different forms from the actual panel parts. A user operates the GUI on the screen, so that a control command that corresponds to the operation is sent to the GW apparatus 10.

When receiving an input of the control command toward the specified home appliance from the control device 60 or the outside network 50 (step 4), the appliance control command producing means 11 in the GW apparatus 10 determines if or not the control command is possible to be accepted on the basis of the GW apparatus information memorized by the GW apparatus information memorizing means 13.

In the case that the acceptance is impossible, the producing means rejects the control command (step 8). On the other hand, if the acceptance is possible, the appliance control command producing means 11 produces a control command (step 6), and the command outputting means 14 outputs the produced control command (step 7).

Figures 8, 9:
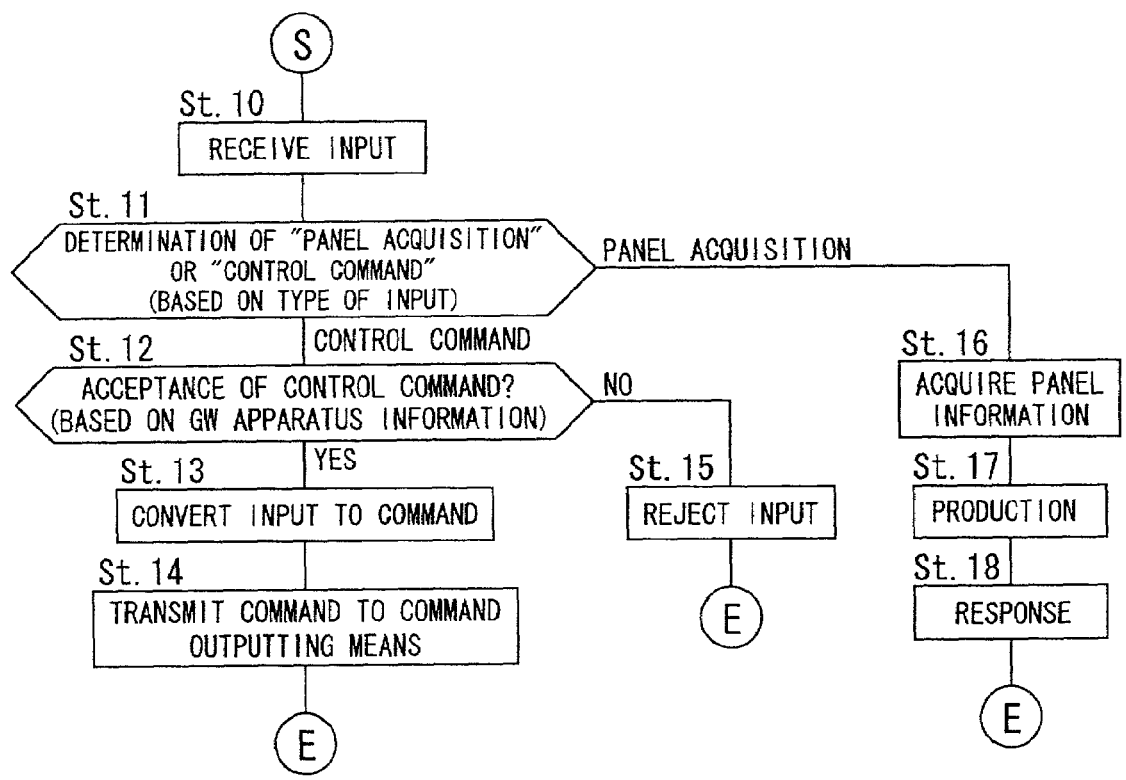
FIG. 8 shows an exemplary control command.
FIG. 9 is a flowchart showing the operation of appliance control command producing means according to the first embodiment.

FIG. 8 illustrates an exemplary input of the control command accepted by the appliance control command producing means 11. The control command includes the type of input showing that control is commanded, an objective appliance to be controlled, the ID of a control-requesting devise, a panel ID showing operated panel parts, and an operation content.

FIG. 9 is a flowchart showing operational procedures performed by the appliance control command producing means 11.

When receiving an input (step 10), the appliance control command producing means 11 determines, based on the type of the input, if the input is an acquisition request for appliance panel information or a control command (step 11). When the input is the acquisition request, the producing means 11 acquires necessary appliance panel information from the appliance panel information inputting means 12 (step 16), produces the appliance panel information (step 17), and transmits it to a request sender as a response (step 18).

In contrast, when the determination at step 11 is that the control command is inputted, the producing means 11 determines if or not the acceptance of the control command is possible on the basis of the GW apparatus information memorized by the GW apparatus information memorizing means 13 (step 12). If the acceptance is impossible, the control command is rejected (step 15). But if the acceptance is possible, the inputted control command is converted to a home appliance controlling command by making reference to the appliance panel information table (step 13), then sends it to the command outputting means 14 (step 14).

On receiving the control command from the appliance control command producing means 11, the command outputting means 14 performs a format conversion of the command, if needed, and then outputs it to the specified home appliance by way of the home network 30. In addition, the command outputting means 14 converts the control command to an adaptable form directed to desired output devices such as a monitor and a printer, and outputs its converted one to such devices. Such outputs of the produced control command to various output devices permit the GW apparatus to be used in a variety of modes.

As described above, the present system uses the GW apparatus that serves as a mediator converting GUI information in relation to home appliances. This makes it possible that home appliances connected to the home network are controlled from a distance through the Internet, in a similar operation feeling to operations done at the home.

In addition, the present system can be used such that home appliances are remote-controlled from mobile terminals, such as a cellular phone, PDA, or notebook type of PC, through the Internet.

The GW apparatus can be used as a central controller in a factory or an office, in which, through the keyboard of the GW apparatus, a request for panel information about appliances, such as air conditioners, lighting fixtures, and doors, is issued to monitor the present status of the panel of each appliance on a monitor, or a command is issued to control the operation of air conditioners, the turning lighting fixtures on or off, the open/close of doors, and others.

Further, control commands issued from the GW apparatus can be printed by a printer to utilize them as an access log. Control contents for home appliances printed by a printer of the GW apparatus can be used as an operation manual for maintenance service, so that the same type of home appliance is able to be maintained according to this operation manual.

(Second Embodiment)

In a second embodiment of the present invention, a remote system in which a remote control can be used to control home appliances at the home, in addition to the remote control from outside the house, will now be described.

Figure 10:
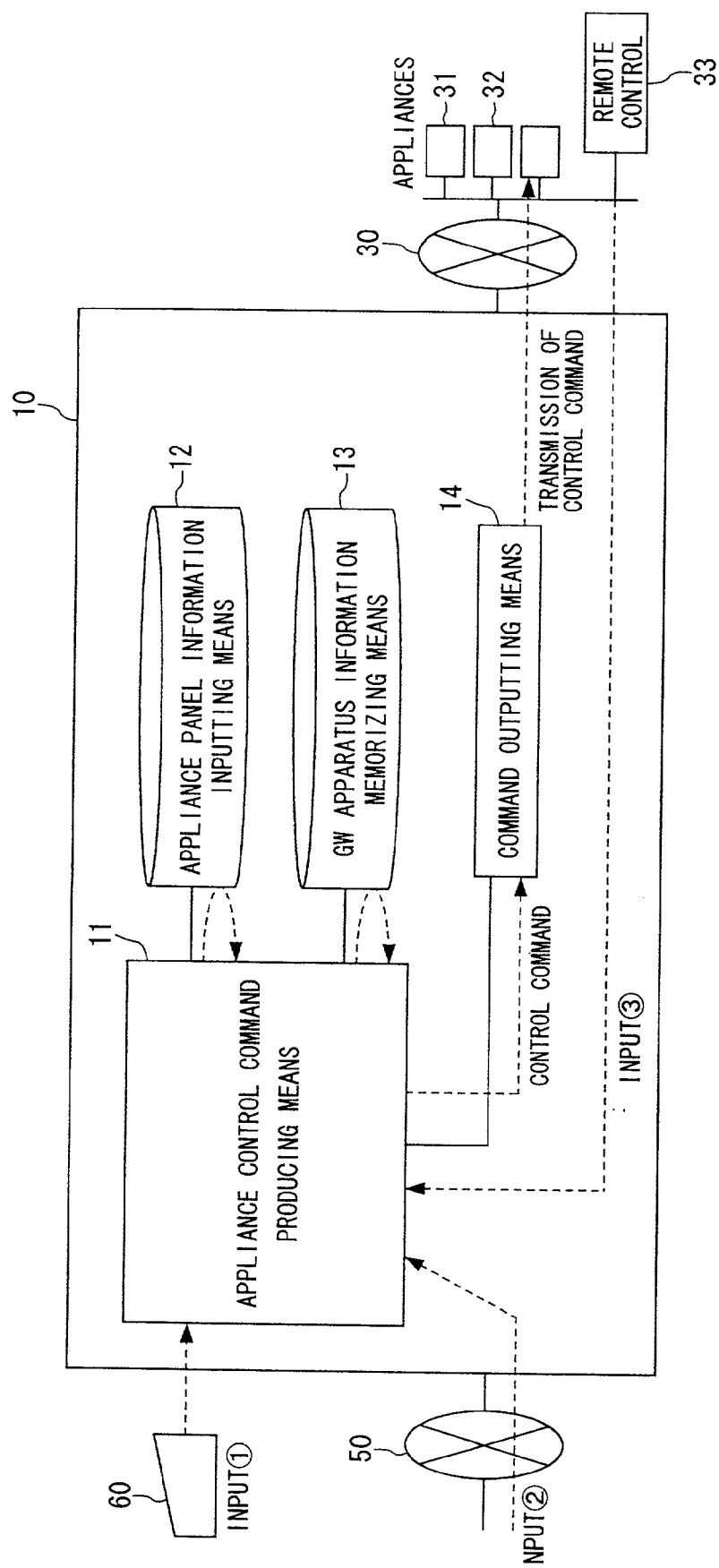
FIG. 10 is a block diagram showing the configuration of a GW apparatus according to a second embodiment.

In the system according to the first embodiment, direct control of home appliances through a remote control may cause a conflict with the remote control from outside the house. In order to remove this inconvenience, the system of the second embodiment adopts a configuration shown in FIG. 10. That is, a control command from a remote control 33 is inputted to the appliance control command producing means 11 of the GW apparatus 10 via the home network 30. Based on the input indicative of the control command from the remote control 33, the appliance control command producing means 11 produces a command for a home appliance. The remaining configurations are identical to those in the first embodiment (FIG. 1).

The appliance control command producing means 11 accepts from the remote control 33 a control command input similar to that in FIG. 8.

Figure 11:
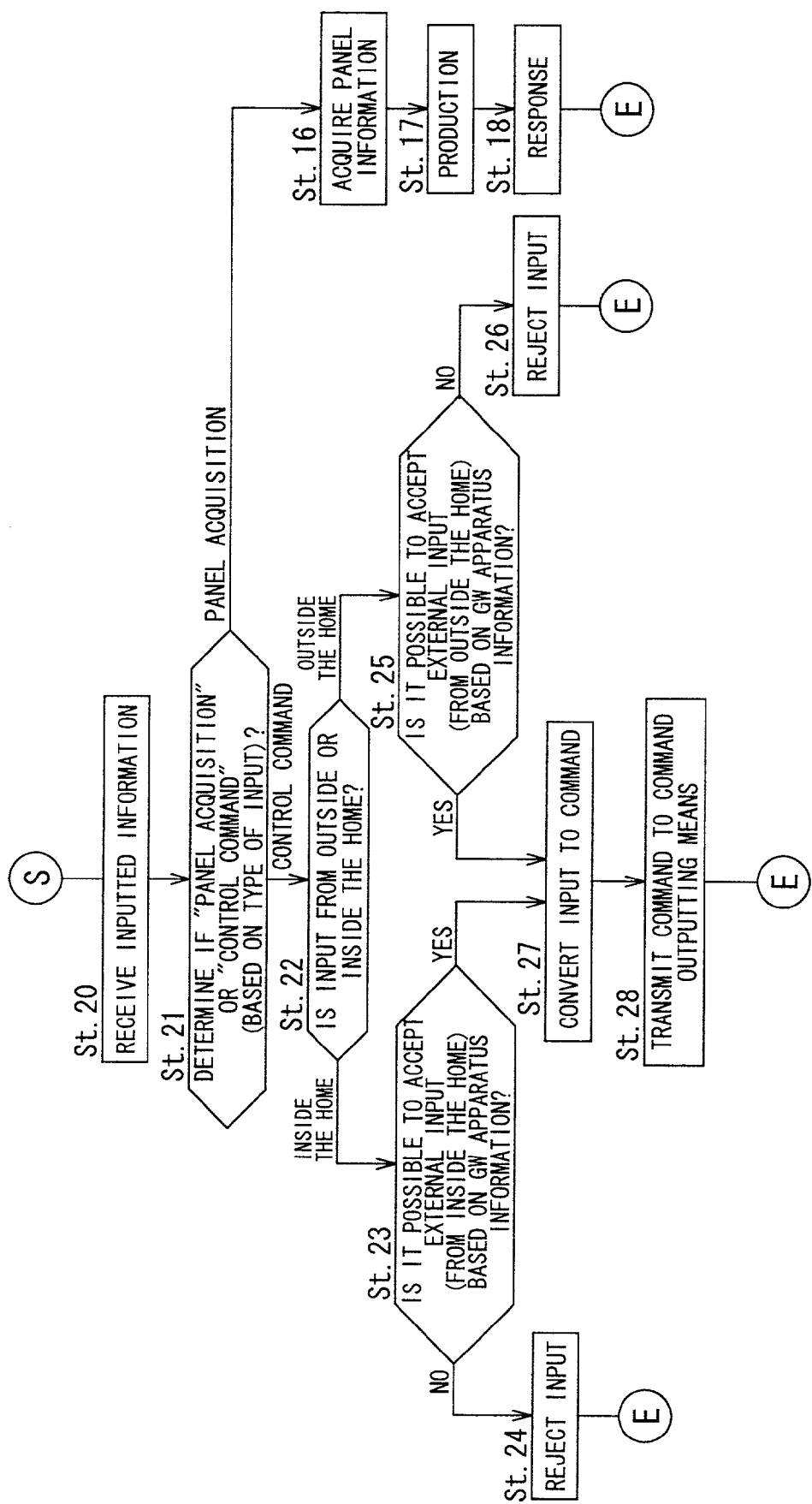
FIG. 11 is a flowchart showing the operation of appliance control command producing means according to the second embodiment.

FIG. 11 is a flowchart showing operational procedures performed by the appliance control command producing means 11.

Practically, when the appliance control command producing means 11 receives an input (step 20), the means 11 determines if the input is an acquisition request for appliance panel information or a control command (step 21). If it is determined that the input is the acquisition request, the means 11 performs processing in the similar manner to steps 16 to 18 in FIG. 9.

When it is determined at step 21 that the input is the control command, it is further determined if the input has been received from inside the home or from outside the home (step 22). If the input has been received from inside the home, the determination whether or not it is possible to accept the external input from inside the home is made based on the GW apparatus information memorized in the GW apparatus information memorizing means 13 (step 23). At this determination, if it is impossible to accept the input, the input is rejected (step 24).

By contrast, when the input is possible to be accepted, the control command input is converted to a command for controlling a home appliance by making reference to the appliance panel information table (step 27), then transmitted to the command outputting means 14 (step 28).

On the other hand, when it is determined at step 22 that the input is from outside the home, it is further determined if the external input from outside the home is possible to be accepted or not on the basis of the GW apparatus information memorized by the GW apparatus information memorizing means 13 (step 25). If it is determined that acceptance of such external input is impossible, the input is rejected (step 26). But it is possible to accept such external input, the control command input is converted to a command for controlling a home appliance by making reference to the appliance panel information table (step 27), then transmitted to the command outputting means 14 (step 28).

FIG. 12A illustrates pieces of exemplary GW apparatus information memorized by the GW apparatus information memorizing means 13.

In the system in which the GW apparatus information is set as in FIG. 12B, control on the remote control at the home can be processed in the similar manner to the remote control issued from outside the home. In cases where operations are directed from outside and inside the home to the same home appliance, an operational conflict can be avoided so that priority is given to an operation issued from inside the home.

Moreover, in the present system, the control command from the remote control is sent to the GW apparatus in which the control commands to the home appliance can be integrated to one command to be provided though the GW apparatus. Accordingly, a conflict of control commands between the remote control and the Internet is avoided. However, in cases where a user operates a front panel of a home appliance to control it, a conflict may occur between such direct operation to the front panel and an operation through the Internet.

However, such conflict can be avoided by a configuration in which a control command issued from a home appliance of which front panel is operated is sent to the appliance control command producing means 11 of the GW apparatus though the home network 30, not directly to the drive of the appliance. In the configuration, the appliance control command producing means operates in a manner similar to that in FIG. 11, in which a control command sent from the front panel of a home appliance will be returned to the drive of the home appliance.

In this way, a home appliance is configured such that the destination of a control command issued in response to an operation on the front panel thereof is switched over between the drive of the appliance and the GW apparatus by way of the home network. And the GW apparatus is configured so that it sends a control command back to the home appliance, when the home appliance sends the control command to the GW apparatus. This makes it possible to integrate control commands issued responsively to both the front panel of the home appliance and the remote control to that passing the GW apparatus. Accordingly, all possible conflicts of control commands to the home appliance can be prevented.

(Third Embodiment)

In a third embodiment of the present invention, the GW apparatus is able to detect the newest state of each home appliance.

Figure 13:
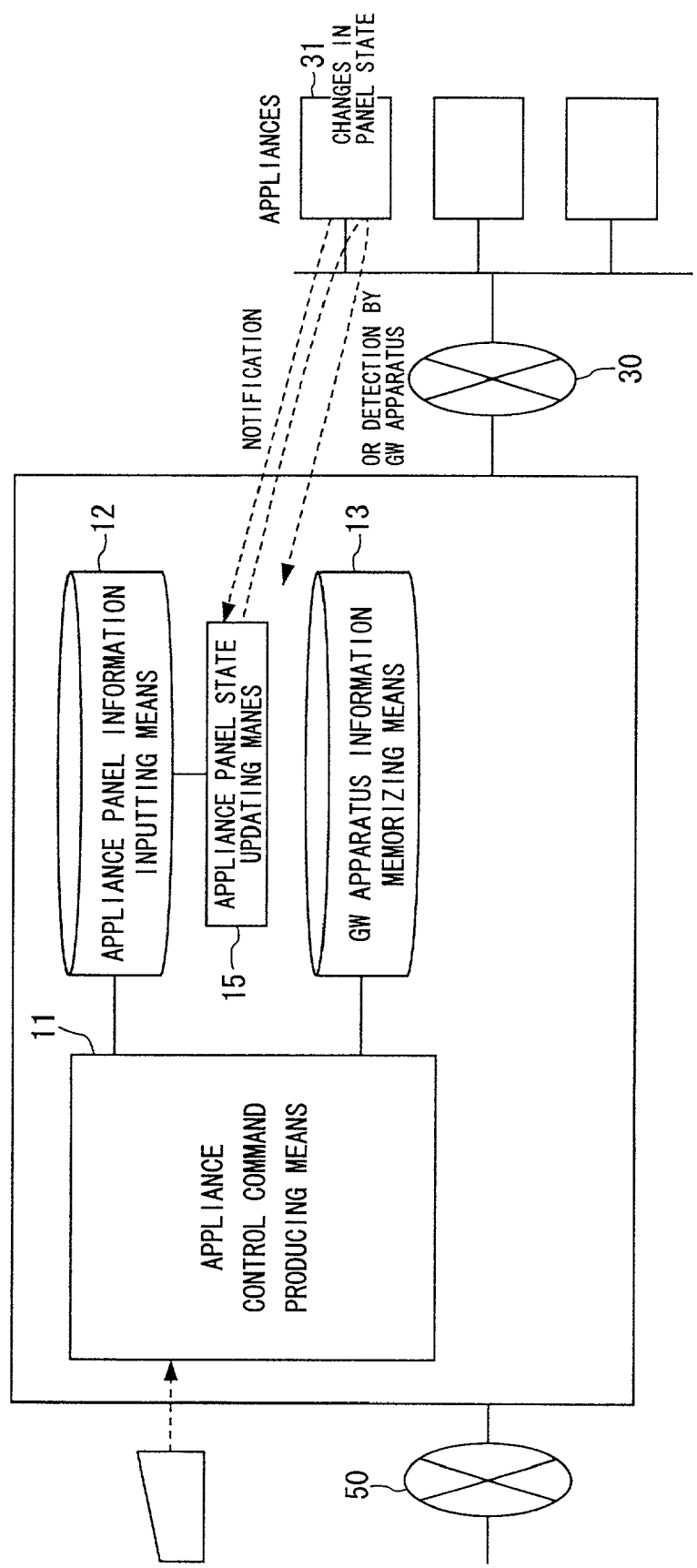
FIG. 13 is a block diagram showing the configuration of a GW apparatus according to a third embodiment.

This GW apparatus is, as shown in FIG. 13, equipped with appliance panel state updating means 15 for detecting the newest state of each home appliance to update its appliance panel information. Additionally, the appliance panel information table stored by the appliance panel information inputting means 12 additionally includes, as shown in FIG. 14, the item of a current state of each of panel parts. The remaining construction is identical to that in the first embodiment (FIG. 1).

Figures 15, 16:
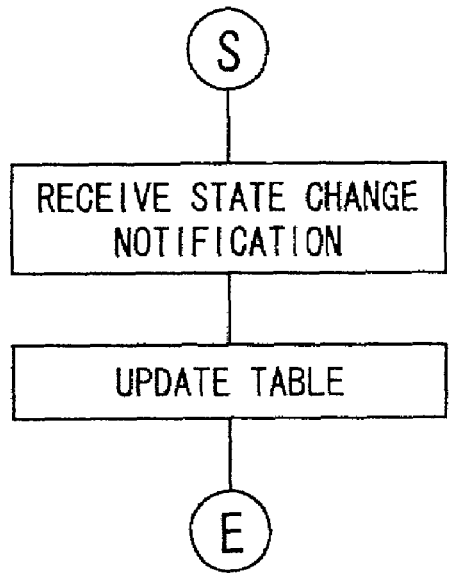
FIG. 15 is a flowchart showing the operation of appliance panel state updating means.
FIG. 16 illustrates a format notifying a change in state.

As shown in FIG. 15, the appliance panel state updating means 15 receives a state change notification (in which a state of each appliance is described) sent from each home appliance, and updates the current state preserved by the appliance panel information table. FIG. 16 shows a format of this state change notification, which includes the type of notification revealing that this is a state change notification, the name of each home appliance, the panel ID of each of panel parts, the new and old states of each of panel parts.

Figure 17:
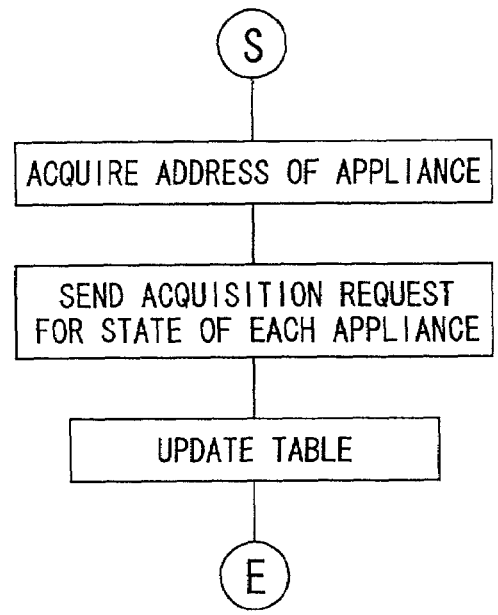
FIG. 17 is a flowchart showing another operation of the appliance panel state updating means.

Moreover, as shown in FIG. 17, the appliance panel state updating means 15 acquires an address of each home appliance, sends a request for acquiring the state to each home appliance, and updates the current state in the appliance panel information table based on the state change notification received from each home appliance.

This permits the GW apparatus 10 to detect the newest state of each home appliance. Accordingly, the GW apparatus is able to provide the newest panel state at any time, in response to an acquisition request for appliance panel information which is issued from either the control device 60 or a remote control device connected to the Internet.

Figure 18:
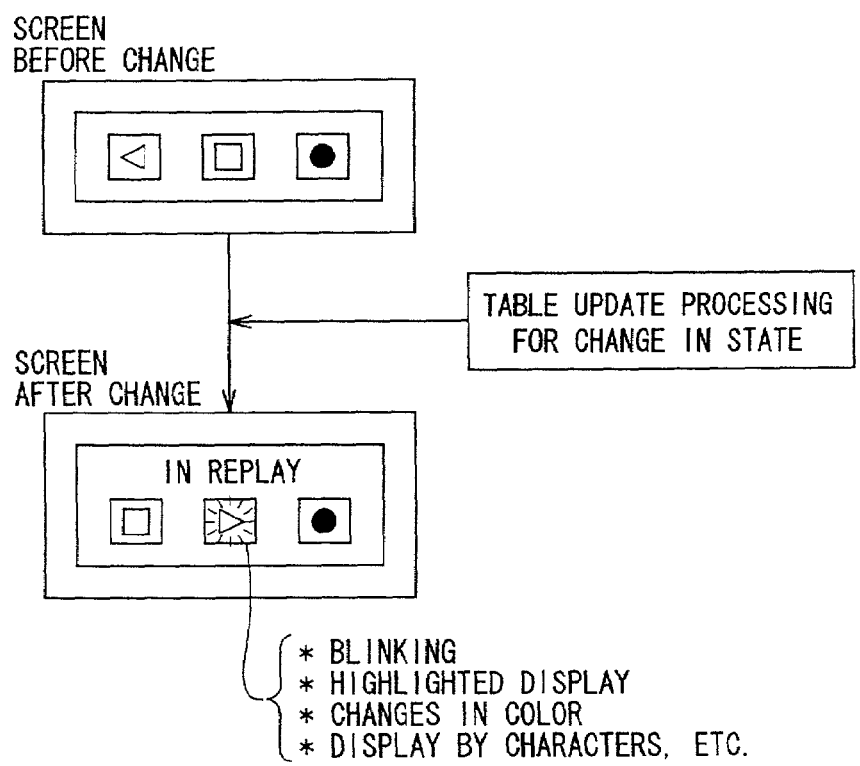
FIG. 18 shows a change in the screen obtained when the state changes.

FIG. 18 illustrates changes in images displayed on the screen of a control device that has acquired appliance panel information in association with the update of the current state preserved by the appliance panel information. This example shows changes caused when a replay operation is selected in locally operating a VTR (i.e., operations on the control panel of the VTR). The screen of the control device that has acquired the updated appliance panel information displays that a replay button is in a replay state. A modification is that panel parts of which states have changed may be made distinctive by blinking, highlighted display, changes in color, display by characters expressing the changes.

As a result, the newest panel states of home appliances are provided anytime to directly connected control devices or remote control devices. No discrepancies occur between the panel states of such control devices and the actual states of home appliances, which reduces errors in control commands to be issued from the control devices.

(Fourth Embodiment)

In a fourth embodiment of the present invention, there is provided a GW system capable of providing GW service list information to a remote control device connected to a network found outside the home. The GW service list information is provided in a format that can be utilized by the remote control device.

Figure 19:
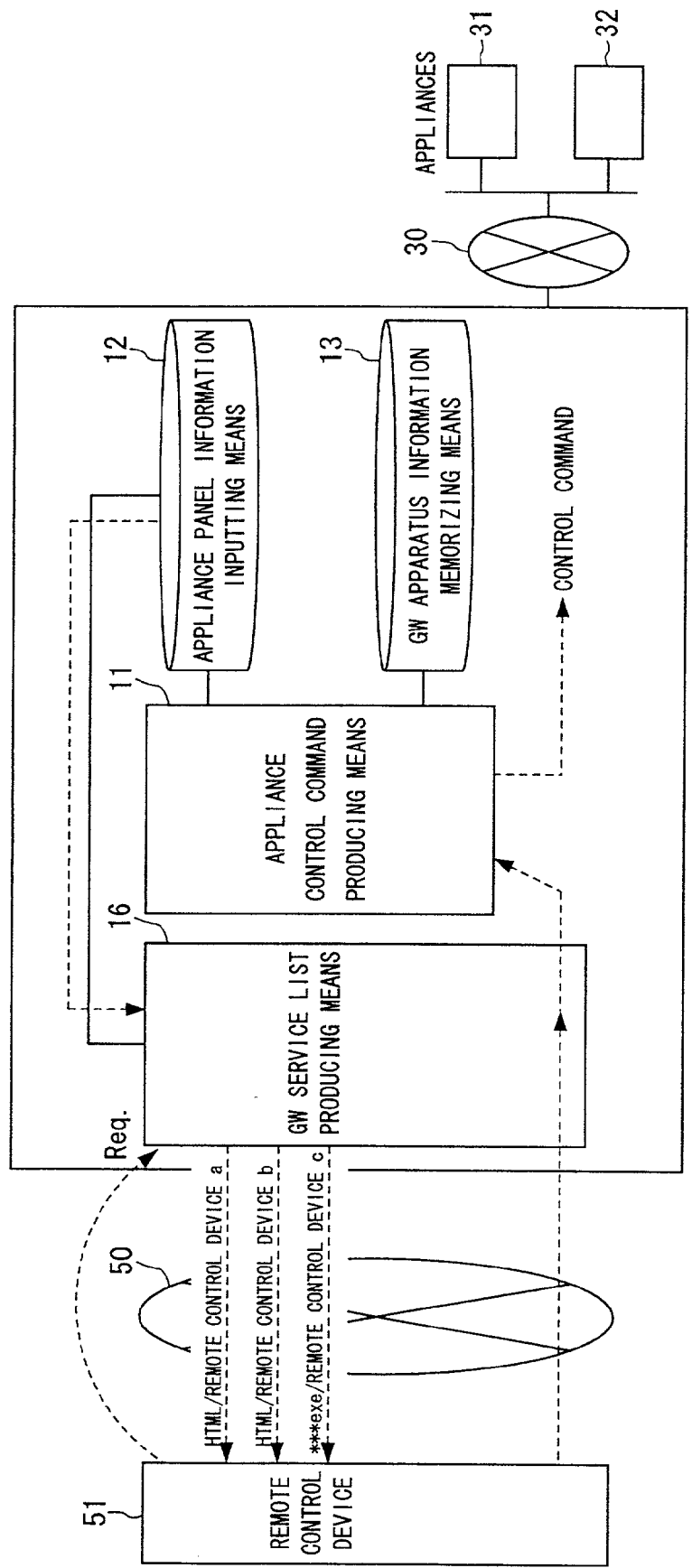
FIG. 19 is a block diagram showing the configuration of a GW apparatus according to a fourth embodiment.

A system shown in FIG. 19 includes GW service list producing means 16 capable of providing the GW service list information to a remote control device 51 connected to the network 50 found outside the home. The remaining is constructed in the similar manner to the first embodiment (FIG. 1).

Figures 20, 21:
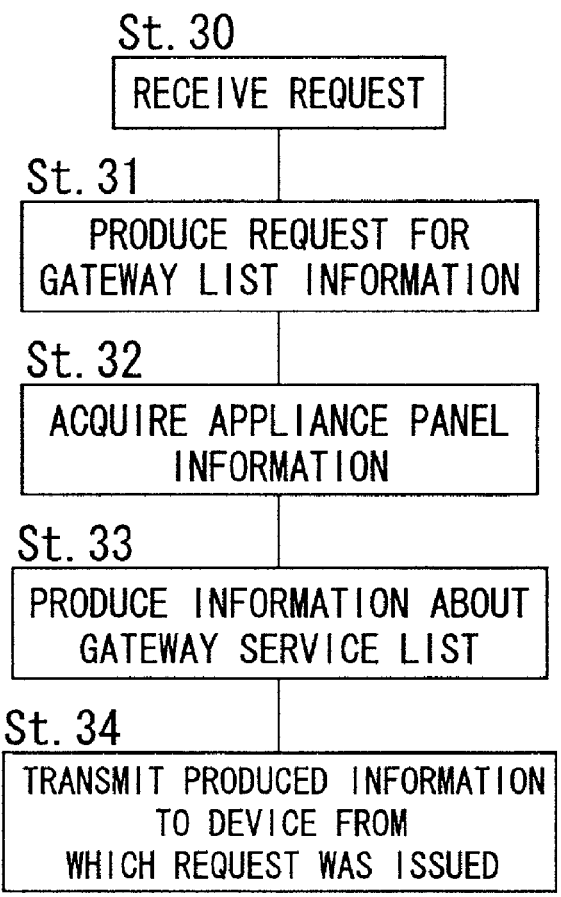
FIG. 20 illustrates a request for acquiring a GW service list.
FIG. 21 is a flowchart showing the operation of GW service list producing means.

The remote control device 51 sends, to the appliance control command producing means of the GW apparatus 10, a request for acquiring a gateway service list shown in FIG. 20. The acquisition request for the gateway service list includes the ID of the remote control device, i.e., a request sender, and information indicating that a service list is requested.

In the GW apparatus 10, as shown in FIG. 21, the appliance control command producing means 11 receives an acquisition request for a gateway service list (step 30), and then requests that the GW service list producing means 16 produce gateway list information (step 31).

Responsively to this, the GW service list producing means 16 acquires appliance panel information from the appliance panel information inputting means 12 (step 32) to produce the gateway service list information based on the appliance panel information (step 33). Alternatively, this gateway service list information may be produced in advance and preserved for actual use.

In cases the remote control device 51 is equipped with a GUI as a universal tool, the GW service list producing means 16 is able to produce information about a produce gateway service list shown in FIG. 23 by using appliance panel information illustrated in FIG. 22.

The GW service list producing means 16 transmits the produced information about the gateway service list to the remote control device 51 (i.e., the request sender) (step 34).

On receiving this information about the gateway service list, the remote control device 51 performs a process on the information so as to produce a display screen shown by FIG. 24, for example.

As a result, providing the information about the gateway service list to the control device connected to the network 50 found outside the home enables the control device to be a remote control device that has a capability of remote-controlling home appliances.

Figures 25, 26:
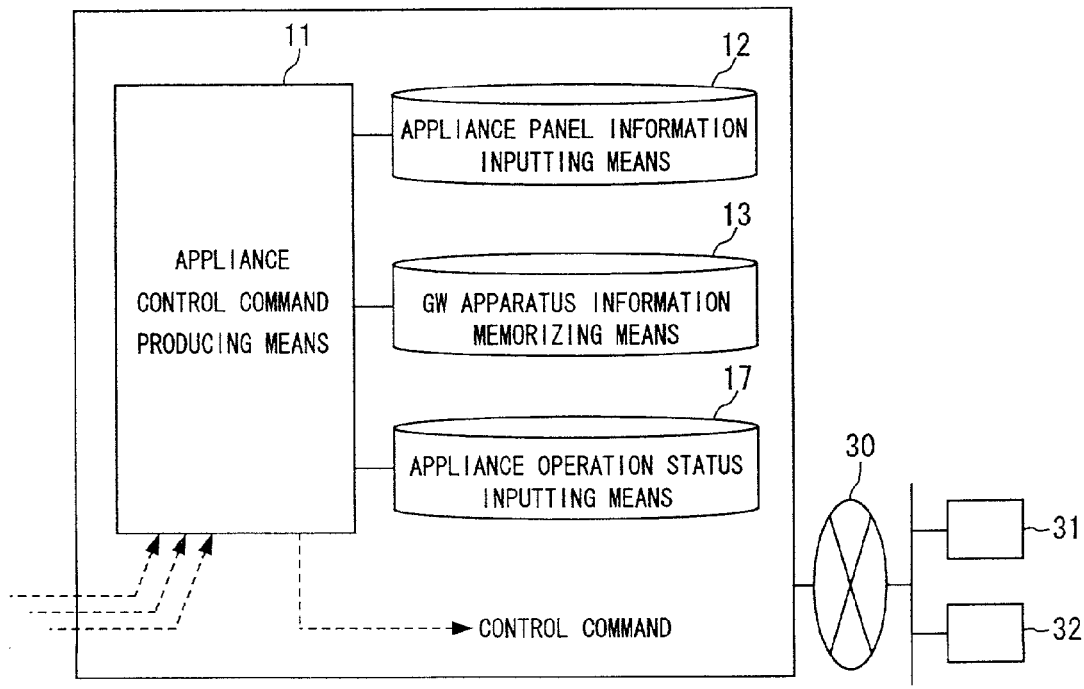
FIG. 25 illustrates GW service list information for a terminal connecting to the Internet.
FIG. 26 is a block diagram showing the configuration of a GW apparatus according to a fifth embodiment.

In the case that the control device 51 is connected with the GW apparatus 10 via the Internet, through processing carried out at step 33 in FIG. 21, the GW service list producing means 16 uses the appliance panel information so as to produce gateway service list information that is compatible to connections to the Internet. Thus, browser displaying data are produced correspondingly to types of tag sets (for example, HTML, XML, VML, JavaScript, style sheet, or others) supported by browsers installed in control devices, or, a program is produced correspondingly to the type of a virtual machine (for example, an applet, servlet, and others). FIG. 25 shows an example of the gateway service list information produced using HTML display data. As a modification, this gateway service list information may previously be produced and preserved.

Thus it is possible that the gateway service list information can be provided to control devices connected to the GW apparatus via the Internet. The control devices can therefore be used as remote control devices for each home appliances.

(Fifth Embodiment)

A fifth embodiment of the present invention provides a system that has a function that removes invalid control commands issued from remote control devices to home appliances.

The GW apparatus shown in FIG. 26 has appliance operation status inputting means 17 for memorizing an operated status of each home appliance. The remaining is similar in construction to the first embodiment (FIG. 1).

Figure 27:
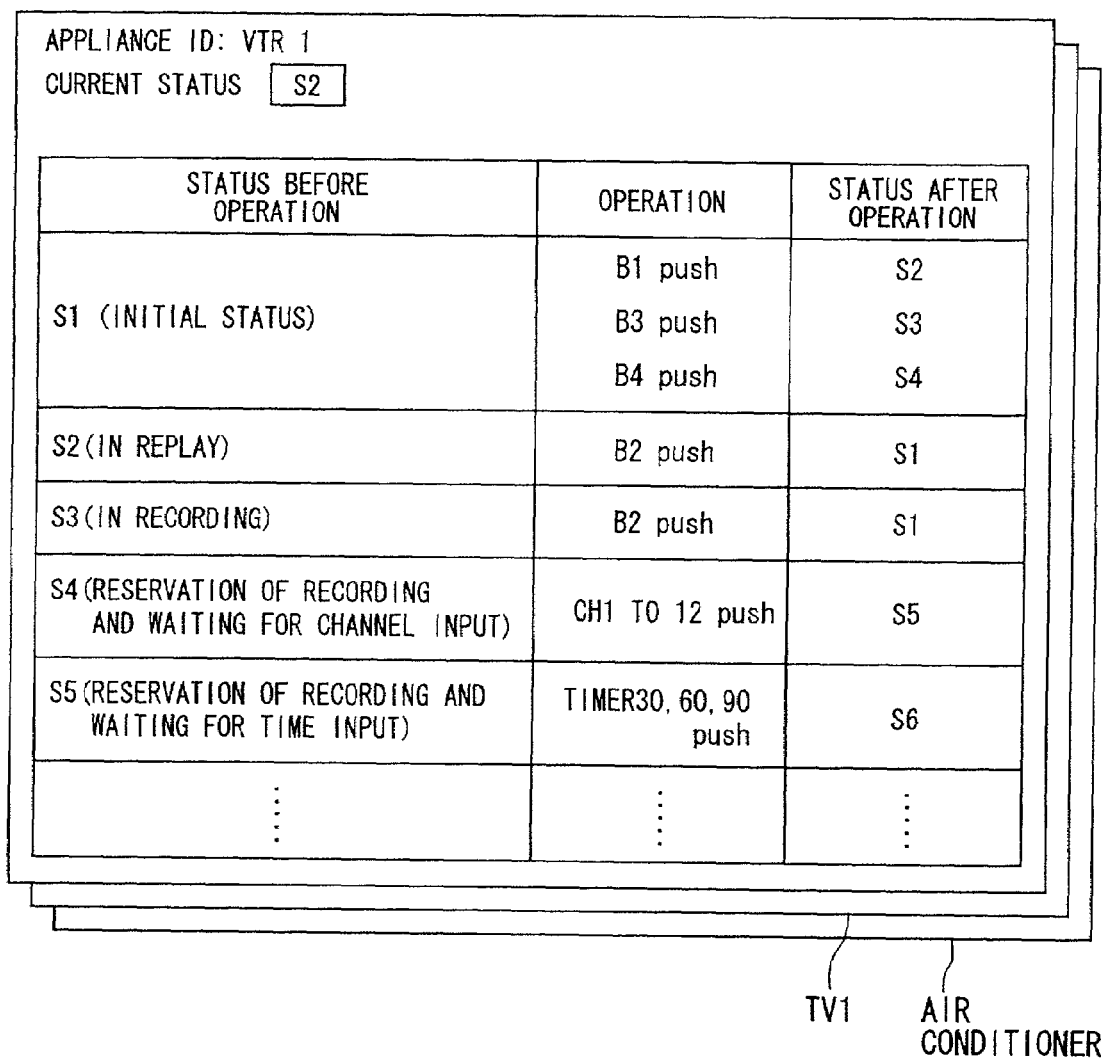
FIG. 27 illustrates appliance operation status information.

FIG. 27 illustrates information about appliance operation statuses memorized by the appliance operation status inputting means 17. In this appliance operation status information, how the statuses change responsively to operations onto panel parts is described and the current status is also described. For instance, pushing a button B2 allows the current status S2 (in replay) to transit to the initial state S1.

Figure 28:
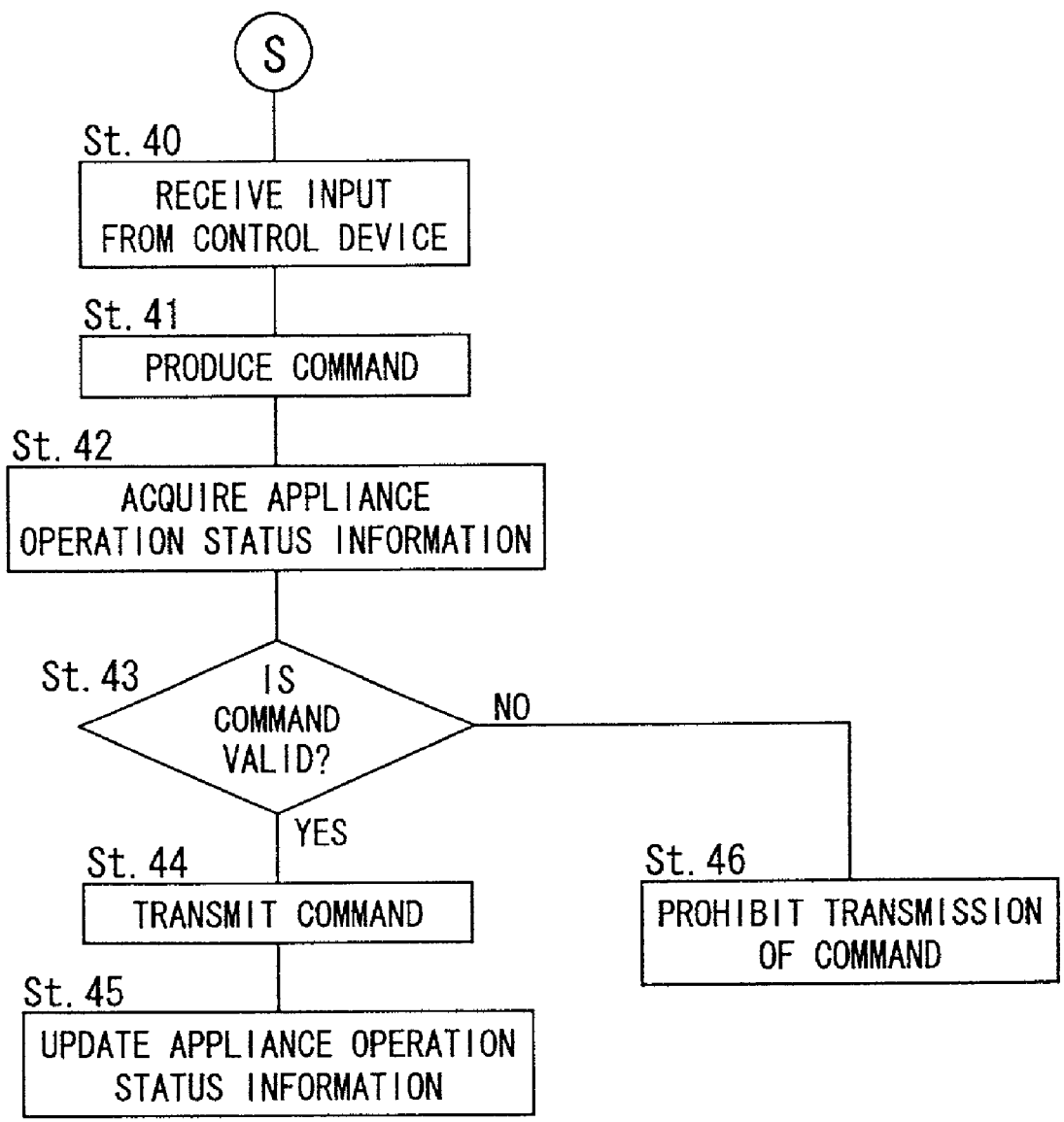
FIG. 28 is a flowchart showing the operation of appliance control command producing means of the fifth embodiment.

FIG. 28 shows procedures carried out by the GW apparatus when a remote control device sends a control command to home appliances.

When receiving input information about a control command from the remote control device (step 40), the appliance control command producing means 11 acquires not only appliance panel information from the appliance panel information inputting means 12 but also GW apparatus information from the GW apparatus information memorizing means 13, and then produces a control command based on the acquired and received information (step 41).

Then the appliance control command producing means 11 acquires appliance operation status information from the appliance operation status inputting means 17(step 42), and determines if the control command is valid or not (step 43) through comparison between the input information and the appliance operated state information. In other words, it is determined whether or not the next status commanded by the control command is allowed to transit from the current status.

If the command is valid, the appliance control command producing means 11 transmits the produced command to a certain home appliance (step 44), then updates the current status in the appliance operated state information (step 45).

In contrast, unless it is determined at step 43 that the command is valid, the produced control command will be prohibited from being transmitted (step 44).

Figure 29:
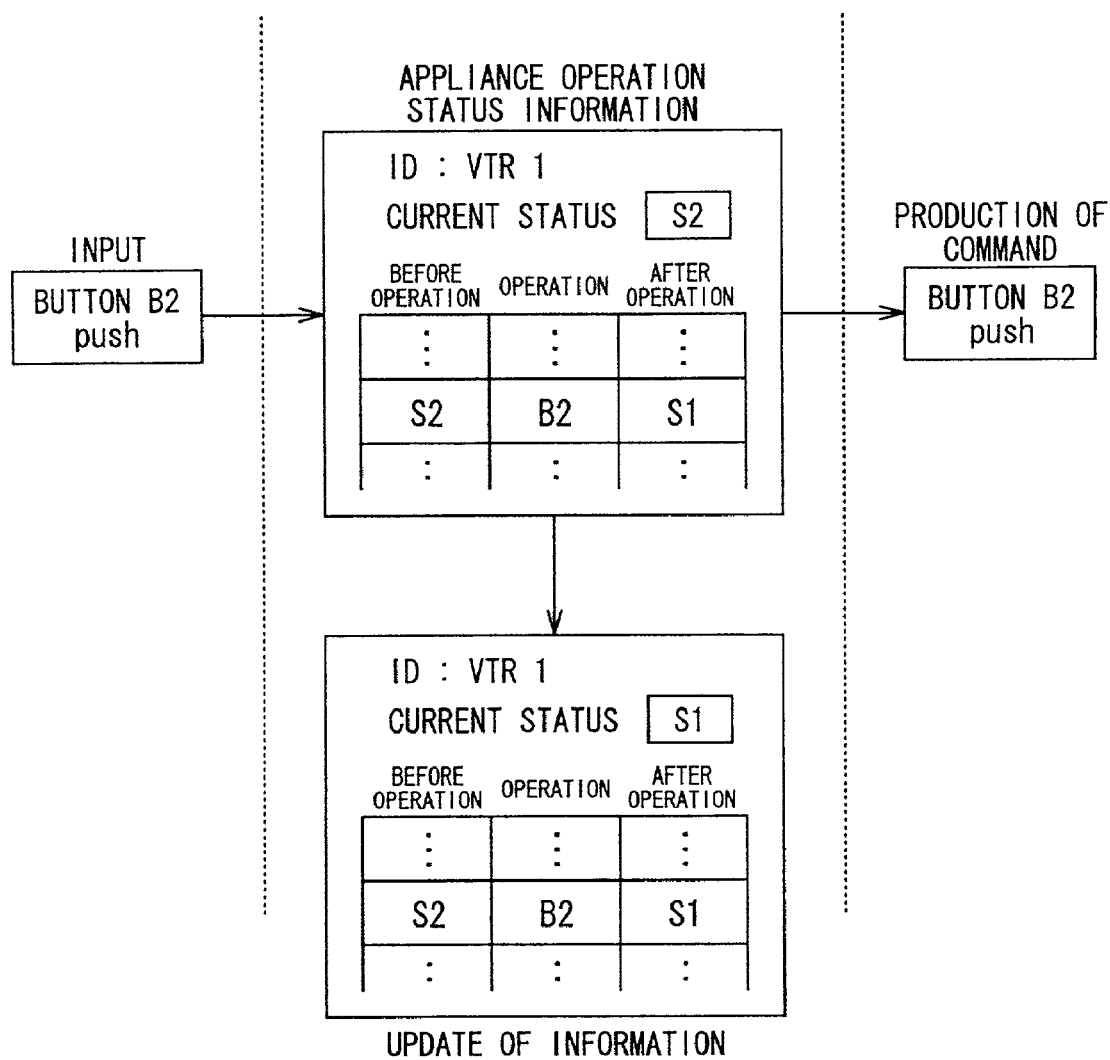
FIG. 29 exemplifies the processing for producing and determining a command based on the appliance operation status information.

FIG. 29 shows changes in the appliance operated state information, in which a control command to push the button B2 has newly been inputted in the appliance operation status represented in FIG. 27. This control command is valid, so that the "current status" included in the appliance operation status information has been updated to a new status S1 realized when the button B2 is pushed.

According to the GW apparatus, the control commands produced in replay to input from control devices are subjected to determining if the command is valid or not, based on types and statuses of home appliances. This determination prevents invalid commands from being transmitted to home appliances. It is therefore unnecessary for each home appliance to have means for performing processing to determine the validity of control commands.

(Sixth Embodiment)

A sixth embodiment of the present invention provides a GW system that has the capability of avoiding a certain control device from interrupting another control device in operation for remote control.

Figure 30:
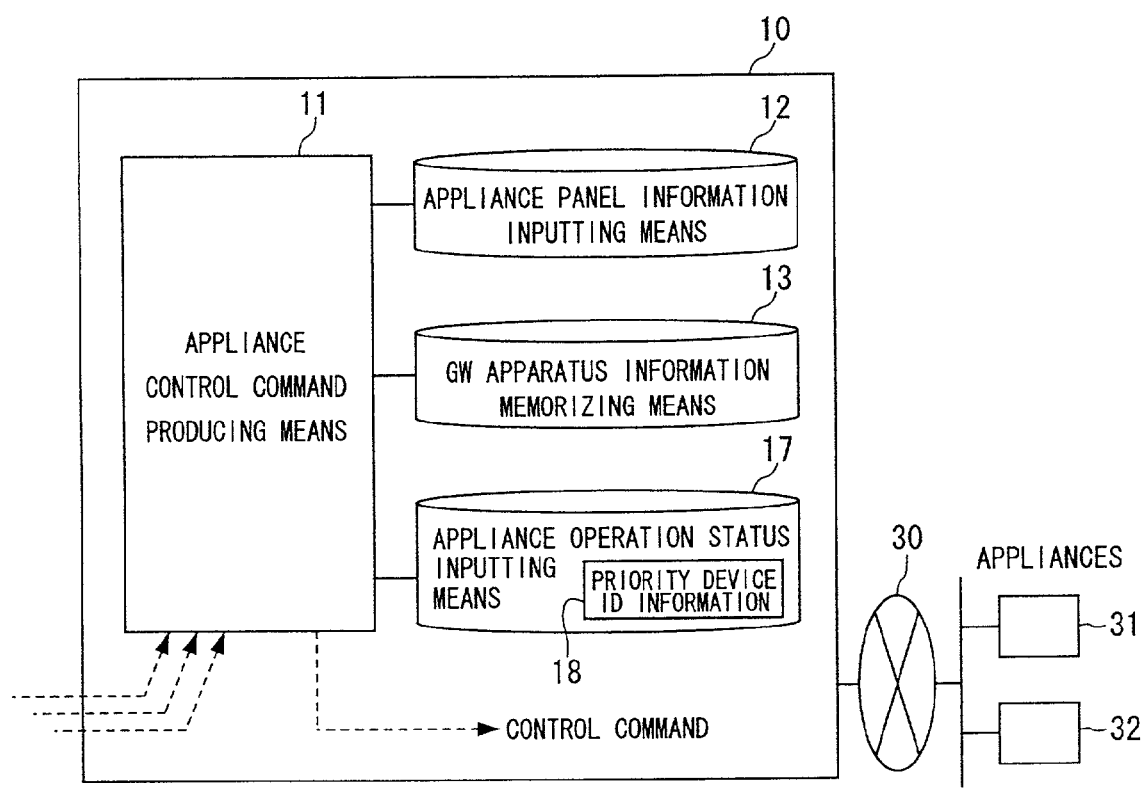
FIG. 30 is a block diagram showing the configuration of a GW apparatus according to a sixth embodiment.

The GW apparatus includes, as shown in FIG. 30, appliance operation status inputting means 17 that stores therein appliance operation status information. This information includes ID information about priority devices that should be controlled in preference to others. The remaining construction is the same as that in the fifth embodiment (FIG. 26).

The appliance operation status information differs from that used in the fifth embodiment (FIG. 27) in that, as shown in FIG. 31, the information has a priority device ID described in a given column and a continued operation status indicated by an asterisk "*." The continued operation status shows a waiting status for the next operation to be continued, as represented by S4* (reservation of recording and waiting for channel input) and S5* (reservation of recording and waiting for time input). In the case that the current status of a certain home appliance is assigned to a continued operation status, a control device that performed such an operation is memorized as a priority device. After this memorization, commands will be produced only for continuous operation inputs issued by this control device.

Figure 32:
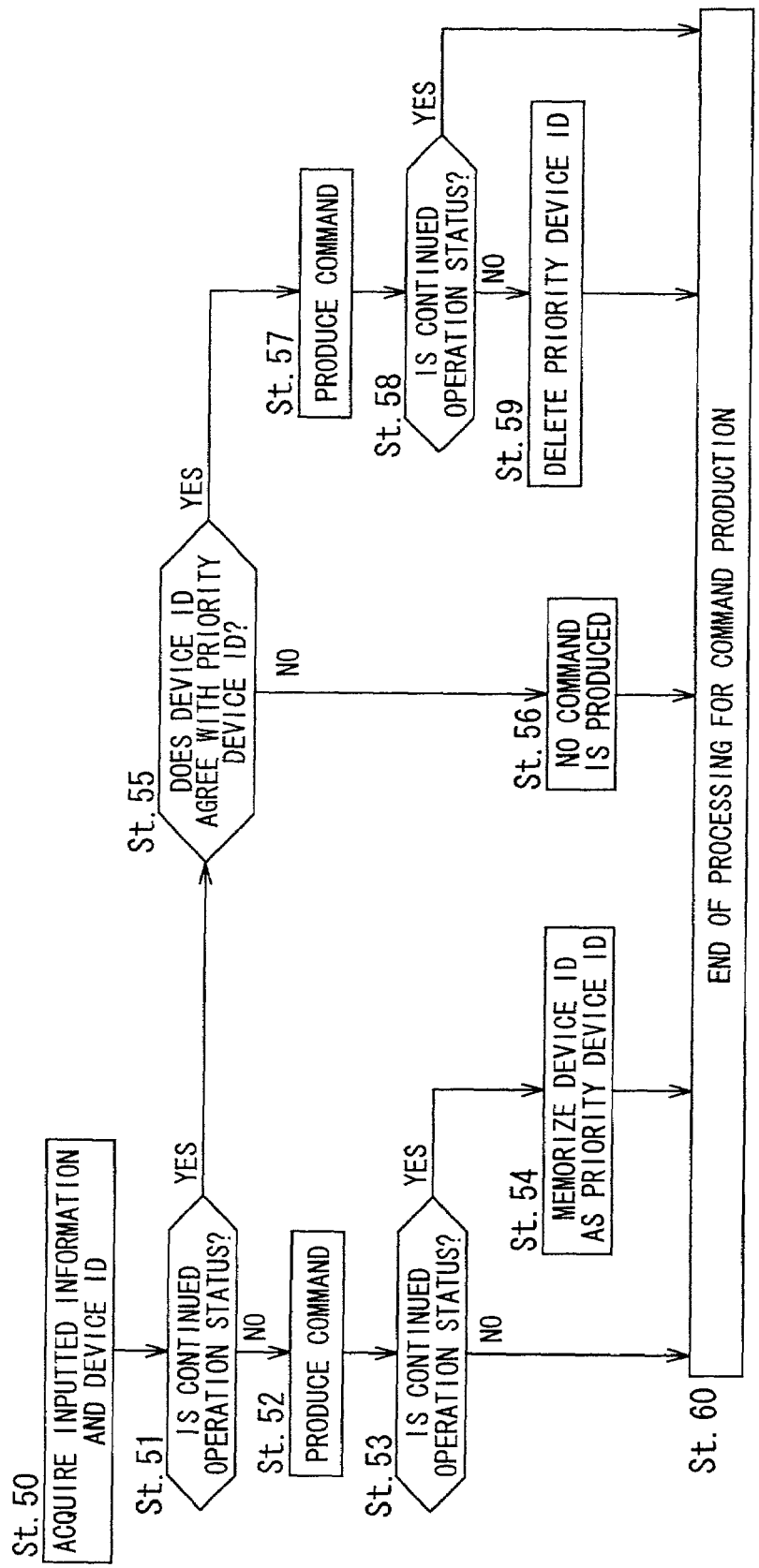
FIG. 32 is a flowchart showing processing for producing and determining a command in the sixth embodiment.

A flowchart in FIG. 32 shows the operation of the GW apparatus 10.

Practically, the appliance control command producing means 11 acquires inputted information about a control command from a certain control device and a control device ID indicative of the control device (step 50).

Then, when the current status shown by the appliance operated state information does not correspond to a continued operation status (step 51), a command is produced, together with determination of validity of the command, on the basis of the inputted information, appliance panel information, GW apparatus information, and appliance operated state information (step 52: the similar processing to steps 41 to 46 in FIG. 28).

Figures 33, 34:
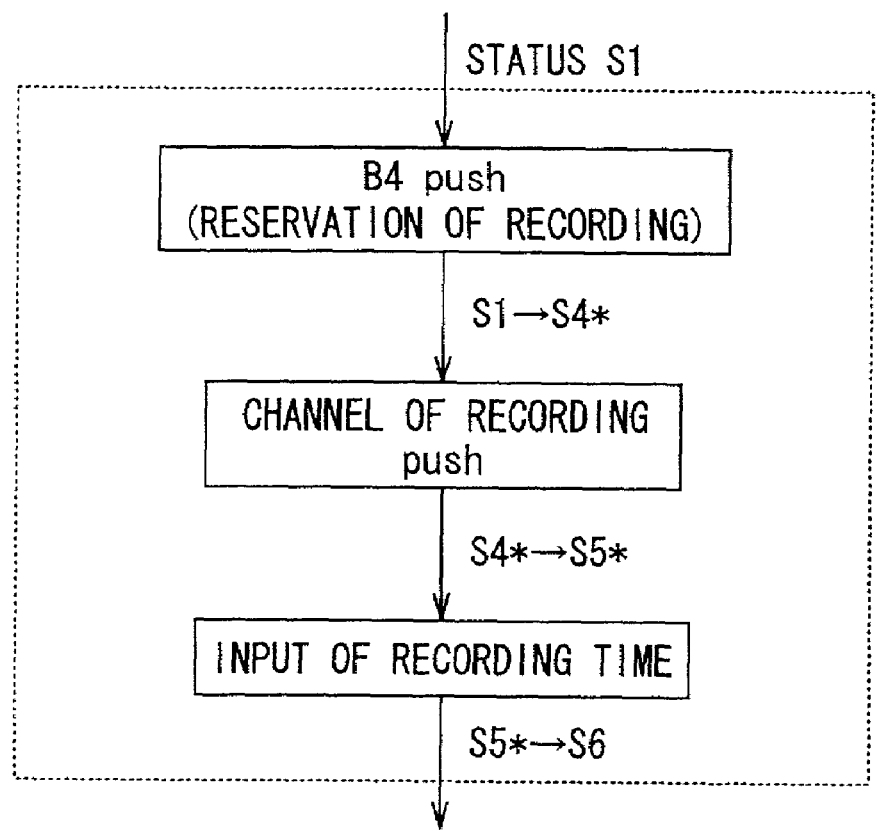
FIG. 33 illustrates information about priority control device IDs.
FIG. 34 is an example of a continued operation.
Figure 35A:
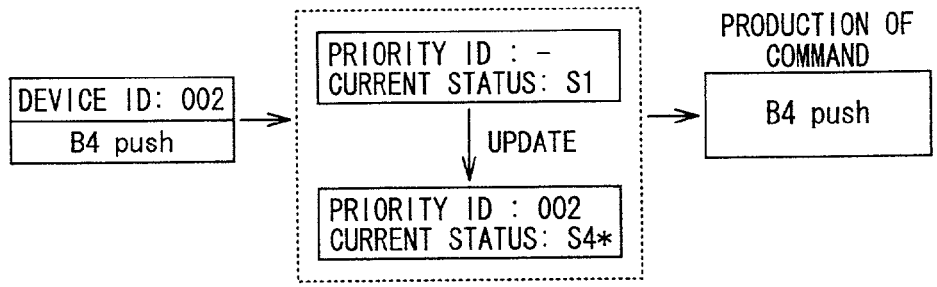
FIGS. 35A to 35D exemplify processing for producing and determining a command produced based on appliance operation status information.
Figure 35B:
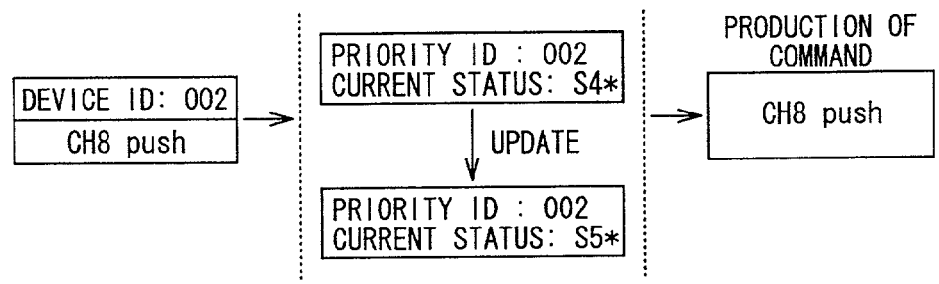
Figure 35C:
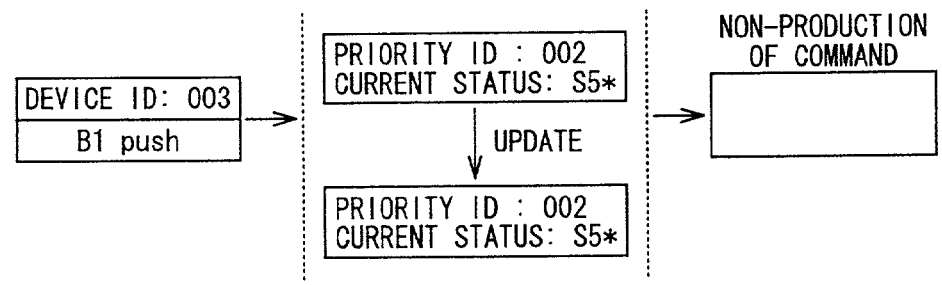
Figure 35D:
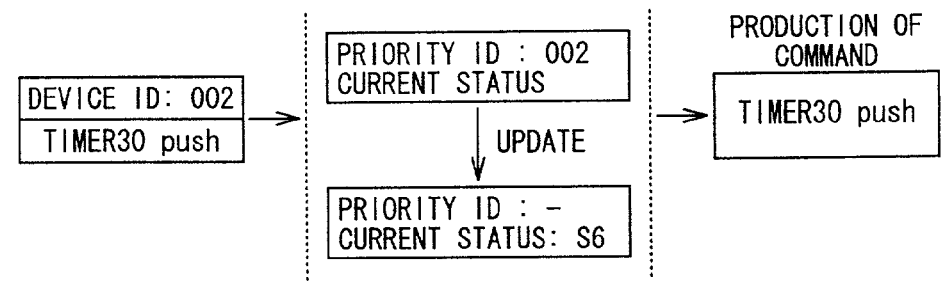

In the case that the operation reveals a continued operation status after the produced command was transmitted (step 53), the control device ID is then memorized as the priority control device ID (step 54). As shown in FIG. 33, information about the priority control device ID is described by this memorization.

When the current status indicated by the appliance operated state information corresponds to a continued operation status and the priority control device ID agrees with the acquired control device ID (steps 51 and 55), a command is produced, together with determination of validity of the command, on the basis of the inputted information, appliance panel information, GW apparatus information, and appliance operated state information (step 57: the similar processing to steps 41 to 46 in FIG. 28).

In the case that the operation does not a continued operation status after the produced command was transmitted (step 58), the priority control device ID is deleted (step 59).

When the current status shown by the appliance operation status information shows a certain continued operation status and the priority control device ID disagrees with the acquired control device ID, a command will be prohibited from being produced (step 56).

As stated above, as long as the current status included in the appliance operated state information shows the continued operation state, the appliance control command producing means 11 produces commands in response to only continuous operations done toward the same control device.

FIG. 34 represents an example of continuous operations carried out at a certain control device, which causes the status of a specified home appliance to make transitions of S1, S4 *, S5*, to S6. Because S4* and S5* are continued operation statuses, control commands produced in response to operations on the other control devices will not be transmitted to this home appliance until the status thereof changes to S6, which is not the continued operations status.

FIGS. 35A to 35D exemplify various relationships between updated conditions of the appliance operation status information and a command to be transmitted, which are responsive to input of control commands.

The above operation provided by the GW apparatus permits a certain control device to perform a series of operations with no interruptions from other control devices or terminals.

(Seventh Embodiment)

A seventh embodiment of the present invention provides a GW apparatus that is able to send, to a home appliance, with no intervals, commands made on a series of remote control operations done at a control device.

Figure 36:
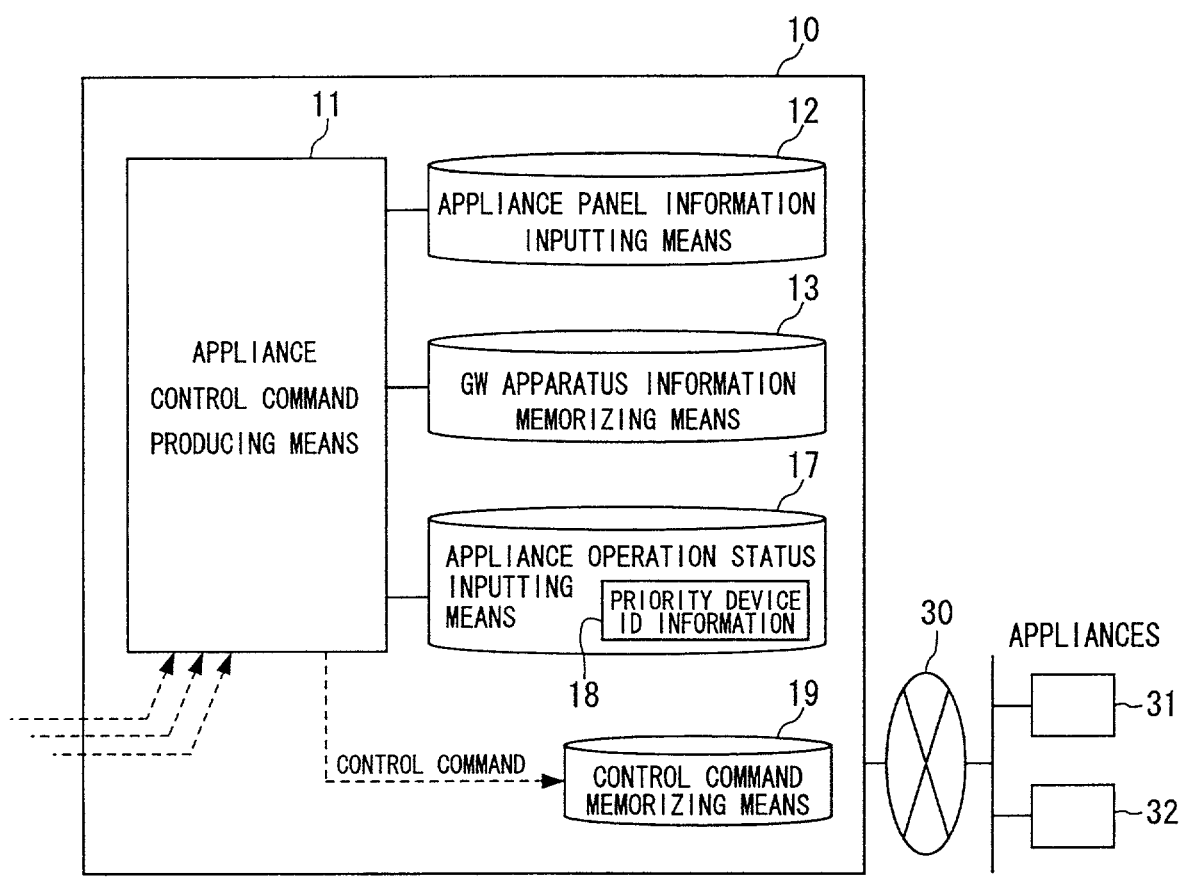
FIG. 36 is a block diagram showing the configuration of a GW apparatus according to a seventh embodiment.

In order to realize this, a GW apparatus shown in FIG. 36 has control command memorizing means 19. This means 19 has memorizes commands produced by the appliance control command producing means 11, during which time the means 19 transmits, in turn and without intervals, the commands memorized so far, once waiting for continuous operations is removed. The remaining configuration is the same as that in FIG. 6 (FIG. 30).

Figure 37:
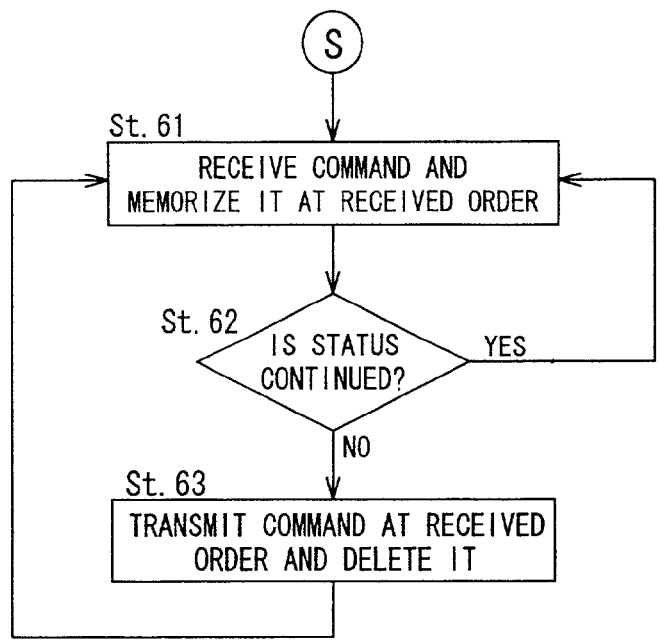
FIG. 37 is a flowchart showing the operation of control command memorizing means.

FIG. 37 shows the procedures of processing performed by the control command memorizing means 19.

The control command memorizing means 19 receives a command produced by the appliance control command producing means 11 to memorize it at the received order (61). Then the control command memorizing means 19 determines if or not the current status included in the appliance operation status information is a continued operation status (step 62).

If the determination results in a continued operation status, the processing is shifted to step 61. But the determination does not reveal a continued operation status, the control command memorizing means 19 transmits the memorized commands to a specified home appliance at the received order, then deletes the memorized contents (step 63).

The above processing, which is performed by the control command memorizing means 19, is independent of the processing performed by the appliance control command producing means 11.

In this way, the control command memorizing means memorizes commands before transmitting them in sequence, so that a series of those commands can be transmitted with no interruptions from other devices or terminals. Additionally, a series of inputting operations to a home appliance can be done continuously, thus operations of the home appliance being conducted with stability and being secured.

(Eighth Embodiment)

An eight embodiment of the present invention provides a GW apparatus that includes the functions of determining whether or not a control device satisfies a given use condition and permitting remote control for home appliances thorough the control device only when the use condition is satisfied.

Figure 38:
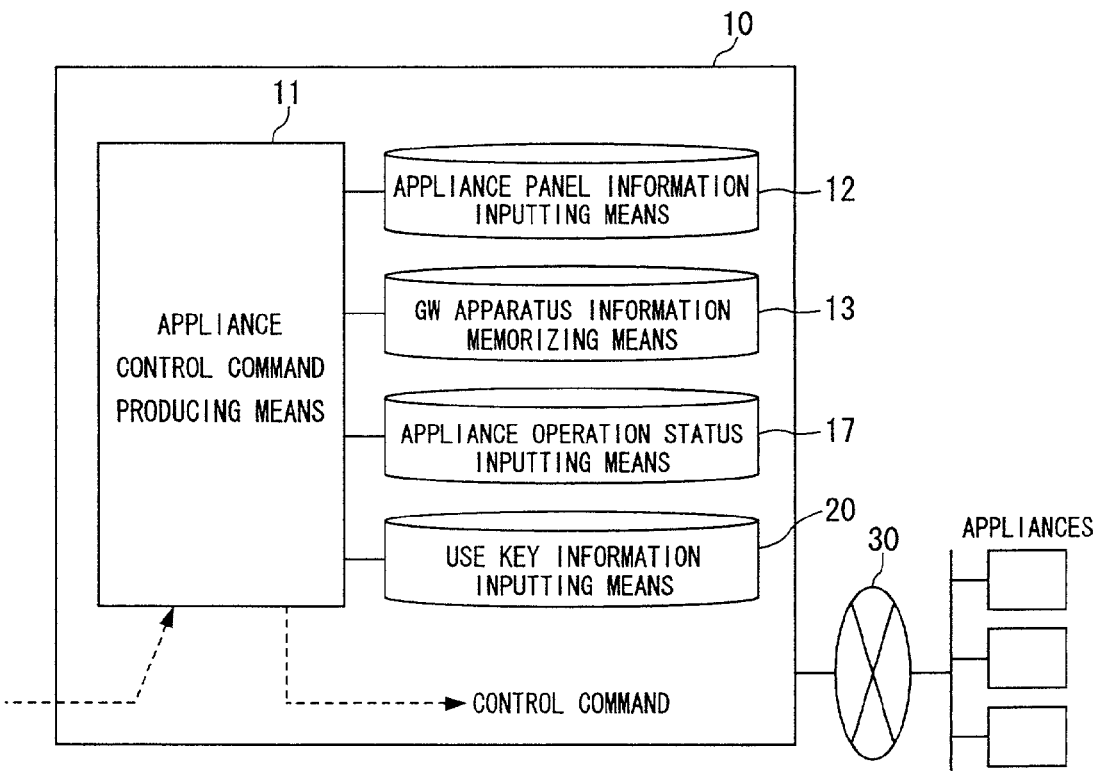
FIG. 38 is a block diagram showing the configuration of a GW apparatus according to an eighth embodiment.

As shown in FIG. 38, the GW apparatus has use key information inputting means 20 for acquiring a usable condition (key to utilize) to make a control device usable for controlling home appliances from a distance and memorizing a use key (key to use). Additionally, the appliance control command producing means 11 is constructed such that, when a control command to a certain home appliance is inputted from a control device connected to the network outside the home, the means 11 determines whether or not a control command to the home appliance should be produced on the basis of the appliance panel information memorized by a control device connected to the network outside the home, the GW apparatus information memorized by the GW apparatus information memorizing means 13, the appliance operation status information memorized by the appliance operation status inputting means 17, and the use key information memorized by the use key information inputting means 20. The remaining is constructed in the same way as that in the fifth embodiment (FIG. 26).

The appliance control command producing means 11 is configured so as to perform determination whether or not it is possible to produce a command on use key information in the procedures shown in FIG. 39. In other words, when acquiring inputted information (step 65), the appliance control command producing means 11 determines whether or not it is possible to produce a command based on the inputted information and the use key information memorized by the use key information inputting means 20 (step 66).

The determined results at step 66 is used at step 67 such that, like in FIG. 28, a command is produced and transmitted as long as the use key is satisfied, while a command will not be transmitted if the use key is not satisfied.

The use key information inputting means 20 preserves a conditional expression as the use key information, so that the appliance control command producing means 11 is able to use the conditional expression to determine if it is possible to produce a command or not. The conditional expression includes acceptable time zone data that limit acceptable time for operations (FIG. 40), location identification data that limit the acceptable locations of control devices to locations in the domestic area of Japan, the area inside the home, the area covered by a radius of 1 kilometers from a home, or others (FIG. 41), terminal identification data that limit control devices with IDs (FIG. 42), user identification data that limit users with IDs, fingerprints, or others (FIG. 43), and expressions made by combining a plurality of data selected from the above listed expressional data with use of "and" or "or."

Figures 42, 43, 44:
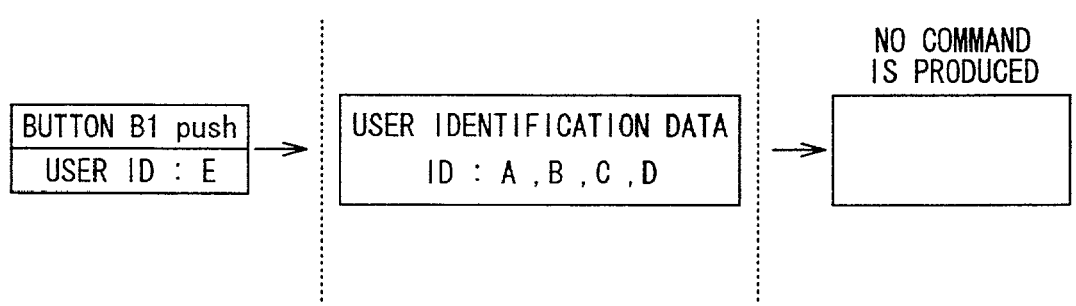
FIG. 42 shows an example of terminal identification data employed as a use key.
FIG. 43 shows an example of user identification data employed as a use key.
FIG. 44 illustrates processing for producing and determining a command based on the user identification data.

FIG. 44 exemplifies determination whether it is possible to produce a command using the use key information. The appliance control command producing means 11 operates such that, when receiving inputted information about a user ID "E," the means 11 compares the inputted user ID with the user identification data stored in the use key information inputting means 20, so that it is determined if the user ID "E" is contained or not in user IDs expressed by the user identification data. In this example, since the ID "E" is not contained in the user IDs, the appliance control command producing means 11 will not produce any command.

FIG. 45 shows an example to make the use key information correspond to statuses expressed in the appliance operation status information of a VTR. In this case, for recording by operating a button B3 and making a reservation for recording by operating a button B4 at the initial state S1, it is required that user identification data regulated by a key 1 be met.

Figure 46:
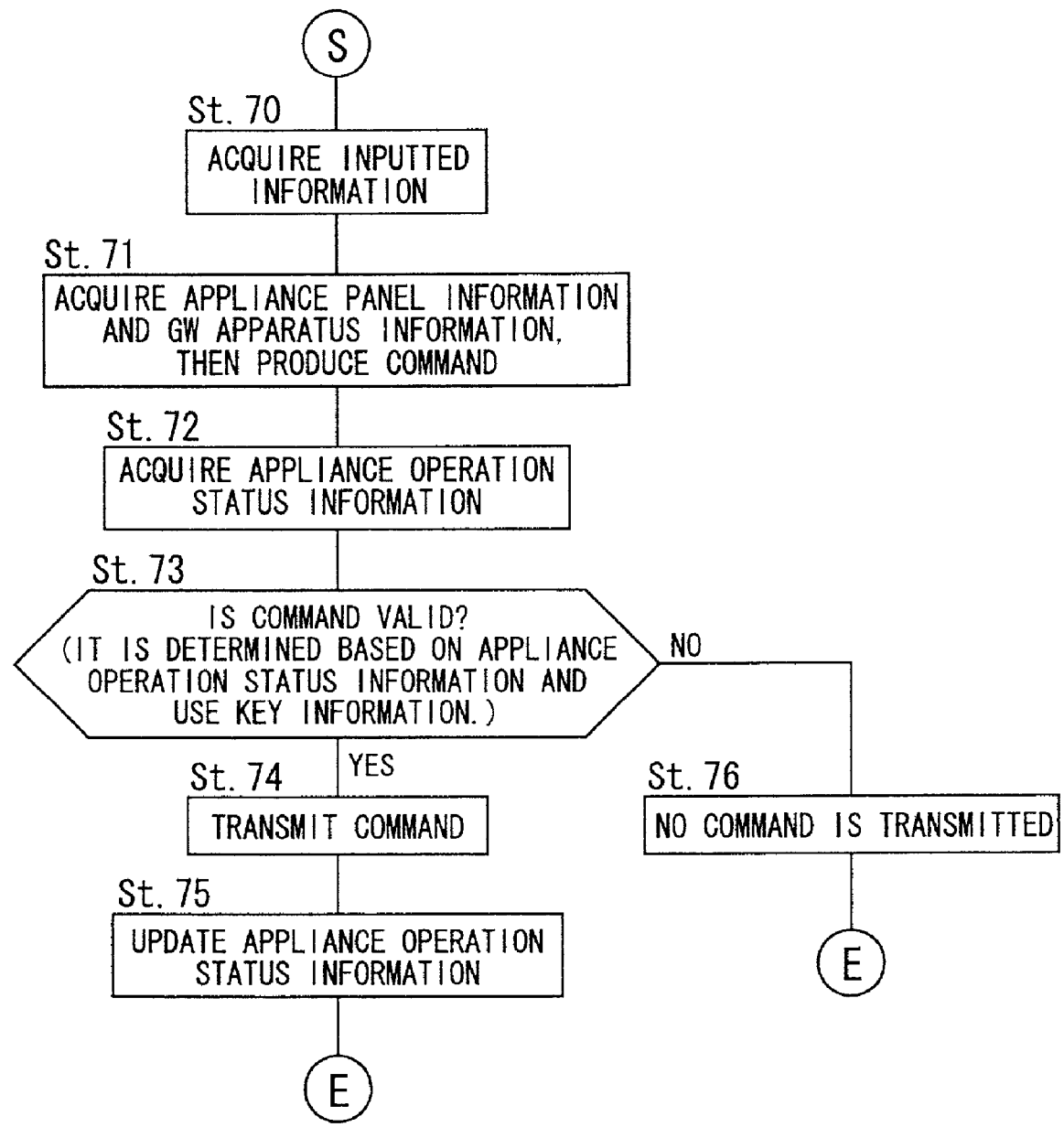
FIG. 46 is a flowchart showing the processing for producing and determining a command on the basis of use key information made to correspond to the status in appliance operation status information.

Therefore, the appliance control command producing means 11 operates as shown in FIG. 46.

When receiving information inputted from a control device (step 70), the means 11 acquires appliance panel information and gateway apparatus information, then produce a command based on both the acquired information and the inputted information (step 71).

Then, the means 11 acquires appliance operation status information (step 72), and then the determination whether or not the produced command is valid by making reference to both the appliance operation status information and the use key information (step 73).

If the produced command is valid, it is transmitted to a given home appliance (step 74), before the appliance operation status information is updated (step 75). However, when the produced command is invalid, no command will be transmitted (step 76).

Figure 47:
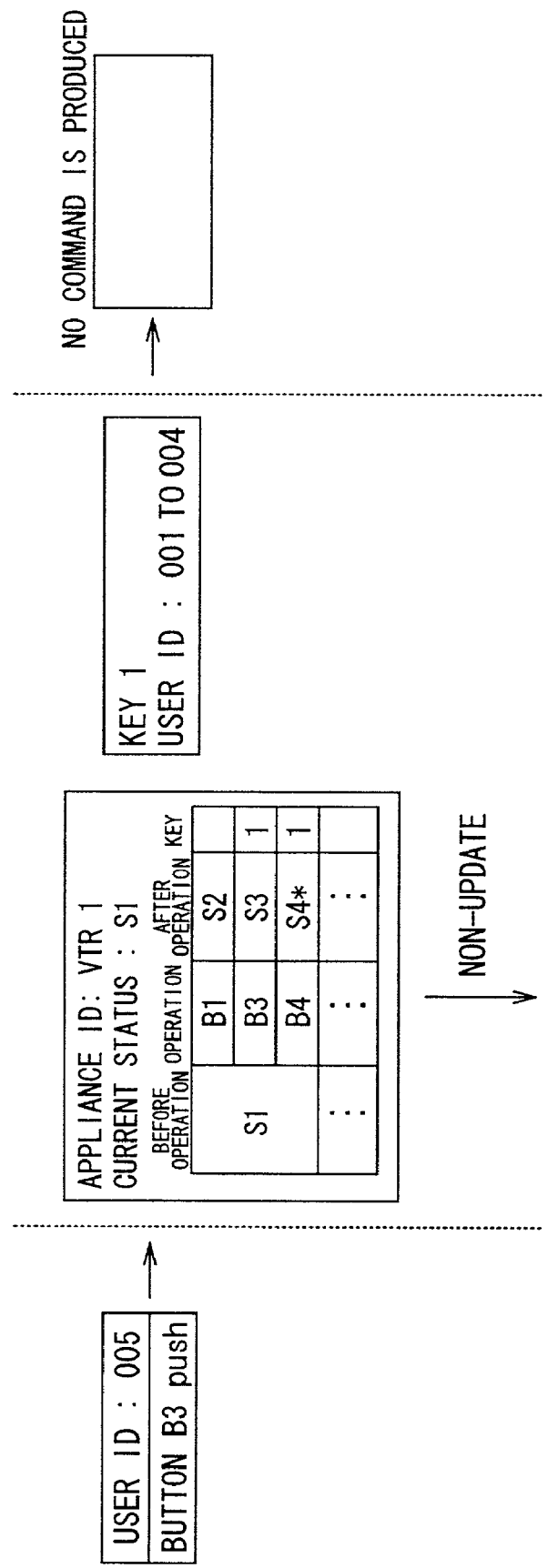
FIG. 47 is an example showing the processing for producing and determining a command on the basis of use key information made to correspond to the status in appliance operation status information.

On the assumption that the use key information is specified as in FIG. 45, FIG. 47 illustrates the input of control command information indicative of the user ID "005" and the button B3 "push" (recording) and the determination whether or not it is possible to produce a command. Because the appliance operation status information allows the "button B3" to be pushed under the current status S1, the inputted information meets a requirement for the appliance operation status information. However, the condition of a key 1 added to this operation is not met. The control command on this inputted information does not become valid when being referred to both the appliance operation status information and the use key information. This determined result is considered by the appliance control command producing means 11, so no command will be produced. Therefore, the status is not changed, with the result that the appliance operation status information is not updated.

FIG. 48 shows an exemplary limitation, in which two pieces of use key information about keys 2 and 3 that specify the conditions for locations are made to correspond to the status of the appliance operation status information.

Figure 49A:
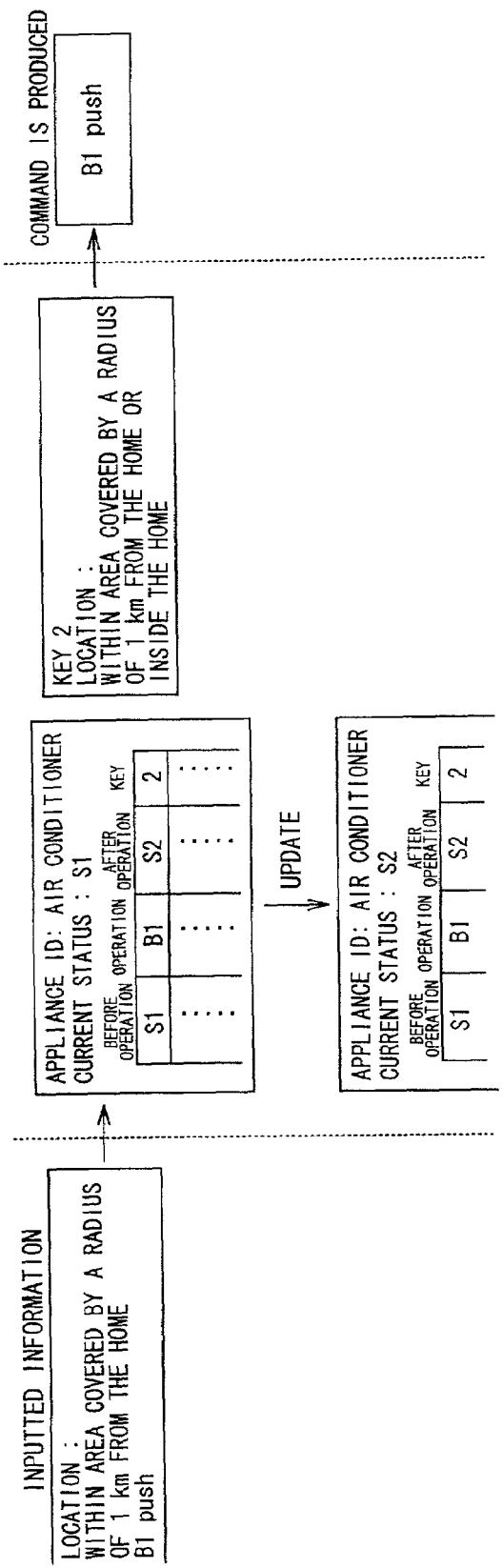
FIGS. 49A and 49B illustrate respectively processing for producing and determining a command in response to pieces of inputted information of which originated locations differ from each other.
Figure 49B:
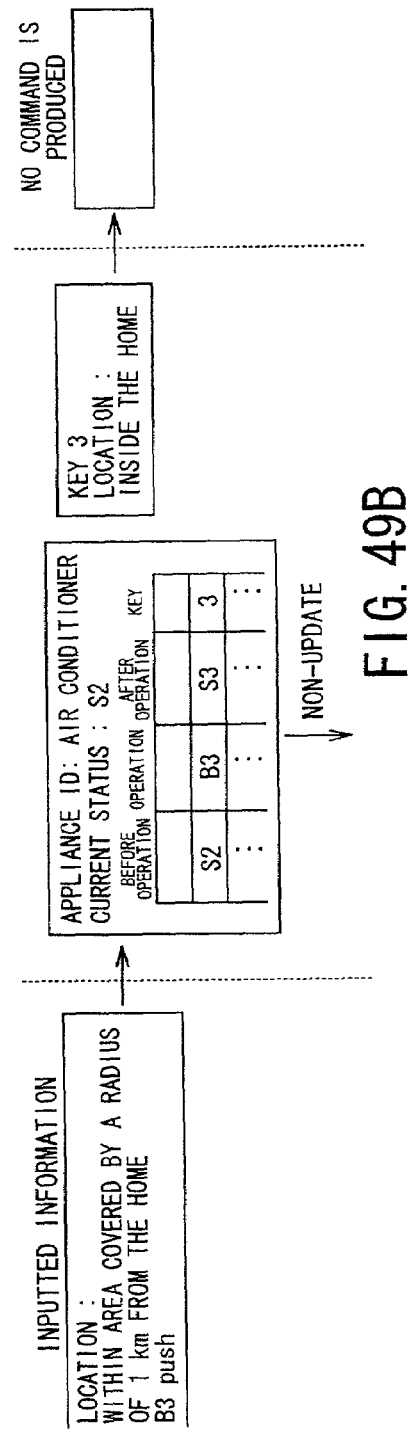

Furthermore, on condition that the above use key information on the keys 2 and 3 is set, FIGS. 49A and 49B show the determination whether or not it is possible to produce a command, respectively. In the case of FIG. 49A, such determination is made in the situation in which inputted is control command information indicative of "a location is within an area covered by 1 km from the home and the button B1 is pushed." This information is inputted to make an air conditioner turn on from a remote location within an area covered by 1 km from the home. On the other hand, in FIG. 49B, the determination is made in the situation in which inputted is control command information indicative of "a location is within an area covered by 1 km from the home and the button B3 is pushed." This information is inputted to set a temperature of an air conditioner from a remote location within an area covered by 1 km from the home. In the case of FIG. 49A, the requirement from the appliance operated state information is satisfied by the inputted information, and the location condition required by the key 2 added to this requirement is also satisfied. Hence, based on both the appliance operation status information and the use key information, it is determined that the control command on the inputted information is valid, so that the appliance control command producing means 11 produces a command on the inputted information, then sends out the produced command. Accordingly the status of the air conditioner is changed to "on," and the appliance operation status information is updated.

In contrast, although the inputted information in FIG. 49B satisfies the requirement of the appliance operation status information, but does not satisfy the location condition required by the key 3 added to the requirement. The command of setting a temperature derived from the inputted information is determined to be invalid with reference to both the appliance operation status information and the use key information. Hence the appliance control command producing means 11 will not produce a command based on the inputted information. Accordingly, the status is not changed, and the appliance operation status information is not updated.

FIG. 50 exemplifies three pieces of use key information consisting of keys 1, 9 and 10 that specify user IDs, the three pieces of use key information being made to correspond to statuses of the appliance operation status information for a VTR. In this case, a user who is able to access the VTR is limited by the key 9, in which a user who is able to perform individual operations is further limited by the key 1 or 10.

Figure 51:
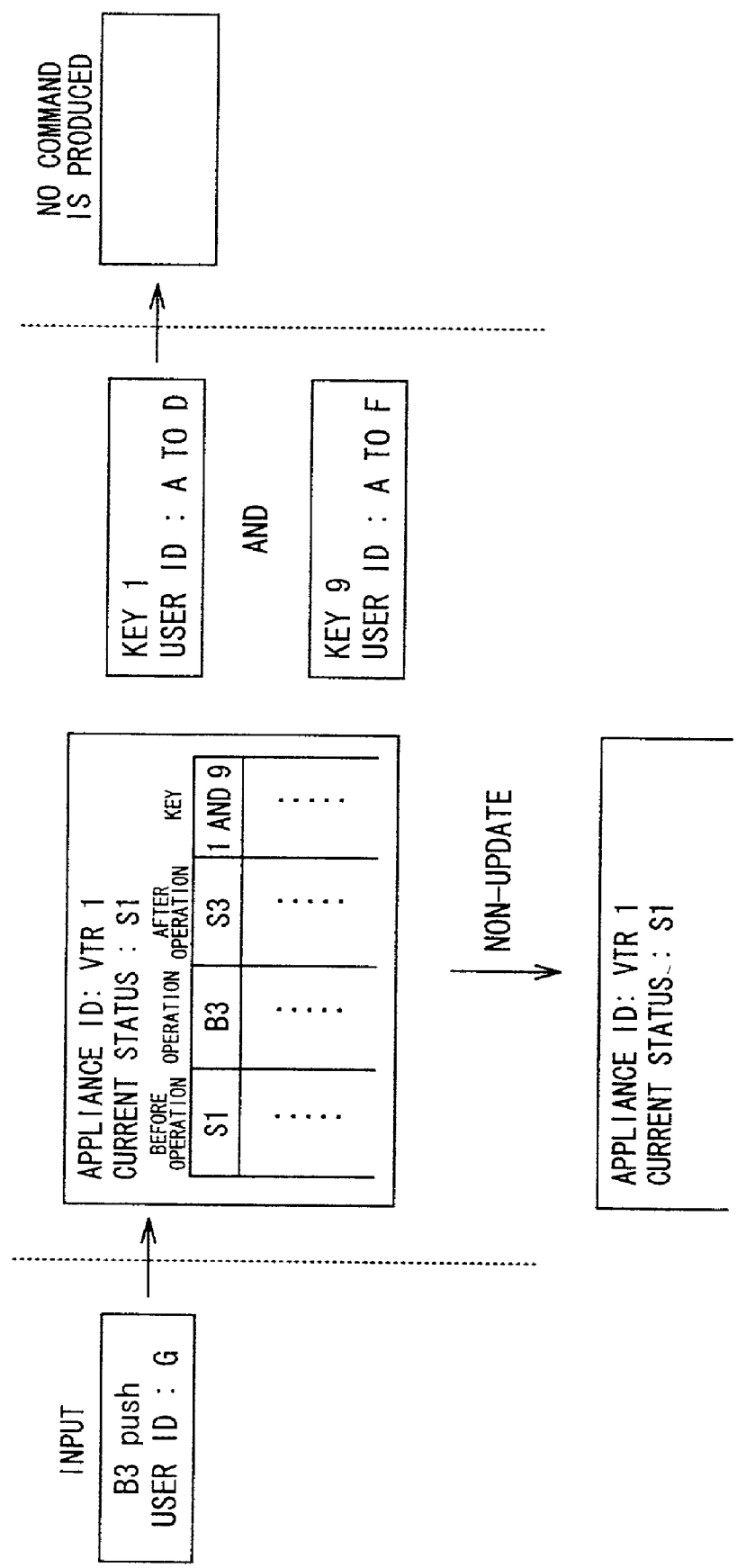
FIG. 51 exemplifies the processing for producing and determining a command at functional levels of an appliance.

Assume that the utilizing key information shown in FIG. 50 is set. If information about a control command of "user ID=G and B3 push" for recording is inputted from a user G, a determination whether or not it is possible to produce a command is carried out as shown in FIG. 51. This inputted information does not meet the condition regulated by the key 1, so that no command will be produced. In this way, the right of use can be limited by functions of a home appliance.

Figure 52:
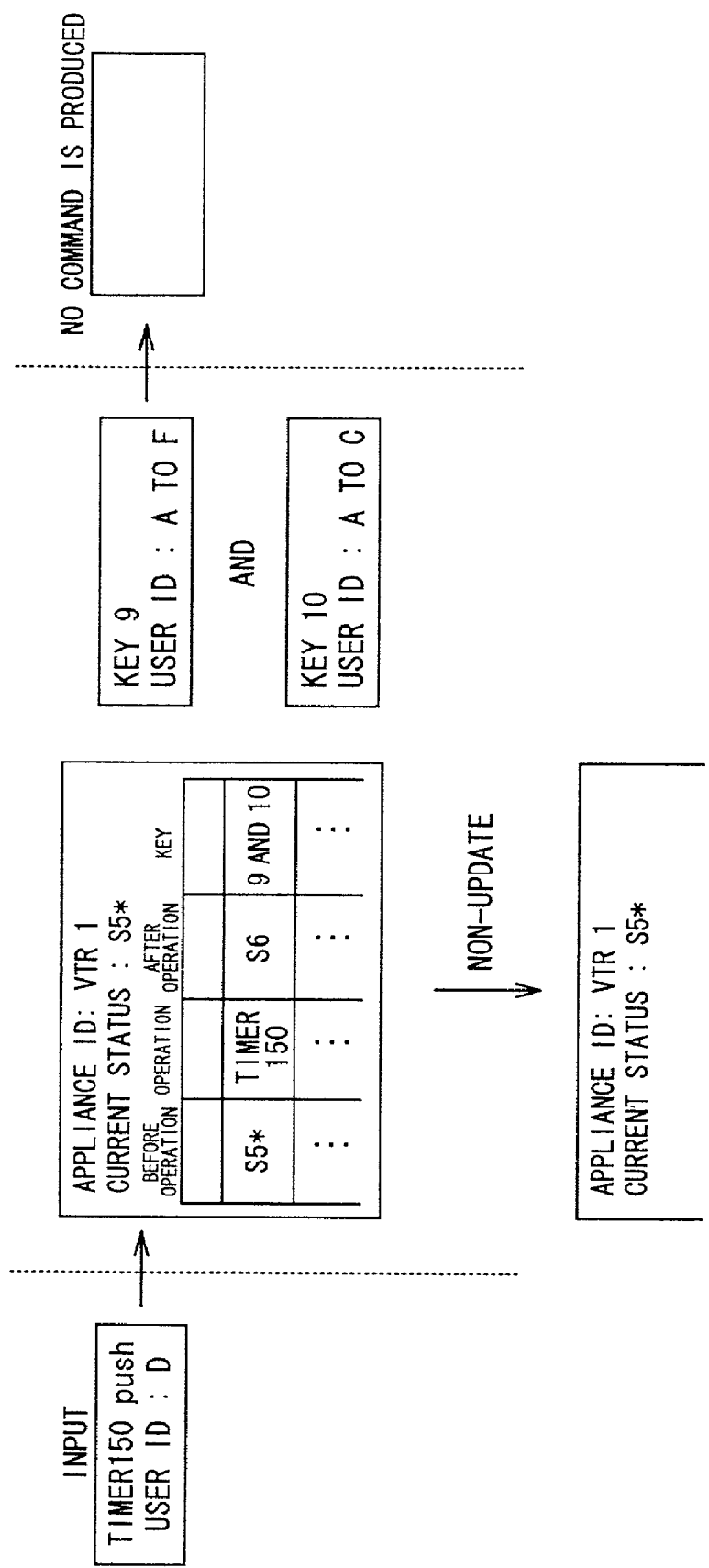
FIG. 52 exemplifies the processing for producing and determining a command at functional range levels of an appliance.

FIG. 52 shows the determination whether or not it is possible to produce a command in cases a control command of "user ID=D and timer 150 push" specifying picture recording for 150 minutes using the timer is inputted from a user D. Because this inputted information does not meet the condition of the key 10, no command will be produced. In this way, it is possible to set an amount of recording time to limit the right of use in association with an operation for recording with a timer, that is, it is possible to confine the right of use by the range of a function of a home appliance.

In the above examples, a plurality of keys have been combined with "and," but they can be combined with "or."

Further, in cases where an operation from a remote control device results in the update of the current status of a home appliance and use key information corresponding to the status changes the range of an appliance panel which is operational by the remote control device, the appliance control command producing means 11 produces gateway service list information showing an operational range of the appliance panel, and sends it to the remote control device.

Figure 53:
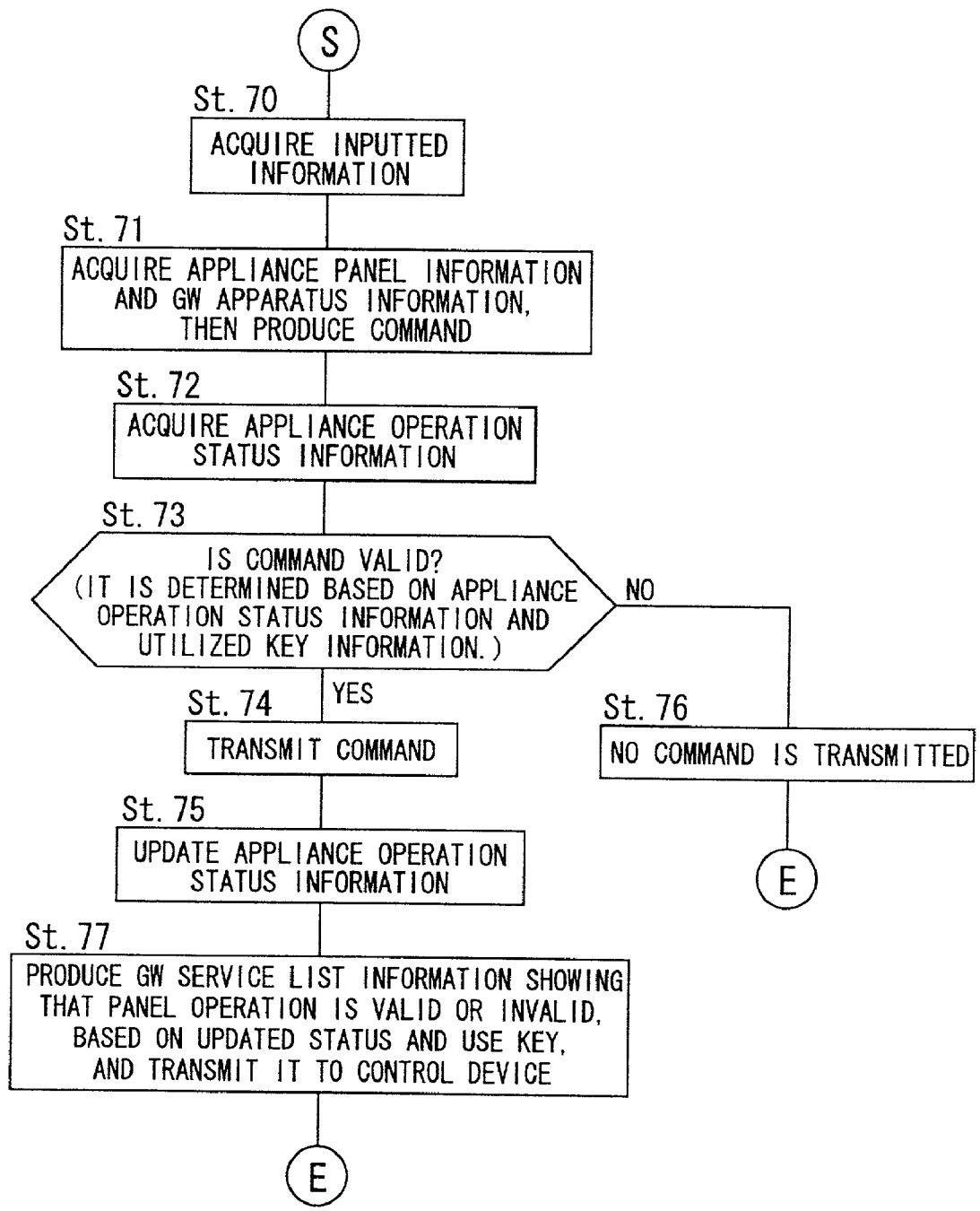
FIG. 53 is a flowchart showing both of the processing for producing and determining a command and producing GW service information.

The appliance control command producing means 11 performs such processing based on the procedures shown in FIG. 53. In this processing, steps 70 to 76 are the same in processing as those in FIG. 46. Therefore, after the update of the appliance operation status information, the appliance control command producing means 11 uses both the updated status and the use key in order to determine whether or not each operation toward panel is valid. And the means 11 produces gateway service list information in such a manner that the determined result can be recognized on a display screen, then transmits it to a certain control device (step 77).

Figures 54A, 54B, 54C:
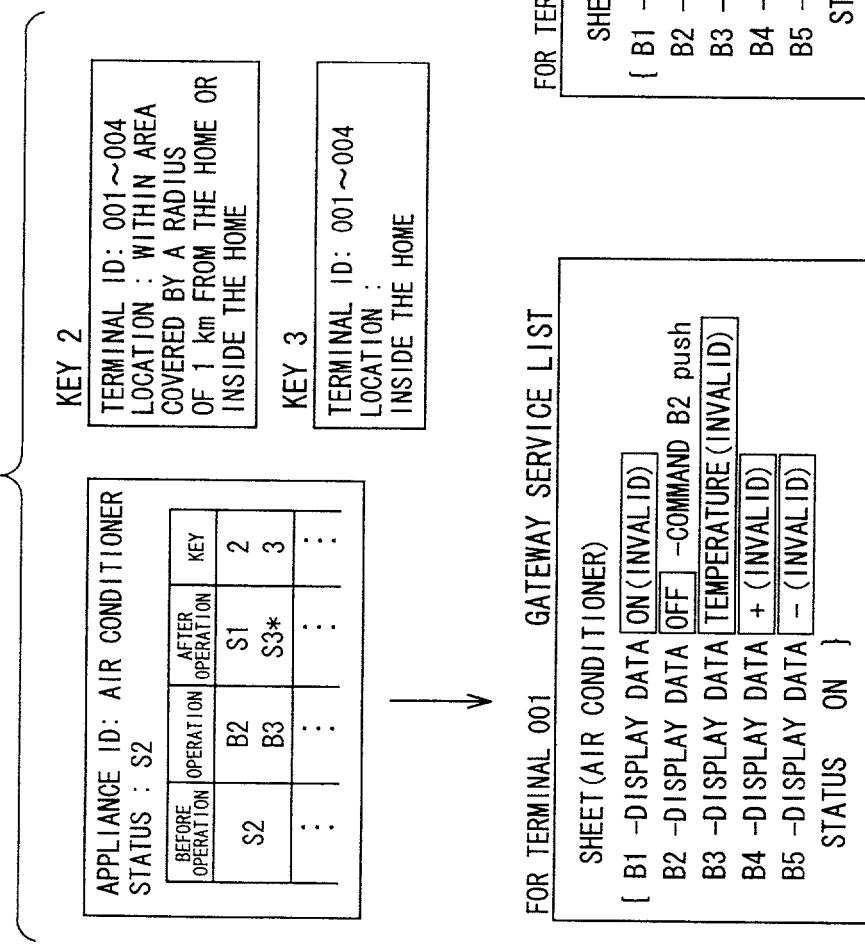
FIGS. 54A to 54C exemplify the processing for producing the GW service information.
Figure 55B:
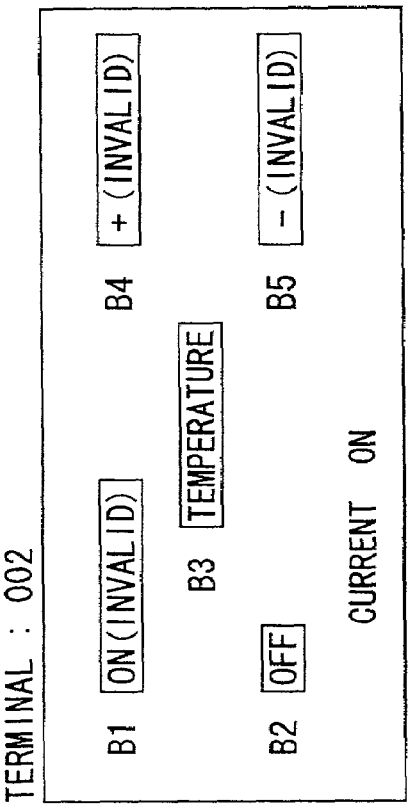
FIGS. 55A and 55B show examples of displayed screens produced based on the GW service information.
Figure 55A:
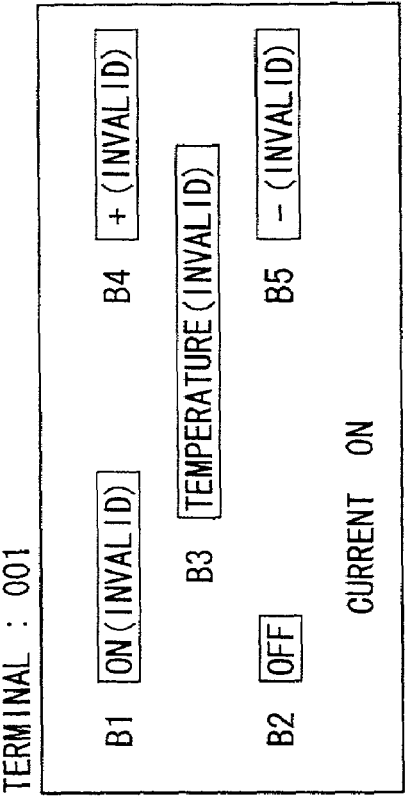

If the appliance operation status information is set as shown in FIG. 54A and the status of an air conditioner is updated to S2 in response to remote control from a control device, gateway service list information to be transmitted to a certain control device is exemplified in FIGS. 54A to 54C. When the control device in charge of the remote control is a terminal 001 that satisfies only the condition of the key 2, information shown in FIG. 54B is transmitted, as gateway service list information, which indicates that operations other than the operation B2 allowing operations from the current status B2 are valid. In this situation, panel information illustrated in FIG. 55A is displayed on the display screen of the terminal 001.

On the other hand, when the control device in charge of the remote control is a terminal 002 that satisfies the conditions of the keys 2 and 3, information shown in FIG. 54C is transmitted, as gateway service list information, which indicates that operations other than the operations B2 and B3 allowing operations from the current status B2 are invalid. In this situation, panel information illustrated in FIG. 55B is displayed on the display screen of the terminal 002.

Accordingly, the appliance control command producing means 11 is able to transmit, to a control device, gateway service list information explicitly showing an operational range in real time. This provides an interface in accordance with changes in the right of use, the changes depending on used conditions.

As described above, the present system makes it possible to examine the right of use at a variety of levels. The reason is that various conditions for remote control of home appliances can be specified, together with various setting manners. These manners include to set conditions to access to home appliances, to set conditions to functions of home appliances, or to set conditions to the range (used range) of a specified function.

The location information that rules conditions of use includes positional information about a control terminal, a geographical area (regions such as Kanto, Chubu, or Hokkaido; or small areas such as "xx ward"), a floor of a building, the domain of a network (addresses etc.), a room of the home, or a location of a remote control. Further, the information about terminal identification data includes the number of a cellular phone or the ID of a terminal. The user identification information can be set by making use of authentication information at a terminal with an authentication function or information that proves authentication on authentication service.

Furthermore, it is not always necessary that the identification data contained in inputted information be inputted form a control device. Alternatively, information such as the telephone number of a sender which is added and used by processing through a network, positional information from a position-measuring equipment attached to a control terminal, or time information obtained from a timer of a control device or the GW apparatus can be used as the identification data. In short, any information can be used in the GW apparatus, as long as the information serves as data to identify inputted information in determining whether or not it is possible to produce a command.

(Ninth Embodiment)

A GW apparatus according to the present invention is detected to examination of the right of use of contents.

Figures 56, 57:
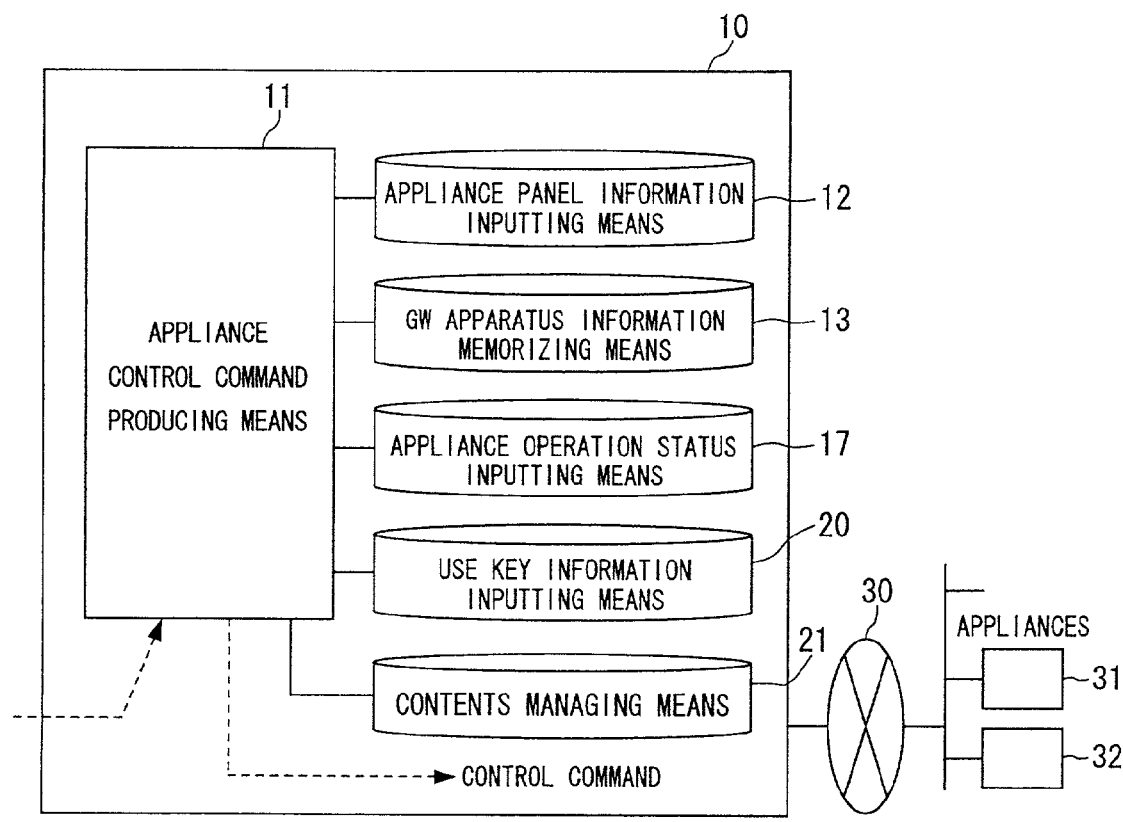
FIG. 56 is a block diagram showing the configuration of a GW apparatus according to a ninth embodiment.
FIG. 57 exemplifies a contents list.

The GW apparatus has, as shown in FIG. 56, contents managing means 21 for memorizing a list of contents preserved by home appliances 31 and 32 connected to the home network 30. The remaining is the same as that in the eighth embodiment (FIG. 38).

Figure 58:
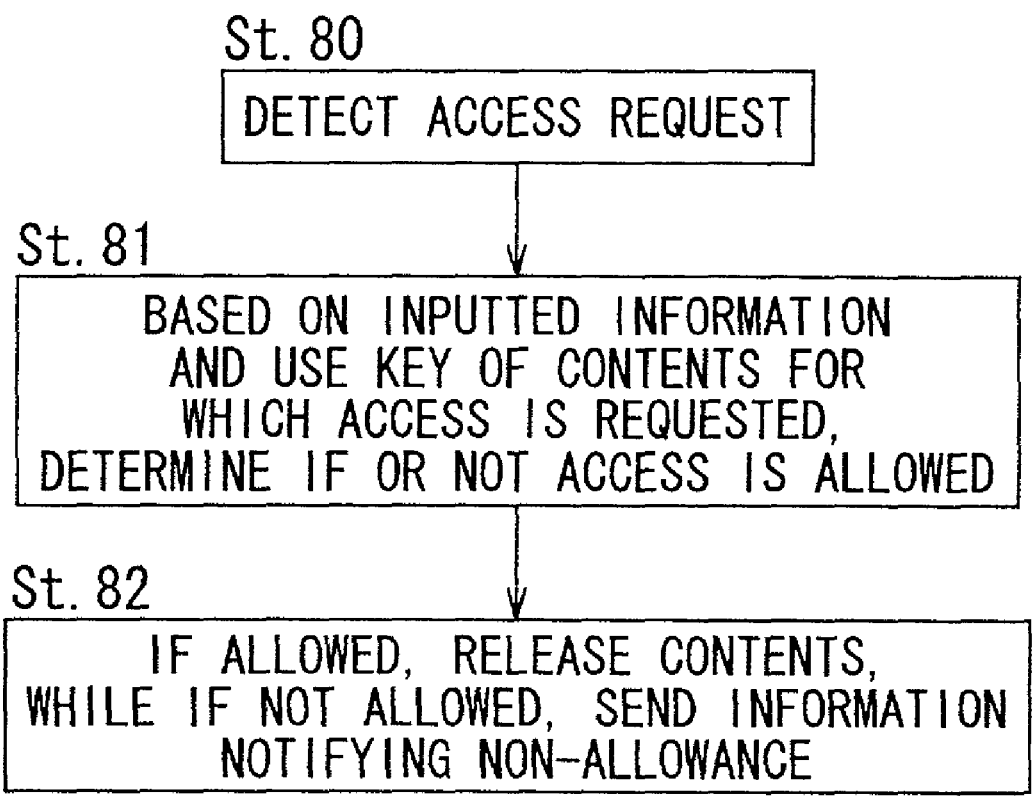
FIG. 58 is a flowchart showing the operation of contents managing means.

The contents managing means 21 memorizes, as illustrated in FIG. 57, a contents list in which contents IDs preserved by home appliances, the numbers of the use keys made correspond to each of the contents IDs, and access states to the contents are described. When a control device controls each of the home appliances 31 and 32 to have access to its contents, the contents managing means 21 senses the access through each home appliance 31 or 32, and the determines, based on the procedures shown in FIG. 58, whether the access to its contents is permitted or not.

Practically, the contents managing means 21 detects a request for accessing the contents preserved by a certain home appliance (step 80). Then, based on the inputted information and a use key corresponding to contents for which access was requested, the contents managing means 21 determines if the access should be permitted or not (step 81).

If the access is permitted, the contents are released. In contrast, the access is not permitted, information showing that the access is not permitted is transmitted via the appliance control command producing means 11 to a control device that first issued the request. The determination for access to contents is carried out an independent processing routine.

Figure 59A:
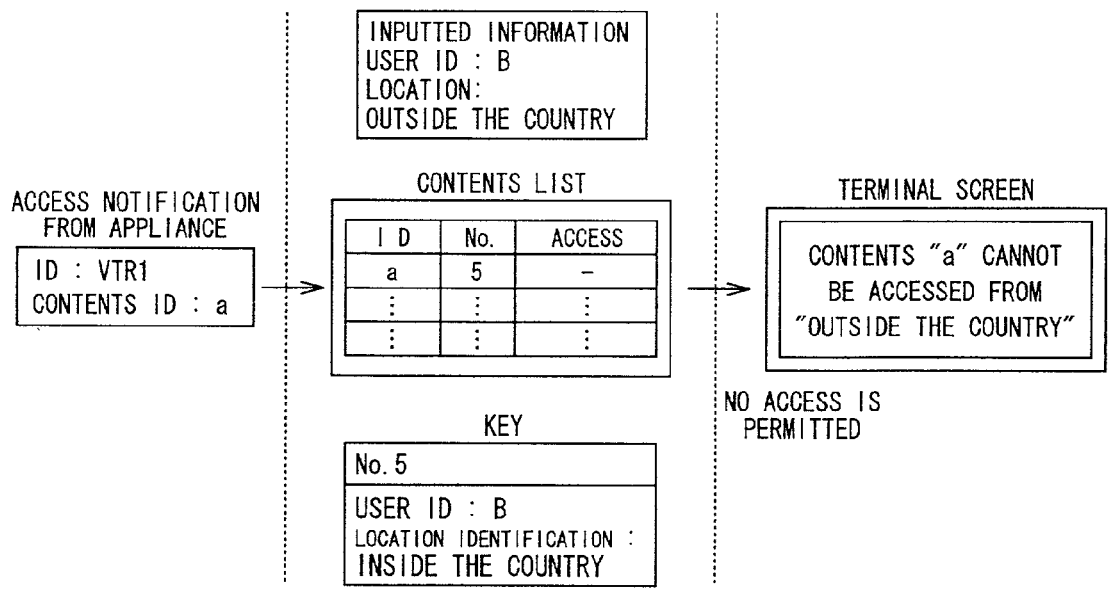
FIGS. 59A and 59B show examples of the processing for producing and determining a command.

FIG. 59A exemplifies processing when a VTR 1 issues an access request for contents of "contents ID: a." In a contents list shown therein, a use key is set to contents "a" which includes the specification of a user and the specification of a location limiting a usable region to the domestic area. Since inputted information from a control device does not meet the specification of the location given to the use key, the access to the contents will not be allowed. So contents indicating the non-allowance is transmitted to the control device so as to be displayed on its screen.

Figure 59B:
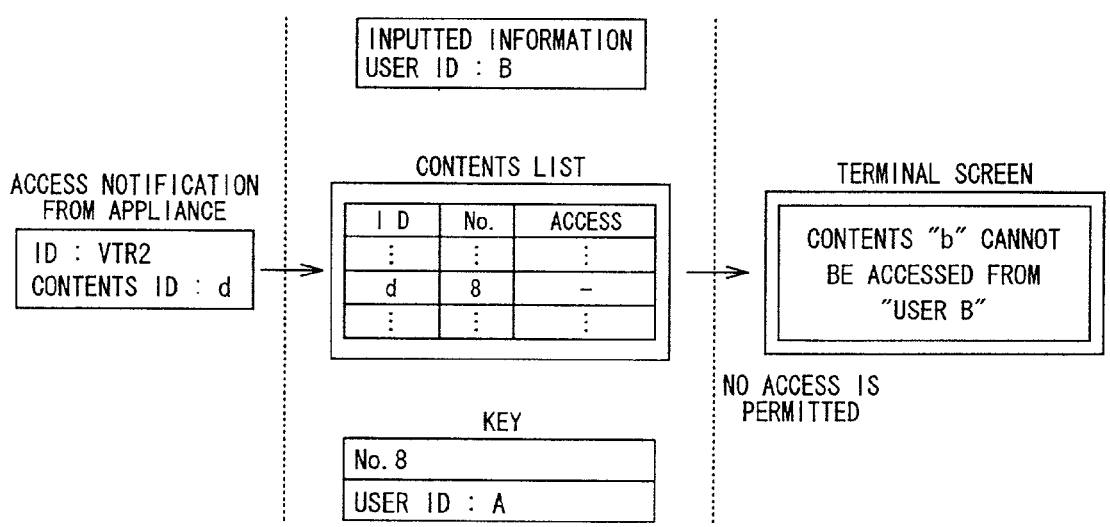

Like the above, FIG. 59B shows an example in which access to contents "b" will not be allowed, because it does not satisfy the condition of the use key specifying the user.

The system provided by this embodiment is able to limit a region or time zone in which access to contents is allowed, and to limit users who are able to access contents.

(Tenth Embodiment)

In a tenth embodiment of the present invention, there is provided a plurality of GW apparatuses that operate in a linked manner.

Figure 60:
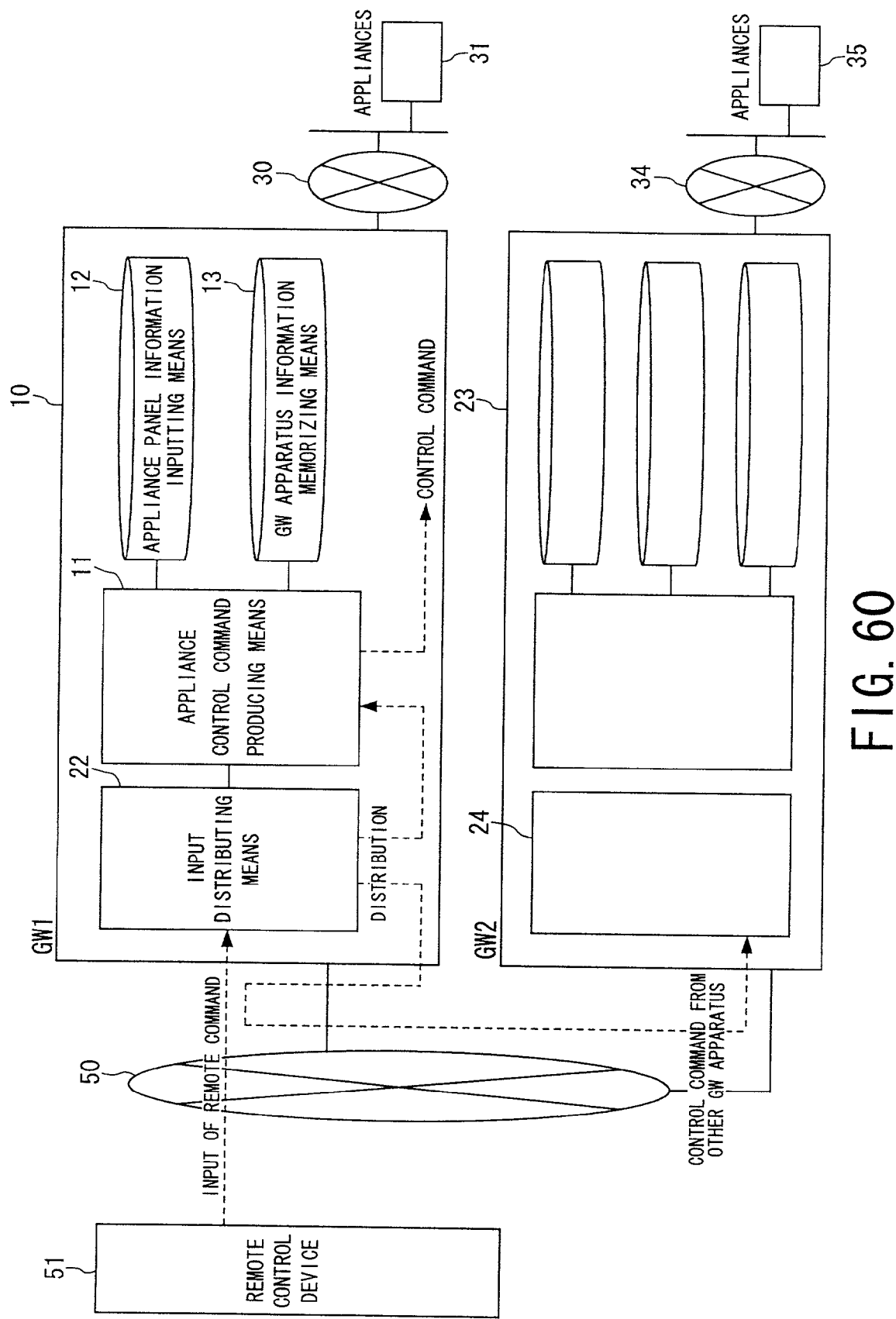
FIG. 60 is a block diagram showing the configuration of a GW apparatus according to a tenth embodiment.

The system shown in FIG. 60 is provided with a plurality of GW apparatuses 10 and 23 each connected to the network 50 found outside the home. Each of the GW apparatuses 10 and 23 has input distributing means 22 (24) for receiving inputs of control commands from a remote control device 51 and extracting from the inputs only a control command input toward home appliances that should be controlled by itself.

Each of the input distributing means 22 and 24 hands the extracted control command input to the appliance control command producing means 11. Responsively to this, the appliance control command producing means 11 produces a control command to send it to a certain home appliance.

Additionally, each of the input distributing means 22 and 24 transfers other control command inputs to other GW apparatuses specified.

Figure 61:
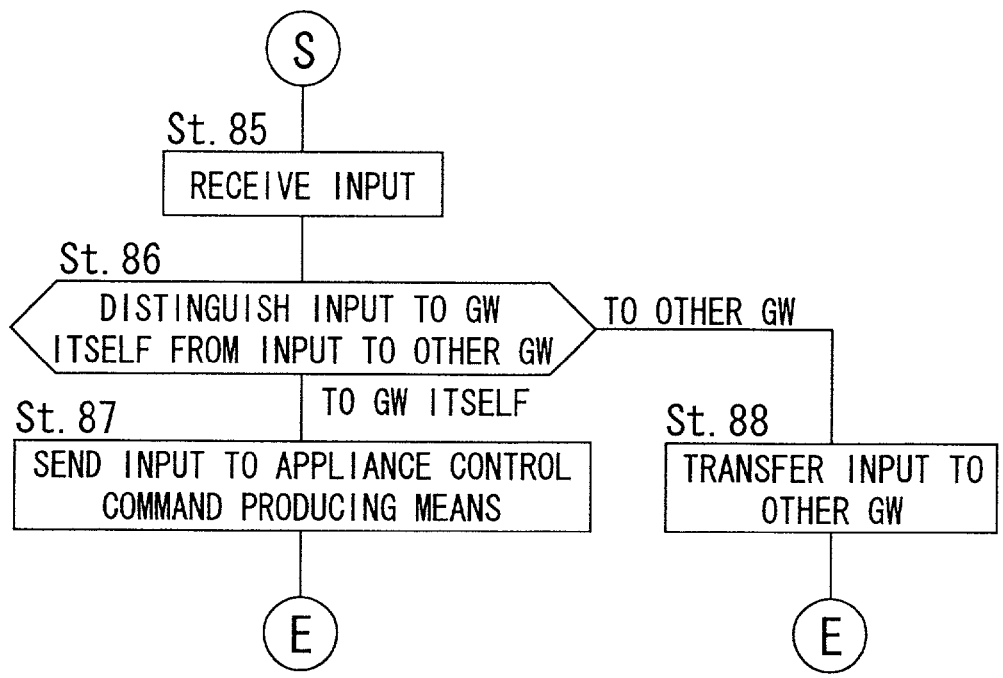
FIG. 61 is a flowchart showing the operation of input distributing means.

FIG. 61 shows a flowchart showing an operation for the input distribution carried out by each GW apparatus.

When receiving an input (step 85), the input distributing means of each GW apparatus distinguishes a control command input to the GW itself from that to the other GW apparatuses (step 86). Control command inputs to other GW apparatuses are transferred to specified GW apparatuses (step 88), while the control command input to the GW apparatus itself is transferred to the appliance control command producing means owned by this GW apparatus (step 87).

Accordingly, it is possible for this system to simultaneously control home appliances that are controlled by a plurality of GW apparatuses. A control command can be sent from the remote control device 51 to a plurality of home appliances so as to operate in a linked manner, for example, for dubbing.

Figure 62:
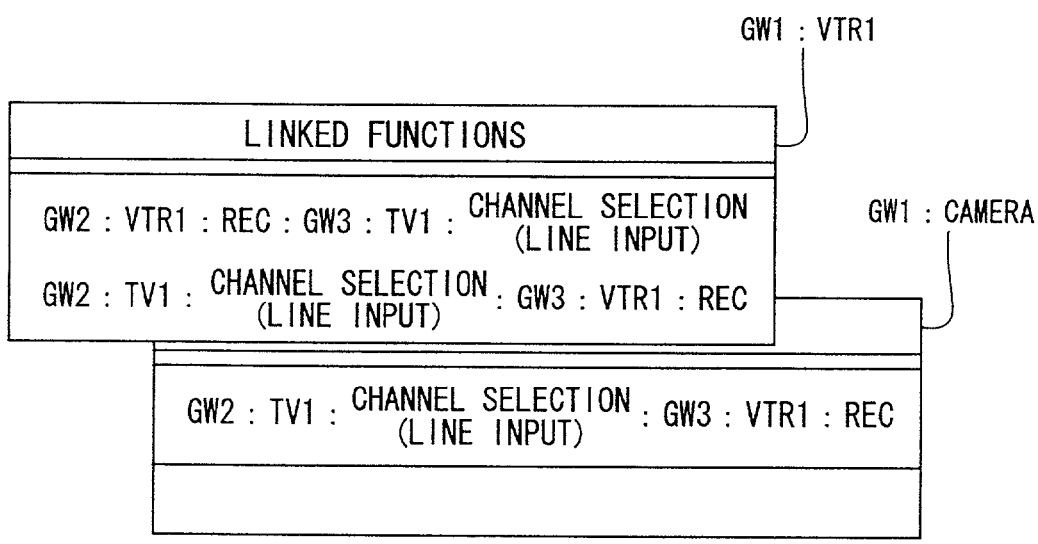
FIG. 62 illustrates an appliance panel information table.

The appliance panel information inputting means 12 of the GW apparatus preserves, as shown in FIG. 62, an appliance panel information table of each home appliance, to which information about linked functions is added. The information about linked functions includes information describing home appliances to which permission of linkages are given, GW apparatuses to which those appliances belong, and contents of linked operations.

When controlling a plurality of home appliances from a distance, the remote control device 51 acquires panel information about the plurality of home appliances from GW apparatuses, then displays the acquired information on its display screen.

The processing for display panel information about a plurality of home appliances on the display screen of the remote control device 51 is as follows.

First the appliance control command producing means of the GW apparatus 10 receives from the remote control device a request for acquiring panel information, and hands it to the GW service list producing means (process (1)).

The GW service list producing means of the GW apparatus 10 produces GW service list information based on the appliance panel information in the appliance panel information inputting means and the linked function information (process (2)).

In the remote control device 51, in addition to display of the panel information of the specified home appliance (refer to FIG. 63A), the functions that permits the specified appliance to be linked in operation with other appliances are displayed in a list (refer to FIG. 63B) (process (3)).

When one linked operation is selected, through the remote control device 51, from the list displayed in process (3) (process (4)), a command to acquire remote panel information is transmitted to the GW apparatus 10, and such command is then transmitted from the GW apparatus 10 to the specified GW apparatus 23 (process (5)).

In response to reception of the panel information acquiring request, the GW apparatus 23 produces GW service list information in the same manner as above, and then returns it to the GW apparatus 10 (process (6)).

The GW service list producing means of the GW apparatus 10 combines the GW service list information received from the other GW apparatus 23 and its own GW service list information, and then sends the combined information to the remote control device 51 (process (7)).

Therefore, at the remote control device 51, the panel information of two appliances is displayed together with control information about linked functions (like buttons for dubbing) (process (8), refer to FIG. 63C).

FIG. 64 shows a format of control commands outputted from the remote control device 51 to the GW apparatuses in answer to pressing a bubbling button for on the screen thereof.

Each GW apparatus takes in only a control command directed to the GW itself from the received control commands, so that the dubbing is performed.

In the present system, it is possible to simultaneously control the home appliances under control of a plurality of GW apparatuses, so that a plurality of home appliances can be linked to perform various types of processing.

Figure 65:
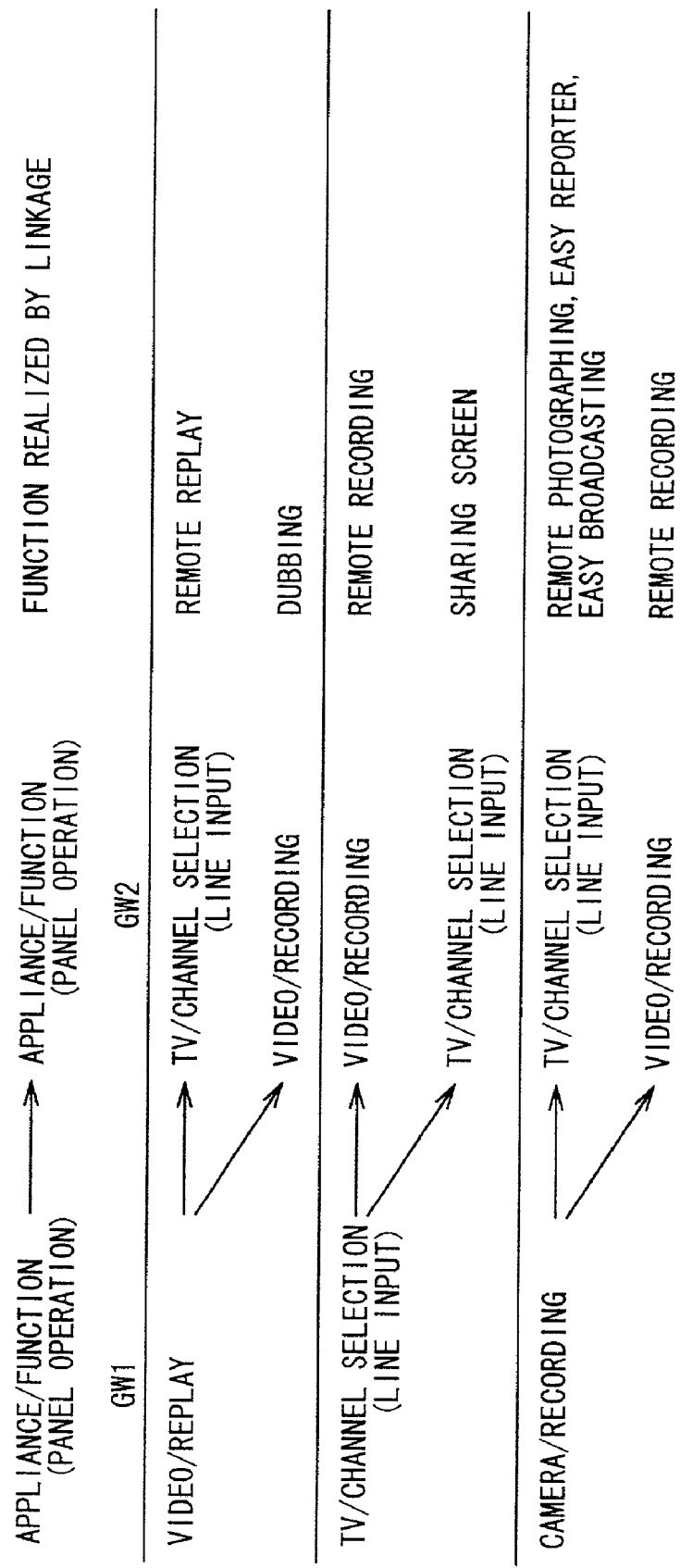
FIG. 65 illustrates an example of linked operations between or among a plurality of appliances.

As further liked processing that involves a plurality of home appliances, there can be provided an example shown in FIG. 65. This example includes other various types of linked functions involving two appliances, such that one appliance replays video, during which time the other selects a channel to the video (that is, remote replay); one appliance selects a channel, during which time the other records vide of the channel (that is, remote recording); one appliance selects a channel, during which time the other displays the selected channel screen as well (sharing of the same screen); and one appliance is a camera photographing video, while the other is an appliance to display the photographed video or record it.

Additionally, in order to efficiently transfer to a specified GW apparatus control commands inputted from the remote control device, information about distributing conditions to specify distribution routes may be added to a control command input.

Figures 66, 67:
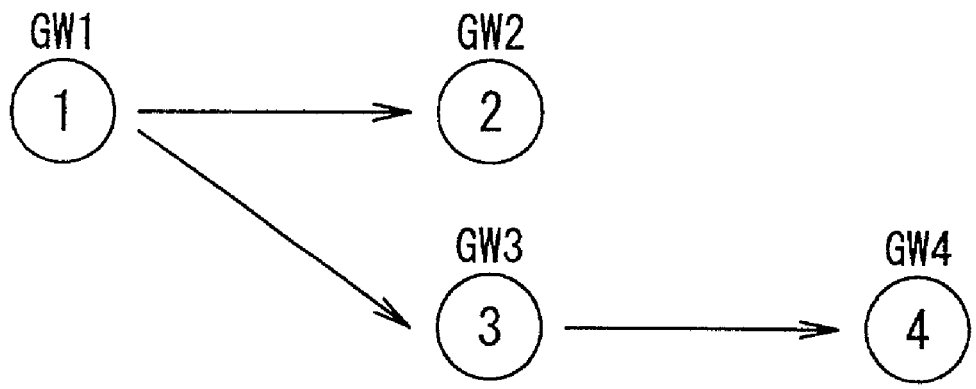
FIG. 66 shows a concept of distributing routes.
FIG. 67 exemplifies inputs of control commands to a plurality of appliances on condition that information about a distributing condition is given.

This distribution routes are decided according to communication capabilities of the network to which the remote control device is connected and the network to which the GW apparatuses are connected. As shown in FIG. 66, the distribution routes are displayed on the screen of the remote control device. The distribution routes are transmitted to the GW apparatuses in such a format as shown in FIG. 67, when an operation button is pressed.

Figure 68:
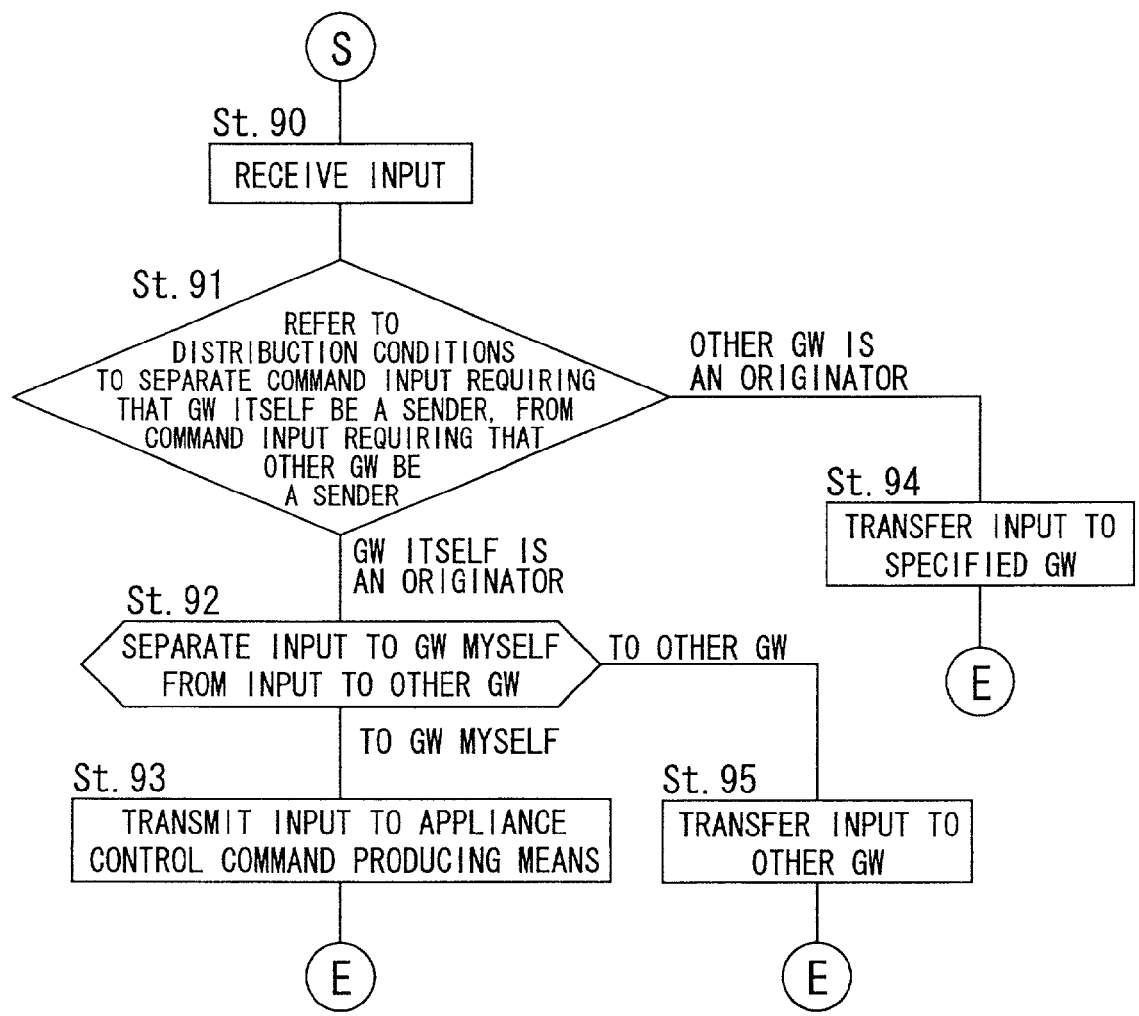
FIG. 68 is a flowchart showing the operation of input distributing means on condition that information about a distributing condition is given.

As shown in FIG. 68, in each GW apparatus, when inputs are received by the input distributing means (step 90), the information about distributing conditions are referred to distinguish a control command input requiring that the GW apparatus itself be an originator for distribution, from other control command inputs requiring that other GW apparatuses be an originator (step 91).

The command inputs requiring that other GW apparatus be an originator are then transferred to specified ones of the other GW apparatuses (step 94). In contrast, the command input requiring that the GW apparatus itself be an originator for distribution is further subjected to separation of a control command input directed to the GW apparatus itself from control command inputs to other GW apparatuses (step 92).

The command inputs to the other GW apparatuses are then transferred to specified ones of the other GW apparatuses (step 95), whilst the control command input to the GW apparatus itself is sent to its appliance control command producing means (step 93).

In this way, based on the information about distributing conditions for control command inputs, the GW apparatus finds that the remaining control command inputs should be redistributed to which GW apparatus. It is therefore possible to decide distributing routes according to the capability of the network, so that an amount of overhead in communication can be reduced. Delays of control commands due to linked operations can therefore be reduced.

(Eleventh Embodiment)

An eleventh embodiment of the present invention provides a system that permits the GW apparatus to cooperatively operate with an external service server.

Figure 69:
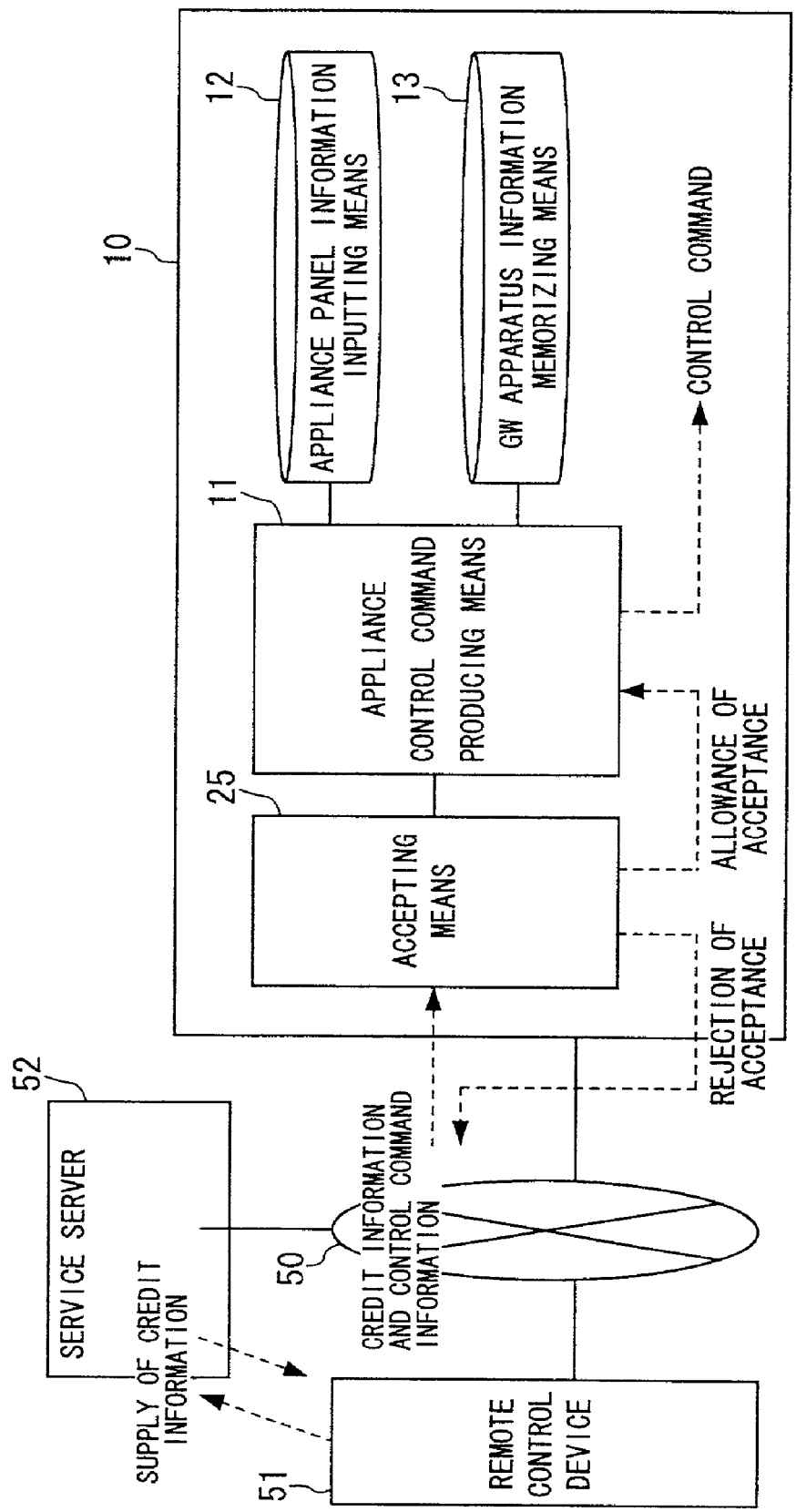
FIG. 69 is a block diagram showing the configuration of a remote control system according to an eleventh embodiment.

In this system, as shown in FIG. 69, a service server 52 that produces credit information is connected to the network 50 found outside the home and the GW apparatus 10 is provided with accepting means 25 for accepting only reliable inputs.

When sending a command for panel information acquisition and/or a control command, the remote control device 51 first sends toward the service server a request for issuing credit key information. On receiving the request, the service server 52 returns the credit key information to the remote control device 51. This device 51 sends to a given GW apparatus 10 both of the command for panel information acquisition and a control command, together with the credit key information.

Figure 70:
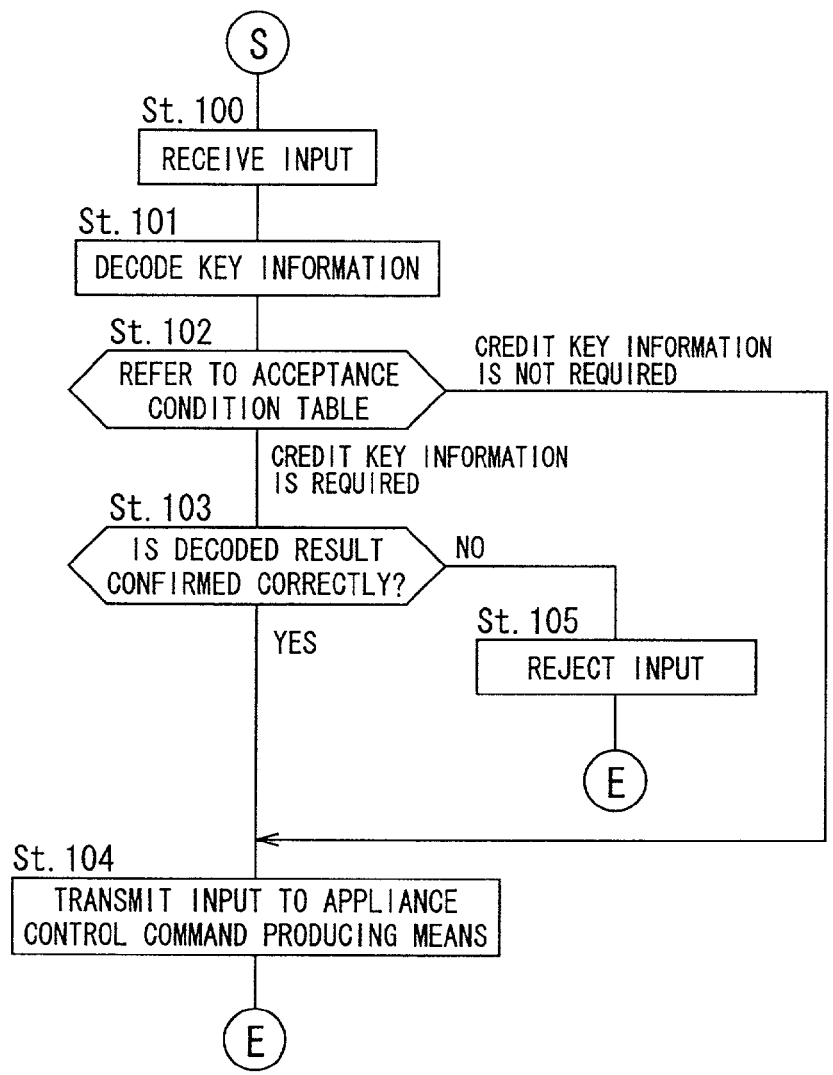
FIG. 70 outlines a flowchart showing the operation of accepting means.

FIG. 70 shows a flowchart of the operation carried out by the accepting means 25 of the GW apparatus.

Figure 71:
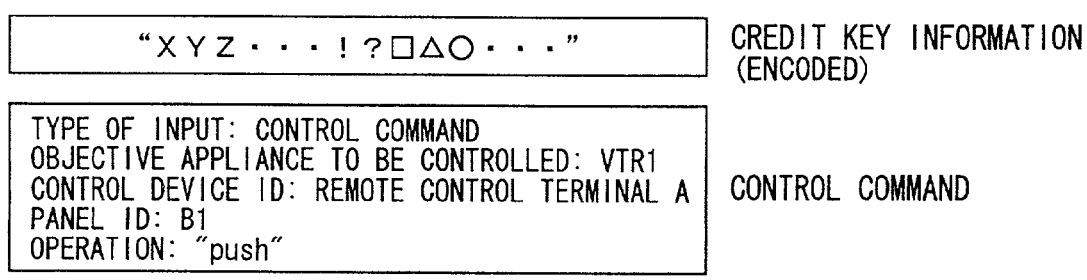
FIG. 71 is a format of an input to which credit information is added.

The accepting means 25 receives input (step 100). This input includes, as shown in FIG. 71, command information to which encoded credit key information is added.

The accepting means 25 uses a decoding algorithm previously acquired from the service server 52, so that the credit key information is decoded (step 101). Then, an acceptance condition table in which described are necessity or unnecessity of pieces of credit key information is referred, before the determination whether the accepted credit key information is required or not required is made (step 102).

FIGS. 72A to 72C show exemplary acceptance condition tables. FIG. 72A shows one table, in which an unchanged acceptance condition is set for a single service server. FIG. 72B shows anther table, in which different acceptance conditions, which differ service by service, are set for a plurality of service servers.

In FIG. 70, in cases it is determined at step 102 that the credit key information is "not required" (step 102), the input is transferred, as it is, to the appliance control command producing means (step 104). In contrast, if it is determined at step 102 that the credit key information is "required," the decoded credit key information is confirmed in terms of its contents (step 103). If the contents are not correct, the input is rejected (step 105), while if the contents are correct, the input is transferred to its appliance control command producing means (step 104).

Figure 73:
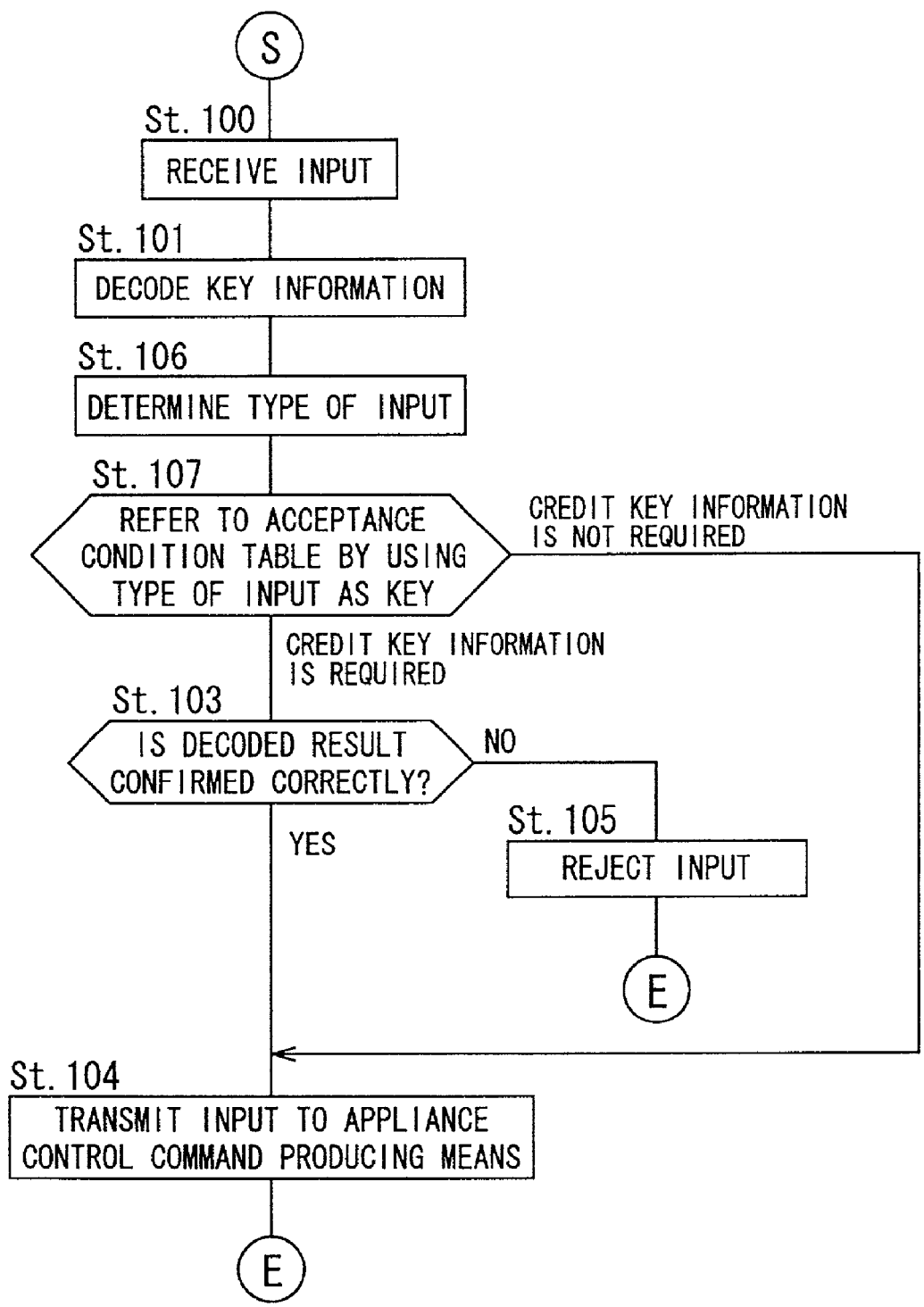
FIG. 73 is a flowchart showing the operation of the accepting means on condition that acceptance conditions are set based on the type of inputs.

Alternatively, as shown in FIG. 72C, it can be done that conditions in the acceptance condition table are changed depending on the type of input. In that case, the acceptance means 25 operates based on a flowchart illustrated by FIG. 73. Practically, the type of an input that has been received is determined (step 106), the type of the input is used as a key to make reference to the acceptance condition table, and it is determined whether or not the credit key information is required or not required (step 107).

Figure 74:
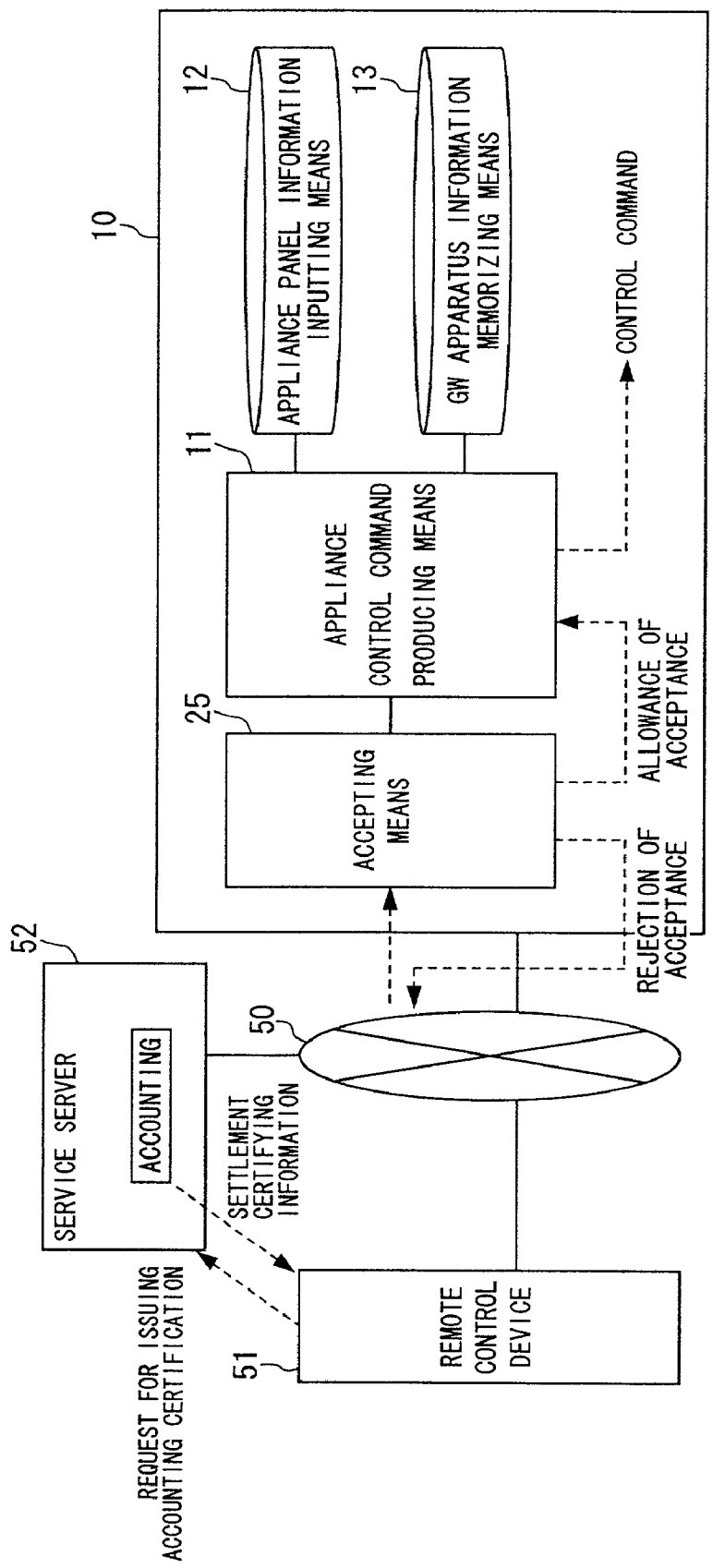
FIG. 74 shows a block diagram explaining the configuration of the remote control system in which a service server performs accounting.

A further alternative system can be configured as shown in FIG. 74, in which the service server 52 is responsible for accounting and the GW apparatus accepts only inputs to which accounting have been finished. In this configuration, before sending control commands to the GW apparatus 10, the remote control device 51 performs necessary processing such as payment to the service server 52, then requests that the certification that it has already been charged be issued. The service server 52 then responds by returning information about the settlement certification to the remote control device 51. Then the remote control device 51 sends a control command, together with the information about the settlement certification, to the specified gateway apparatus 10.

Figures 75, 76:
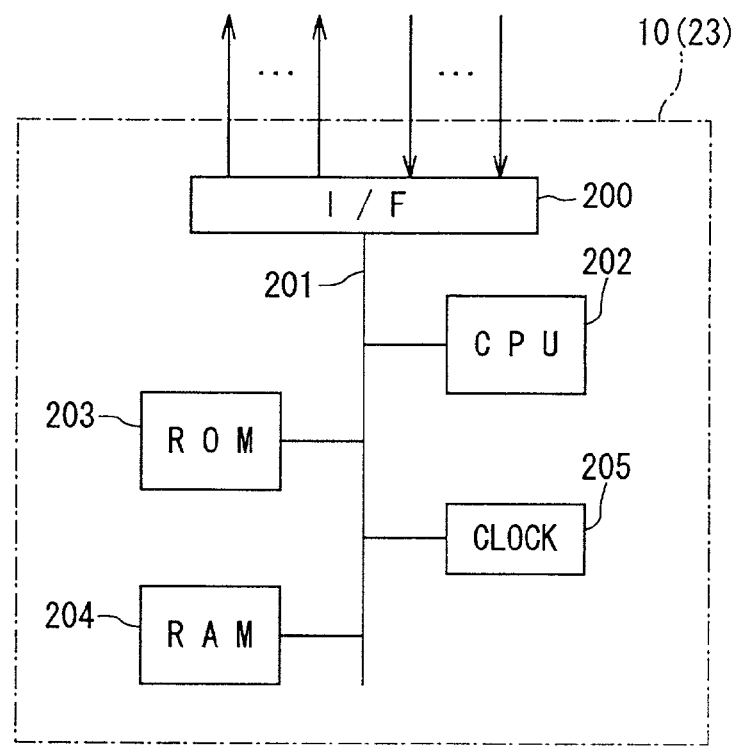
FIG. 75 is an example of the acceptance condition table that adopts a process of accounting as a key.
FIG. 76 is a block diagram exemplifying the hardware configuration of a home gateway apparatus.

An acceptance condition table used in such a case is shown in FIG. 75. According to this table, as for the type of input that requires accounting, it is necessary to confirm the credit key information. As a result, the accepting means 25 uses the decoded key information to confirm that given accounting has been finished, and then transfers the input to the appliance control command producing means.

In the present system, it is therefore possible to conduct various kinds of credit service in association with external service servers, thus only reliable control inputs being forwarded to the GW apparatus. Alternatively, it is also possible to introduce an accounting scheme in order to provide service that links control of home appliances to accounting. For example, one business mode can be provided in which a business body that manages a service server lends users the GW apparatuses and users' access to home appliances via the GW apparatuses causes accounting at the service server.

As described, the foregoing various remote control systems make it possible that home appliances are controlled via the Internet. Moreover, like an operating feeling obtained in operating home appliances at the home, they can be controlled from outside the home.

Further, since the direct control and remote control to home appliances are integrated to one route by the gateway apparatus, so that both types of control can be prevented from conflicting with each other.

Still further, the credit processing at the service server provides the remote control system with stability, thus improving reliability of the system.

In addition, the home gateway apparatuses 10 and/or 23 described in each of the above embodiments are constructed into hardware with a computer system in which CPU (central processing unit) is incorporated. One such example is shown in FIG. 76. In detail, the home gateway apparatus 10(23) has an interface 200 capable of communicating with external systems. The interface 200 is coupled with a bus 201, and the bus 201 is connected to a CPU 202, ROM 203, RAM 204, clock 205, and others. The CPU 202 is able to perform the foregoing remote control and the processing for various types of management directed to the control, based on programs previously stored by the ROM 203. In consequence, the ROM 203 constitutes a recording medium in which a program according to the present invention is stored. Such hardware configuration is able to provide the various functions (means) described in each of the embodiments.

Although the foregoing embodiments are constructed such that the Internet is adopted as the network found outside the home and the home gateway apparatus itself, which is located at the home, has an IP address to be connected to the Internet, modifications are also possible in this respect. The network found outside the home may be a network referred to as a commercial provider network or commercial provider access network. The Internet connection service carried out by providers can also be utilized.

Figure 77:
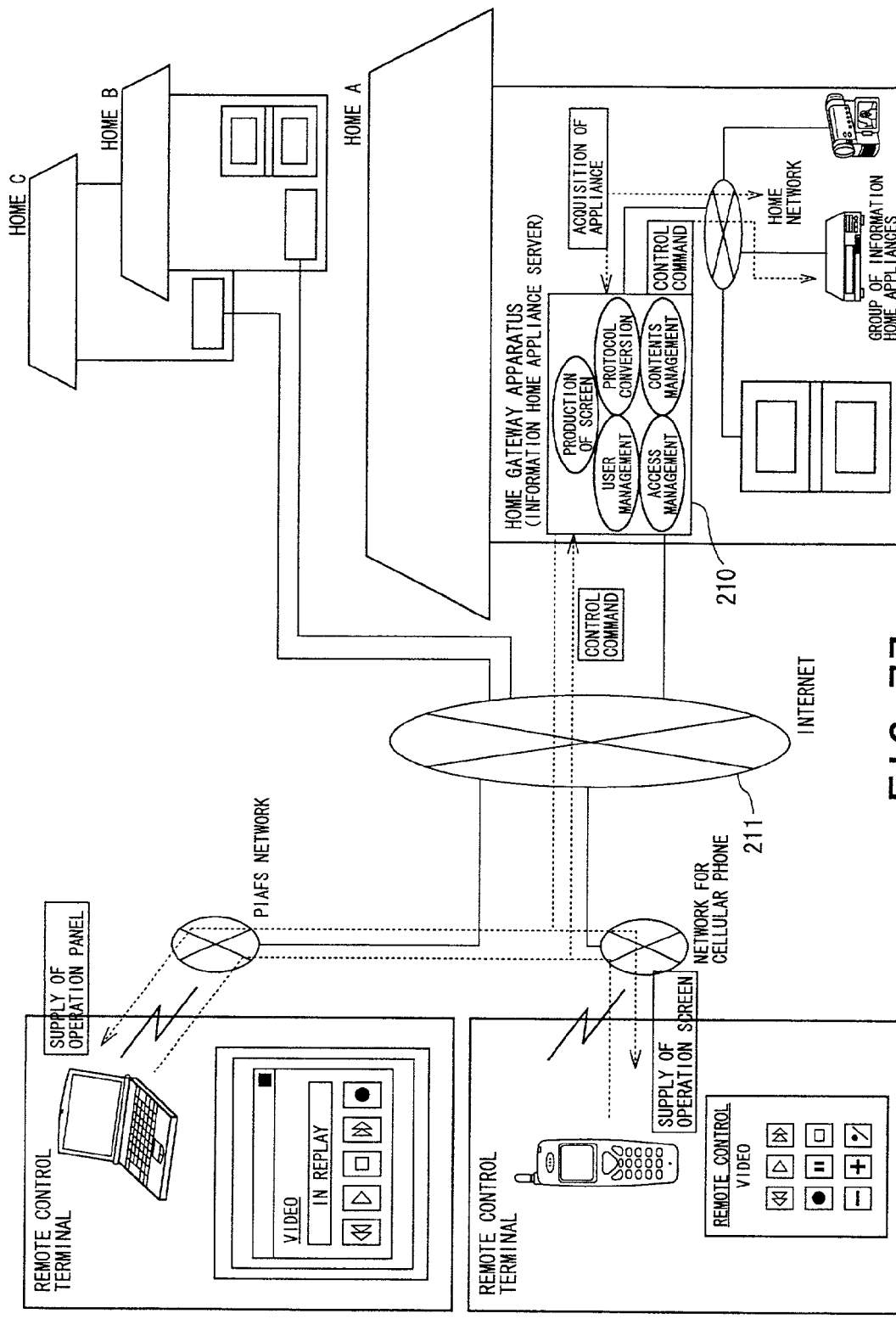
FIG. 77 outlines a concept showing a remote control system into which a home getaway apparatus according to the present invention is incorporated.
Figure 78:
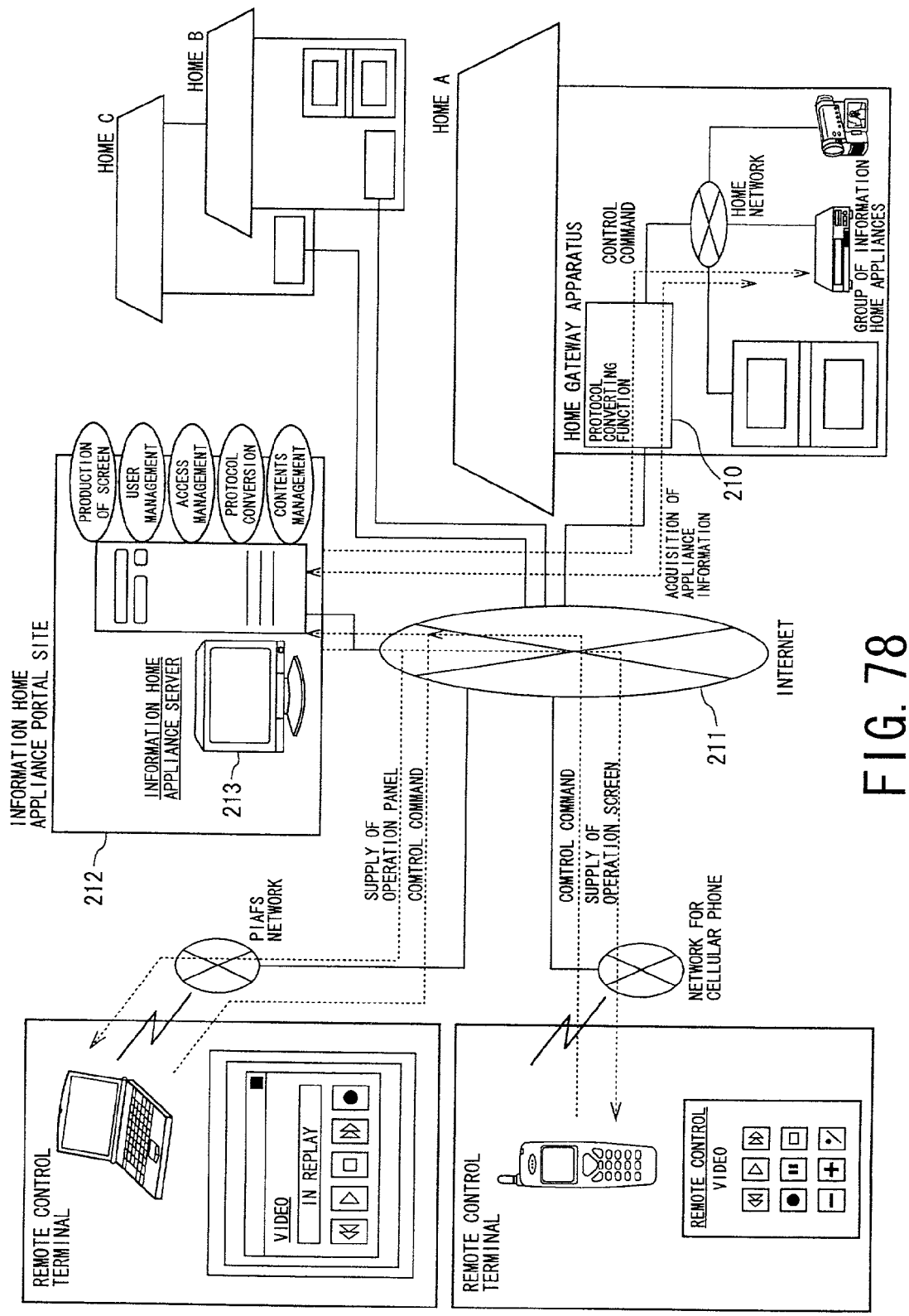
FIG. 78 outlines another concept showing a remote control system into which a home getaway apparatus according to the present invention is incorporated.

Exemplified in FIGS. 77 and 78 are constructions for remote control service using the gateway apparatus according to the present invention. The construction shown in FIG. 77 corresponds to the first to tenth embodiments, in which the home gateway apparatus of the present invention is located only inside a house (home). The home gateway apparatus located at each home is given the functions including the production of necessary display screens, user management, access management, protocol conversion, and contents management. The home getaway apparatus 210 is accessed via the Internet 211 serving as the network found outside the home.

On the other hand, in the construction shown in FIG. 78, part of the functions of the home getaway apparatus according to the present invention is located in a portal site 212 for information home appliances, which is built outside the home. This information home appliance portal site 212 is realized by an information home appliance server 213 connected to the Internet 212 serving as a network found outside the home. The foregoing functions, such as the production of necessary display screens, user management, access management, protocol conversion, and contents management, are functionally prepared in the information home appliance portal site 212. Thought the home gateway apparatus 210 at the home is connected to the Internet 211, only the function of the protocol conversion is given to this home gateway apparatus 210, by way of example. This configuration is able to reduce the processing load given to the home gateway apparatus 210 itself. Thus a home-use telephone, hub unit, personal computer, game apparatus, or others, which has a communicating function, can be used as the home gateway apparatus 210, so that it can be provided easily.

What is claimed is:

1. A gateway apparatus connected to at least one appliance through a first network, comprising:

an appliance control panel information inputting unit which is adapted to acquire appliance control panel information indicating panel parts of the appliance on a display screen and an operational range of the panel parts;

a gateway apparatus information memorizing unit which is adapted to memorize gateway apparatus information indicative of whether or not a control instruction, from one of a plurality of control devices through either one of a first network and/or a second network, to the appliance will be allowed to be accepted; and an appliance control command producing unit which is adapted to determine, with reference to the gateway apparatus information, whether or not a control instruction from one of the control devices can be accepted in cases where the control instruction has been received through either one of the first and/or second networks, and for producing a control command on the basis of the appliance panel information in cases where it is determined that the control instruction can be accepted, wherein the appliance is adapted to be operated in response to the control command, wherein the gateway apparatus further comprises appliance operation status inputting unit which is adapted to preserve appliance operation status information, including priority control device ID information and an operation table that comprises a current operation status of the appliance, an operable operation at all statuses that the appliance can take, and an indication of what the status will be after the operation is performed, wherein the control device comprises a first control device that is adapted to output a control instruction indicating a series of operations, and wherein the appliance control command producing unit determines, with reference to the gateway apparatus information and the appliance operation status information, whether or not it is possible for the apparatus to accept the received control instruction, records the control device ID of the first control device as the priority control device ID information of the appliance operation status information when the appliance at a current status requires the appliance control command producing unit to accept in preference the control instruction of the first control device indicating the series of operations, accept in preference the control instruction sent from the first control device on the basis of both a control device ID of each of one or more control devices including the first control device and the priority control device ID information when control instructions sent from the control devices are received, and determines whether to produce a control command that is valid for the desired series of operations, wherein the appliance is adapted to preferably perform the series of operations in response to the control command.

2. The gateway apparatus according to claim 1, wherein the gateway apparatus information memorizing unit is configured into a unit that is adapted to memorize the gateway apparatus information indicative of whether or not it is possible for the control instruction from the second network to the appliance to be accepted, and the appliance control command producing unit is configured into a unit that determines, with reference to the gateway apparatus information, whether or not the control instruction can be accepted in cases where the control instruction has been received through the second network, and for producing the control command for the appliance on the basis of the appliance panel information in cases where it is determined that it is possible for the control instruction to be accepted.

3. The gateway apparatus according to claim 1, wherein the appliance control command producing unit is configured into a unit that determines, with reference to the gateway apparatus information, whether or not it is possible for the control instruction to be accepted in cases where the control instruction has been received without being routed through both of the first and second networks, and for producing the control command of the appliance on the basis of the appliance panel information in cases where it is determined that it is possible for the control instruction to be accepted.

4. The gateway apparatus according to claim 1, wherein the control command to the appliance through the first network is produced from a control instruction sent from a remote control to control the appliance.

5. The gateway apparatus according to claim 1, wherein the control command to the appliance through the first network is produced from a control instruction sent from the appliance having a front panel that has been operated.

6. The gateway apparatus according to claim 1, further comprising a command outputting unit that outputs the control command produced by the appliance control command producing unit.

7. The gateway apparatus according to claim 6, wherein the command outputting unit is configured to transmit the control command to the appliance through the first network or to display the control command on an appliance directly connected to the gateway apparatus.

8. The gateway apparatus according to claim 1, further comprising an appliance panel information updating unit that is adapted to update the appliance panel information in accordance with changes in a state of the appliance that can be viewed on the panel.

9. The gateway apparatus according to claim 8, wherein the appliance panel information updating unit is configured to update the appliance panel information in response to reception of a notification that will indicate a changes in the state of the panel of the appliance.

10. The gateway apparatus according to claim 8, wherein the appliance panel information updating unit is adapted to acquire the state of the panel of the appliance and to update the appliance panel information.

11. The gateway apparatus according to claim 1, further comprising a gateway service list producing unit that is adapted to provide a remote control device with gateway service list information produced based on the appliance panel information, wherein the gateway service list information is adapted to be requested by the remote control device via the second network.

12. The gateway apparatus according to claim 11, wherein the appliance panel information is adapted to have been memorized by the appliance panel information inputting unit.

13. The gateway apparatus according to claim 11, wherein the gateway service list producing unit is adapted to be configured to produce and store the gateway service list information based on the appliance panel information that has been memorized by the appliance panel information inputting unit, and to provide the stored gateway service list information, in response to the request from the remote control device.

14. The gateway apparatus according to claim 11, wherein the gateway service list producing unit is configured to provide browser-displaying data as the gateway service list information, the browser-displaying data being according to a type of a set of tags supporting a browser installed in the remote control device.

15. The gateway apparatus according to claim 11, wherein the gateway service list producing unit is configured to provide a program as the gateway service list information, the program being according to a type of a virtual machine (VM) supported by a browser installed in the remote control device.

16. The gateway apparatus according to claim 15, comprising a command memorizing unit, in cases where the appliance has a status that exclusively permits acceptance of an operation on a button at a certain control device, for memorizing commands produced by the appliance control command producing unit and for transmitting to the appliance the memorized commands in a memorized order, provided the status is updated so as not to require exclusive acceptance.

17. The gateway apparatus according to claim 1, comprising a use key information inputting unit which is adapted to preserve use key information indicative of a condition needed to usably connect the appliance to the first network, wherein the appliance control command producing unit includes a unit that is adapted to determine whether or not it is possible to accept the control instruction depending on the use key information.

18. The gateway apparatus according to claim 17, wherein the use key information includes at least one of: accepted time zone data of the control instruction, location identification data, terminal identification data, and user identification data.

19. The gateway apparatus according to claim 17, wherein the use key information corresponds to each state of the appliance operation status information, and the appliance control command producing unit is configured to use the use key information corresponding to a current status to determine whether or not it is possible to accept the control instruction.

20. The gateway apparatus according to claim 19, wherein the gateway service list producing unit is configured to produce gateway service list information that is adapted to determine an operational range coming from the remote control device, based on the use key information and the appliance operation status information, and transmit the produced information to the remote control device.

21. The gateway apparatus according to claim 1, further comprising a contents managing unit that is adapted to memorize a content list, including contents IDs, preserved by the device connected to the first network and numbers of use keys each corresponding to each contents ID and detecting an access from the appliance to the contents, wherein the appliance control command producing unit includes a unit that is adapted to examine a right of use based on the use key in detecting the access and determining whether or not it is possible to access the contents.

22. The gateway apparatus according to claim 1, wherein the appliance panel information inputting unit is configured to preserve, in addition to the appliance panel information, linked appliance information indicating, for each function of the appliance, an objective appliance to be operationally linked, the function, and identification data of a gateway apparatus to be linked and further comprising;
    an input distributing unit which, in cases where control instructions are acquired from the control device or other gateway apparatuses, is adapted to accept only a control instruction directed to the gateway apparatus itself and adapted to deliver the remaining control instructions to the other gateway apparatuses, thereby enabling the performance of a linked operation among a plurality of desired gateway apparatuses.

23. The gateway apparatus according to claim 22, wherein the control instructions include information about distributing conditions, and the input distributing unit includes a unit which decides a situation that each gateway apparatus re-delivers the remaining instructions to a particular gateway apparatus.

24. The gateway apparatus according to claim 1, connected via both a service server producing credit information and a network so as to be adapted to acquire a control instruction from a terminal together with the credit information, comprising an accepting unit that is adapted to memorize acceptance information in which a condition for allowing the control instruction to be accepted and determining whether or not it is possible for the control instruction to be accepted on the basis of the control instruction and the acceptance information.

25. The gateway apparatus according to claim 24, wherein the acceptance information includes the condition specified every request input for acquiring the panel information and every control instruction.

26. The gateway apparatus according to claim 24, wherein the condition of the acceptance information includes supply of information about certification of settlement issued by the service server, and further comprising a unit which accepts only control instructions that have been charged by the service server.

27. A remote control system, comprising:
    an outside network built outside a home;
    a home network connected to a home appliance; and
    a gateway apparatus connected to the outside network and the home network, wherein the home appliance is adapted to be remotely-controlled through the outside network and wherein the remote control is adapted to be mediated by the gateway apparatus,
    wherein the gateway apparatus is configured to output appliance panel information of the home appliance to each of a plurality of control devices to remote-control the home appliance through the outside network such that a figure approximating a front panel of the appliance is displayed on a screen of the control device, to receive a control instruction indicating an operation on the panel displayed on the screen of the control device, to convert the control instruction into a control command to the home appliance, and to send the produced control command to the home appliance such that the home appliance performs an operation corresponding to the operation done on the panel displayed by the control device,
    wherein the control devices include a first control device which outputs a control instruction indicating a series of operations, and
    the gateway apparatus determines whether or not it is possible to accept the received control instruction, records a control device ID of the first control device as priority control device ID information when the appliance at a current status requires the gateway apparatus to accept, in preference, the control instruction of the first control device indicating the series of operations, accept, in preference, the control instruction sent from the first control device on the basis of both a control device ID of each of one or more control devices including the first control device and the priority control device ID information when control instructions sent from the control devices are received, and determines whether to produce a control command that is valid for the series of operations, the appliance performing, in preference, the series of operations in response to the control command.

28. The remote control system according to claim 27, wherein a control instruction for direct control of the home appliance is once inputted to the gateway apparatus, and the gateway apparatus generates the control command from the control instruction and sends the control command to the home appliance.

29. The remote control system according to claim 27, wherein information about an operated status of the home appliance is sent to the gateway apparatus, wherein the gateway apparatus is configured to hold information about a current operated state of the home appliance.

30. The remote control system according to claim 27, wherein the gateway apparatus includes a unit that is adapted to determine whether the current status of the home appliance is adapted to enable transit to a status commanded by control based on an operation performed on a panel at the control device and a unit that is adapted to make the control command invalid when it is determined that the transition is impossible.

31. The remote control system according to claim 27, wherein a use condition to allow the control device to remote-control the home appliance is set, wherein the gateway apparatus includes a unit that is adapted to stop the meditation unless the use condition is met.

32. The remote control system according to claim 31, wherein the use condition is set in association with the status of the home appliance.

33. The remote control system according to claim 32, wherein the gateway apparatus includes a unit which, according to an operation on a panel at the control device, is adapted to provide the control device with appliance panel information explicitly showing a next operational range of the panel operable by the control device.

34. The remote control system according to claim 27, comprising a plurality of gateway apparatuses and a plurality of home appliances, wherein each gateway apparatus comprises a unit which receives a control instruction, directed to the gateway itself, from control instructions issued by the control device to the plurality of home appliances and a unit which sends a control command produced from the received control instruction to a specific home appliance whereby the plurality of home appliances are enabled to perform a linked operation.

35. The remote control system according to claim 27, wherein the gateway apparatus includes a unit which allows the mediation only when the control instruction from the control device includes a guarantee given by a service server.

36. The remote control system according to claim 27, wherein the gateway apparatus includes a unit that is adapted to allow the mediation only when the control instruction from the control device includes a certification for settlement of charges, the certification being given by a service server.

* * * * *